(12) United States Patent
Imai et al.

(10) Patent No.: US 8,792,044 B2
(45) Date of Patent: Jul. 29, 2014

(54) IMAGE PICKUP DEVICE AND METHOD FOR MANUFACTURING THE IMAGE PICKUP DEVICE

(75) Inventors: Toshiyuki Imai, Hachioji (JP); Tougo Teramoto, Wakayama (JP); Yasushi Iijima, Hachioji (JP); Shigeru Hosoe, Hino (JP); Akira Sato, Hachioji (JP); Yuiti Fujii, Hachioji (JP); Daisuke Watanabe, Niiza (JP)

(73) Assignee: Konica Minolta Advanced Layers Inc., Tokyo (JP)

(*) Notice: Subject to any disclaimer, the term of this patent is extended or adjusted under 35 U.S.C. 154(b) by 0 days.

(21) Appl. No.: 13/503,826

(22) PCT Filed: Oct. 26, 2010

(86) PCT No.: PCT/JP2010/068917
§ 371 (c)(1),
(2), (4) Date: Apr. 24, 2012

(87) PCT Pub. No.: WO2011/055654
PCT Pub. Date: May 12, 2011

(65) Prior Publication Data
US 2012/0218455 A1    Aug. 30, 2012

(30) Foreign Application Priority Data
Nov. 5, 2009   (JP) ................... 2009-254371

(51) Int. Cl.
*H04N 5/225* (2006.01)
(52) U.S. Cl.
USPC ............................ 348/340; 348/360; 348/335

(58) Field of Classification Search
CPC .............. H04N 5/2254; H04N 5/2253; H04N 5/23212; H04N 5/2259; H04N 5/23209
USPC .......... 348/335, 340, 360; 359/646, 715–717, 359/796, 797, 462, 808–811, 819
See application file for complete search history.

(56) References Cited

U.S. PATENT DOCUMENTS

| | | | |
|---|---|---|---|
| 6,324,010 B1 * | 11/2001 | Bowen et al. | 359/622 |
| 2004/0012698 A1 * | 1/2004 | Suda et al. | 348/315 |
| 2006/0044450 A1 * | 3/2006 | Wolterink et al. | 348/340 |
| 2008/0101791 A1 | 5/2008 | Hsiao | |
| 2011/0032410 A1 * | 2/2011 | Shigemitsu et al. | 348/340 |
| 2011/0199530 A1 * | 8/2011 | Kosaka et al. | 348/340 |

FOREIGN PATENT DOCUMENTS

| | | |
|---|---|---|
| CN | 1682377 | 10/2005 |
| CN | 1924628 | 3/2007 |
| CN | 101169571 | 4/2008 |

(Continued)

*Primary Examiner* — Tuan Ho
*Assistant Examiner* — Zhenzhen Wu
(74) *Attorney, Agent, or Firm* — Cozen O'Connor

(57) ABSTRACT

Disclosed is an image pickup device, by which cut resistance at the time of cutting a wafer lens is reduced, high production efficiency is maintained, and excellent optical characteristics are obtained. The image pickup device has a first lens block, a second lens block, a spacer, and a sensor unit. The side surface section of the first lens block, the side surface section of the second lens block, and the side surface section of the spacer are formed on the same plane. A lens cover that covers the first and the second lens blocks is provided in a step formed by respective side surface sections of the first lens block, the second lens block and the spacer, and the side surface section of the sensor unit.

13 Claims, 60 Drawing Sheets

(56) References Cited

FOREIGN PATENT DOCUMENTS

| | | |
|---|---|---|
| CN | 102016653 | 4/2011 |
| JP | 3926380 | 6/2007 |
| JP | 2007-188034 | 7/2007 |
| JP | 2009-153178 | 7/2009 |
| WO | WO 2004/027880 | 4/2004 |
| WO | WO 2009/125654 | 10/2009 |
| WO | WO 2010033211 A1 * | 3/2010 |

* cited by examiner

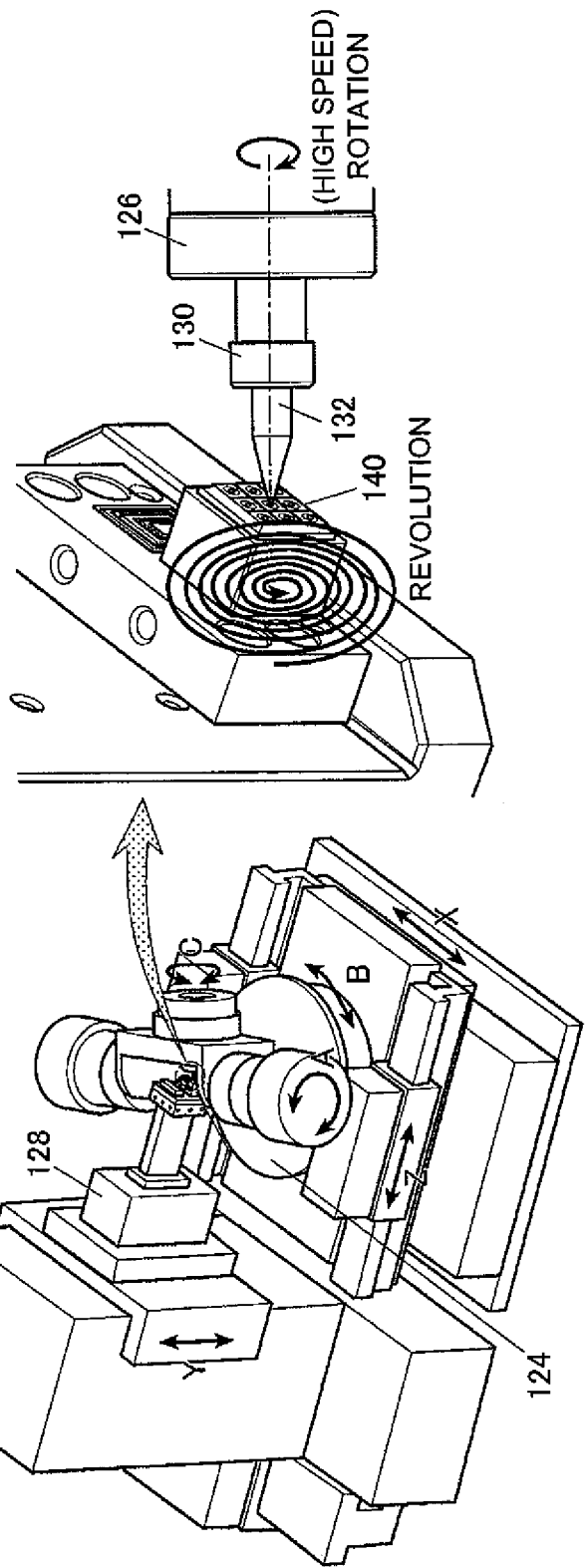

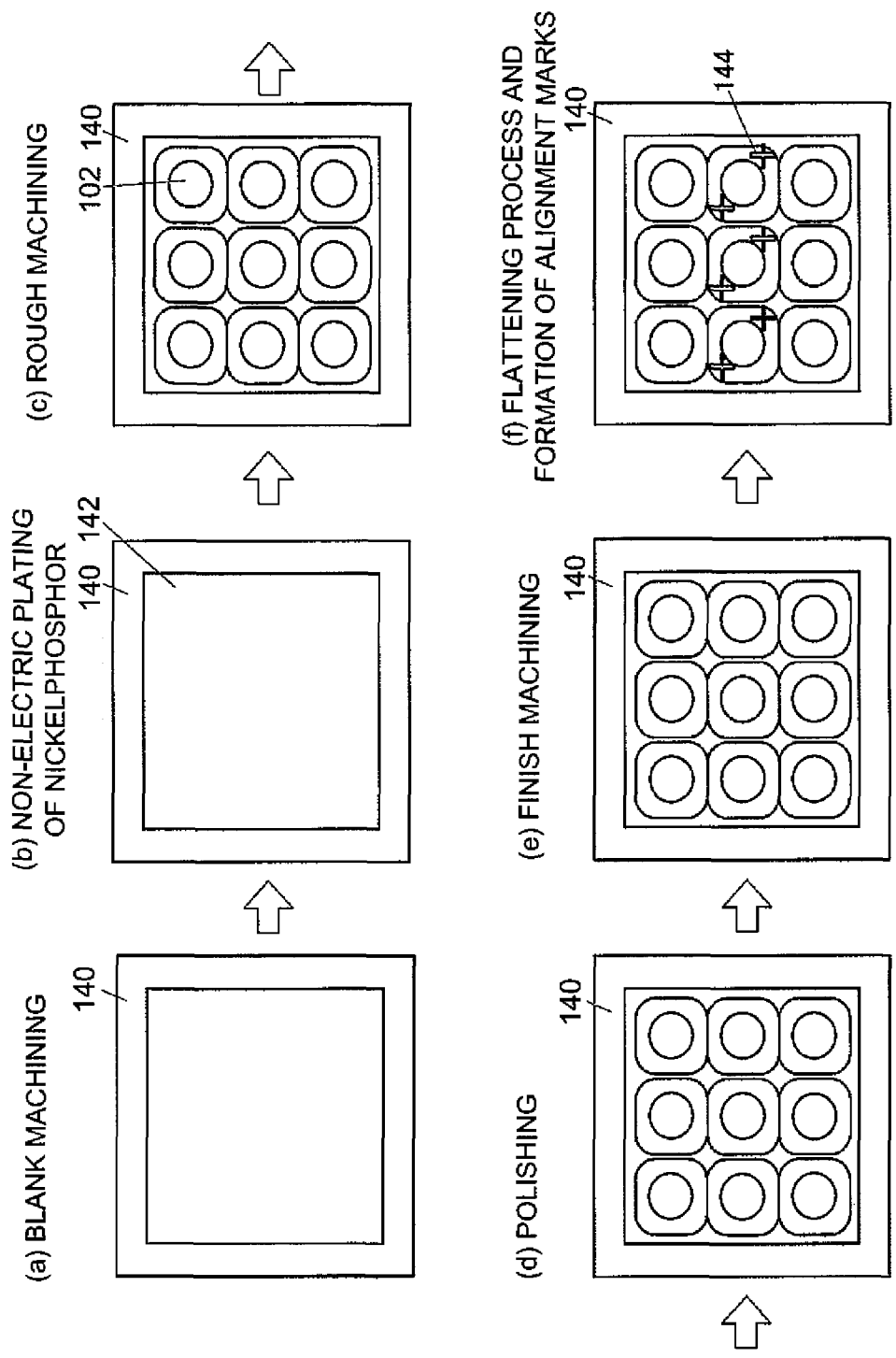

FIG. 25
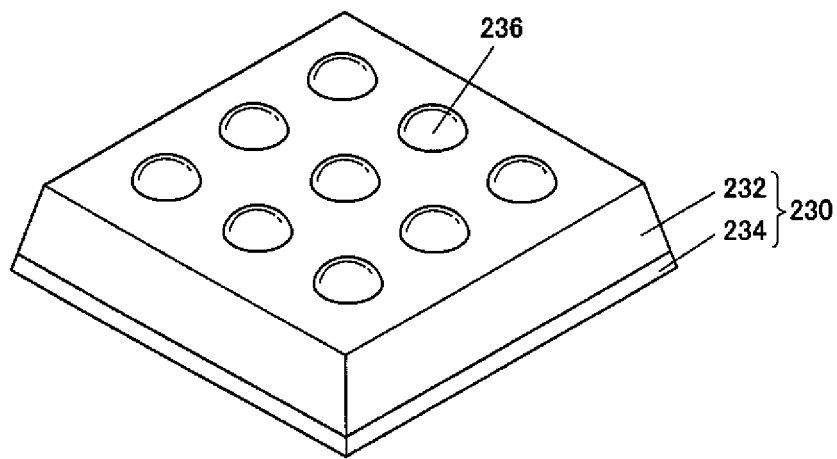
FIG. 26
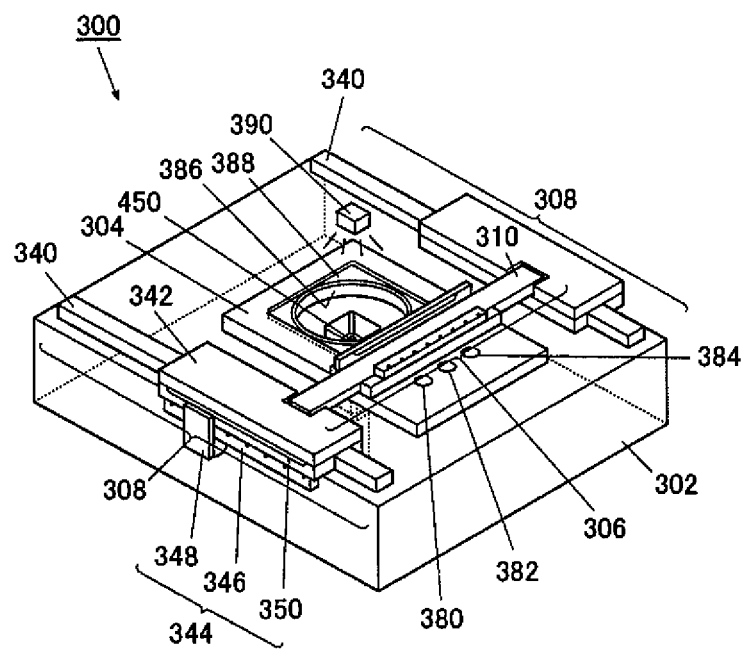
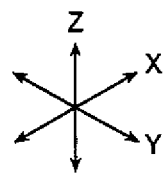

FIG. 40
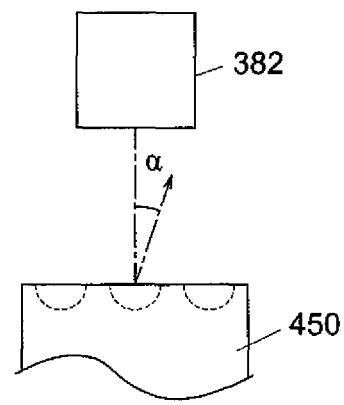
FIG. 41
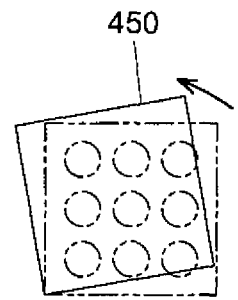
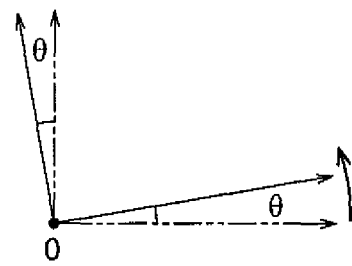

FIG. 73
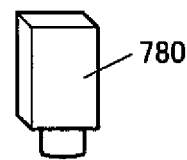
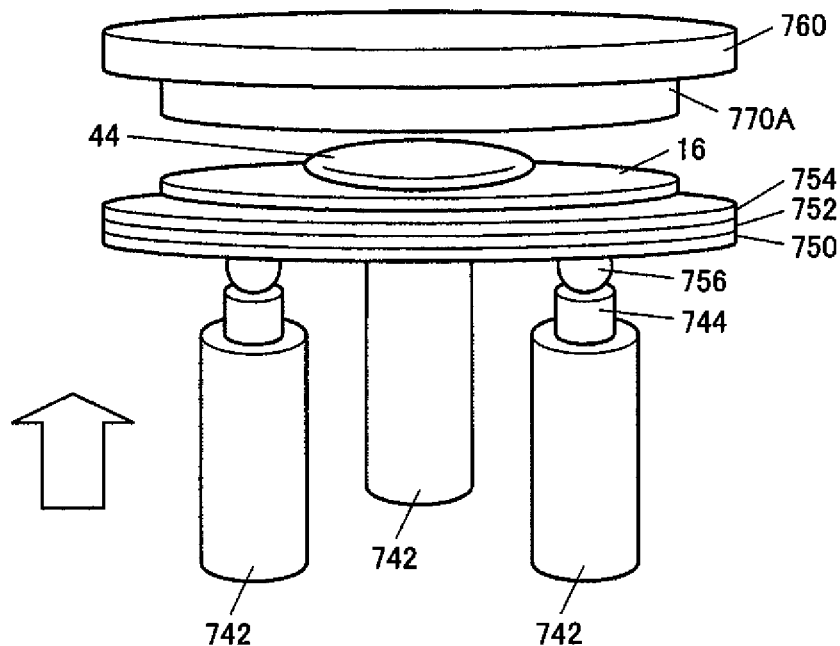
FIG. 74
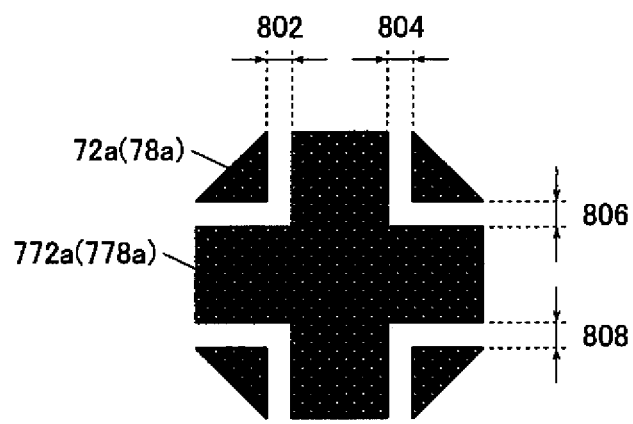

FIG. 81
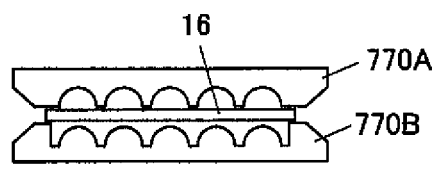
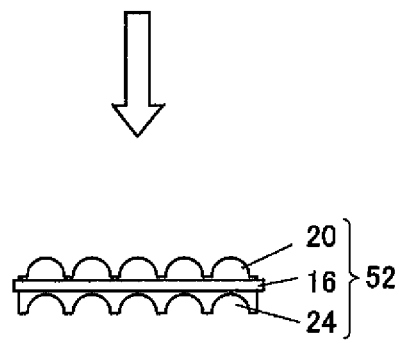

IMAGE PICKUP DEVICE AND METHOD FOR MANUFACTURING THE IMAGE PICKUP DEVICE

This is a U.S. National Phase Application under 35 USC 371 of International Application PCT/JP2010/068917 filed on Oct. 26, 2010.

This application claims the priority of Japanese Application No. 2009-254371 filed Nov. 5, 2009, the entire content of all of which are hereby incorporated by reference.

TECHNICAL FIELD

The present invention relates an image pickup device and a method for manufacturing the image pickup device.

BACKGROUND ART

Conventionally, in the field of manufacturing optical lenses, a method has been studied in which a lens part made of curable resin is provided on a glass substrate to obtain an optical lens having a high heat resistivity (see Patent Document 1, for example). As an example of manufacturing methods to which this technique has been applied, a method has been proposed in which a so-called wafer lens, in which a plurality of optical components made of curable resin are provided on a surface of a glass substrate, is formed, and the glass substrate is then cut into individual lens parts.

RELATED ART DOCUMENT

Patent Document

Patent Document 1: Japanese Patent No. 3926380

SUMMARY OF THE INVENTION

Object of the Invention

Such wafer lenses are advantageous in that by using these lenses, image pickup devices, especially small optical systems such as a camera for a portable phone, can be produced in one shot; however, they have some issues.

That is because such cameras for portable phones have high resolution in recent years, and they tends to need more number of lenses. Thus, in configurations of such optical systems using wafer lenses, the optical system needs to be constituted not by one wafer lens in which lens parts are formed in a single glass substrate but by a body of assembled wafer lenses in which a plurality of wafer lenses are laminated.

However, in the method of cutting a plurality of wafer lenses which are laminated, there arise the following technical problems: there are a lot of glass substrates therebetween; there are a lot of intervening members such as spacers defining spaces between the lens parts such as a spacer defining the space to the image sensor for receiving light from the lens; and the cut resistance when cutting is accordingly increased, thereby deteriorating the cutting blade for dicing and the like, whereby the productivity is decreased, and thus it is difficult to cut precisely enough to maintain high optical performance.

A main object of the present invention is to provide a method for manufacturing an image pickup device in which a sensor is bonded and which is made by cutting a body of assembled wafer lenses made up of a plurality of laminated wafer lenses, and in which method cutting resistance when cutting wafer lenses is especially decreased, high productivity is maintained, and an image pickup device having high optical performance is obtained. In addition, the present invention is to provide an image pickup device which is small-sized and has high optical performance and which is an image pickup device containing a lens unit in which a body of assembled wafer lenses obtained by laminating a plurality of wafer lenses is divided into individual pieces.

Means for Solving the Object

To solve the above-described problems, according to one aspect of the present invention, provided is a method for manufacturing an image pickup device, the method comprising the steps of manufacturing an optical unit which comprises, in order from an object side: a first lens block including a first glass substrate, on an image side surface of which a first lens part and a first non-lens part surrounding the first lens part are formed of resin; and a second glass substrate, on an object side surface of which a second lens part and a second non-lens part surrounding the second lens part are formed of resin, wherein the first non-lens part and the second non-lens part are directly bonded to face each other;

bonding a glass spacer, which has an opening at a position corresponding to the first lens part and the second lens part, such that the one end surface of the glass spacer is directly bonded to a surface opposite to the surface on which the second lens part and the second non-lens part are formed;

bonding a sensor unit, which has a glass cover member and an image sensor provided a predetermined distance away from the cover member, to the other end surface of the spacer, wherein at least a side surface of the first lens block, a side surface of the second lens block, and a side surface of the spacer are formed on the same plane; and mounting a lens cover such that the lens cover covers the side surfaces.

According to another aspect of the present invention, provided is a method for manufacturing an image pickup device, the method comprising the steps of:

manufacturing an optical unit which comprises, in order from an object side: a first lens block including a first glass substrate on an object side surface of which a first lens part is formed of resin, and an image side surface of which a second lens part and a second non-lens part surrounding the second lens part are formed of resin; and a second lens block including a second glass substrate on an object side surface of which a third lens part and a third non-lens part surrounding the third lens part are formed of resin, and on an image side surface of which a fourth lens part is formed of resin, wherein the second non-lens part and the third non-lens part are directly bonded to face each other;

bonding a glass spacer, which has an opening at a position corresponding to the first lens part through the fourth lens part, such that one end surface of the glass spacer is directly bonded to the surface on which the fourth lens part is formed;

bonding a sensor unit, which has a glass cover member and an image sensor provided a predetermined distance away from the cover member, to the other end surface of the spacer, wherein at least a side surface of the first lens block, a side surface of the second lens block, and a side surface of the spacer are formed on the same plane; and mounting a lens cover such that the lens cover covers the side surfaces.

According to another aspect of the present invention, provided is a method for manufacturing an image pickup device, the method comprising the steps of:

manufacturing an optical unit which comprises, in order from an object side: a first lens block including a first glass substrate on an object side surface of which a first lens part convex toward the object side is formed of resin, and on an image side surface of which a second lens part concave toward an image side and a second non-lens part surrounding the second lens part are formed of resin; and a second lens block including a second glass substrate on an object side surface of which a third lens part concave toward the object side and a third non lens part surrounding the third lens part are formed of resin, and on an image side surface of which a fourth lens part is formed of resin, wherein the second non-lens part and the third non-lens part are directly bonded to face each other;

bonding a glass spacer, which has an opening at a position corresponding to the first lens part through the fourth lens part, such that one end surface of the glass spacer is directly bonded to the surface on which the fourth lens part is formed;

bonding a sensor unit, which has a glass cover member and an image sensor provided a predetermined distance away from the cover member, to the other end surface of the spacer, wherein at least a side surfaces of the first lens block, a side surface of the second lens block, and a side surface of the spacer are formed on the same plane; and mounting a lens cover such that the lens cover covers the side surfaces.

According to another aspect of the present invention, provided is an image pickup device, comprising in order from an object side:

an optical unit, the optical unit including:
a first lens block having a first glass substrate on at least one surface of which a first lens part and a first non-lens part surrounding the first lens part are formed of resin; and
a second lens block having a second glass substrate on at least one surface of which a second lens part and a second non-lens part surrounding the second lens part are formed of resin, wherein the first non-lens part and the second non-lens part are directly bonded to face each other;
a glass spacer one end surface of which is directly bonded to a surface of the second lens block which is opposite to the surface on which the second lens part and the second non-lens part are formed, wherein the spacer has an opening at a position corresponding to the first lens part and the second lens part; and
a sensor unit bonded on the other end surface of the spacer, the sensor unit including:
a glass cover member; and
an image sensor provided a predetermined distance away from the cover member, wherein at least a side surface of the first lens block, a side surface of the second lens block, and a side surface of the spacer are formed on the same plane; and
a lens cover configured to cover the side surfaces.

According to another aspect of the present invention, provided is an image pickup device, comprising in order from an object side:
a first lens block, the first lens block including:
a first lens part formed in a part of a resin part; and
a second lens part formed, through a first glass substrate, in a part of a resin part;
a second lens block, the second lens block including:
a third lens part formed in a part of a resin part bonded to the resin part in which the second lens part of the first lens block is formed; and
a forth lens part formed in apart of a resin part formed through a second glass substrate;
a glass spacer which is provided on a side of the fourth lens part of the second lens block and has an opening at a position corresponding to the first lens part through the fourth lens part; and
a censor unit including a glass cover member to which the other end of the spacer is bonded, wherein an image sensor is provided on one surface of a substrate a predetermined distance away from the cover member, wherein a side surface of the first lens block, a side surface of the second lens block, and a side surface of the spacer are formed on the same plane, and a lens cover covering the first lens block and the second lens block is provided within a step between the side surfaces of the first lens block, the second lens block, and the spacer and a side surface of the sensor unit.

According to another aspect of the present invention, provided is an image pickup device, comprising in order from an object side:
a first lens block, the first lens block including:
a first lens part which is convex toward the object side and is formed in a resin part; and
a second lens part which is formed, through a glass substrate, in a part of a resin part and is concave toward an image side;
a second lens block, the second lens block including:
a third lens part which is formed in a part of a resin part bonded to the resin part in which the second lens part of the first lens block is formed; and
a forth lens part formed in a part of a resin part formed through a glass substrate;
a glass spacer which is provided on a side of the fourth lens part of the second lens block and has an opening at a position corresponding to the first lens part through the fourth lens part; and
a sensor unit including a glass cover member to which the other end of the spacer is bonded, wherein an image sensor is provided on one surface of a substrate a predetermined distance away from the cover member, wherein a side surface of the first lens block, a side surface of the second lens block, and a side surface of the spacer are formed on the same plane, and a lens cover covering the first lens block and the second lens block is provided within a step between the side surfaces of the first lens block, the second lens block, and the spacer and a side surface of the sensor unit.

In further particularly, an image pickup device and a method for manufacturing the image pickup device, wherein the first lens block and the second lens block are manufactured as wafer lenses, and after the wafer lenses and a spacer substrate are bonded, they are cut into individual pieces, wherein the side surfaces area formed on the same plane.

Advantage of the Invention

According to the present invention, in spite of employing a configuration of a plurality of laminated wafer lenses, there is no need for bonding the first lens block and the second lens block through a separate spacer such as a glass substrate, whereby cutting resistance when cutting does not needs to be increased, thereby maintaining a high productivity due to using wafer lenses.

In addition, it can also solve the problem that the optical performance is adversely affected by misalignment of the optical axes caused by a positional displacement between the wafer lenses to be bonded to other members when they are cut.

In addition, as a result of removing spacers between lenses, it becomes to be possible to cut the optical system including a spacer necessary between an image sensor and an optical system, whereby design can be done, allowing the material and the allowance of the thickness of the spacer to have degree of freedom; thus the lens unit made by cutting together with the spacer into individual pieces is bonded to a sensor unit made by cutting another wafer into individual pieces, forming a step in a side surface, and the lens block is covered by a package so that the lens block is housed in that step, whereby the lens block does not stick out of the sensor unit, with a result that a small-sized and high performance image pickup device can be provided.

BRIEF DESCRIPTION OF THE DRAWINGS

FIG. 13Ab is a partially enlarged diagram showing the schematic configuration of the cutting machine;

FIG. 13Ba is a perspective view showing a modified example of the cutting machine of FIGS. 13Aa and 13Ab;

FIG. 13Bb is a partially enlarged diagram of the modified example of the cutting machine of FIGS. 13Aa and 13Ab;

FIG. 15 is a schematic diagram temporally showing a method for manufacturing a concave die;

FIG. 25 is a perspective view showing a schematic configuration of a second convex plastic die;

FIG. 26 is a perspective view showing a schematic configuration of a wafer lens manufacturing apparatus;

FIG. 40 is a diagram schematically showing a configuration for adjustment of parallelism between the glass substrate and the molding die;

FIG. 41 is a diagram schematically showing coordinate conversion on a two-dimensional plane for the molding die;

FIG. 73 is an enlarged explanatory diagram showing the vicinity of a tilt mechanism;

FIG. 74 is a schematic diagram showing the alignment marks viewed and aligned to mold resin;

FIG. 81 is a diagram showing a step of releasing the both-sided molding die from the glass substrate;

BEST MODE FOR CARRYING OUT THE INVENTION

Preferred embodiments of the present invention are described below with reference to the drawings.

First Embodiment

[Image Pickup Device]

Figure 1A:
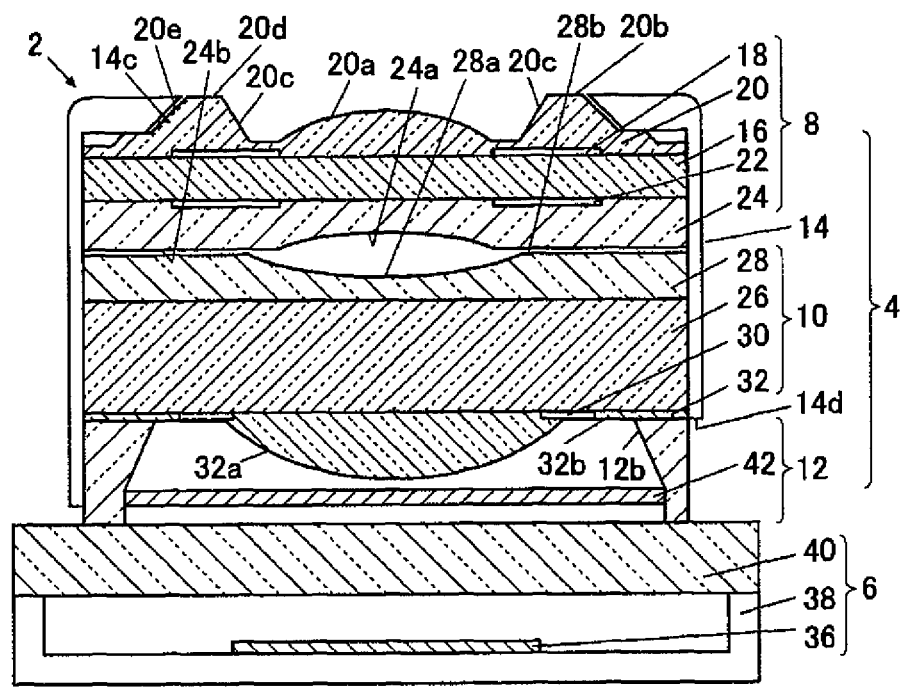
FIG. 1a is a cross section showing a schematic configuration of an image pickup device.

As shown in FIG. 1a, an image pickup device 2 is mainly constituted by a lens unit 4 and a sensor unit 6, and the lens unit 4 is disposed on the sensor unit 6. The sensor unit 6 has a larger area than the lens unit 4, and thus the lens unit 4 is mounted on the center of the sensor unit 6 with an open area (forming a step) on the circumference of the sensor unit 6.

The lens unit 4 includes: a lens block 8 in which a convex lens part 20a, a glass substrate 16, and a concave lens part 24a are bonded together; a lens block 10 in which a concave lens part 28a, a glass substrate 26, and a convex lens part 32a are bonded together; a spacer 12; and a covering package 14, wherein the lens blocks 8 and 10 and the spacer 12 are stacked and bonded and covered by a covering package 14.

The lens block 8 has a plate-like glass substrate 16. On the glass substrate 16, there are formed an aperture stop 18 and a resin part 20, and under the glass substrate 12, there are formed an aperture stop 22 and a resin part 24.

On the approximately central part of the resin part 20, there is formed a convex-shaped convex lens part 20a. On the resin part 24, the other part than the convex lens part 20a is a non-lens part 20b. On the non-lens part 20b, there are formed: inclined parts 20c which are upwardly inclined from the convex lens part 20a toward the outer circumference; a flat part 20d; and an inclined parts 20e which are downwardly inclined.

In the approximately central part of the resin part 24, there is formed a concave-shaped concave lens part 24a. On the resin part 20, the other area than the concave lens part 24a is a non-lens part 24b. The non-lens part 20b is approximately flat.

The lens block 10 also has a plate-shaped glass substrate 26. On the glass substrate 26, there is formed a resin part 28, and under the glass substrate 26, there are formed an aperture stop 30 and a resin part 32.

In the approximately central part of the resin part 28, there is formed a concave-shaped concave lens part 28a. On the resin part 28, the other area than the concave lens part 28a is a non-lens part 28b. The non-lens part 28b is approximately flat.

On the approximately central part of the resin part 32, there is formed a convex-shaped convex lens part 32a. On the resin part 32, the other area than the convex lens part 32a is a non lens part 32b. The non-lens part 32b is approximately flat.

The resin parts 20, 24, 28, and 32 are made of molded photo-curable resin and are optically transparent. The convex lens part 20a, the concave lens part 24a, the concave lens part 28a, and the convex lens part 32 in the resin part 20, 24, 28, and 32 are lens effective sections that have a lens function (optical function).

Figure 2:
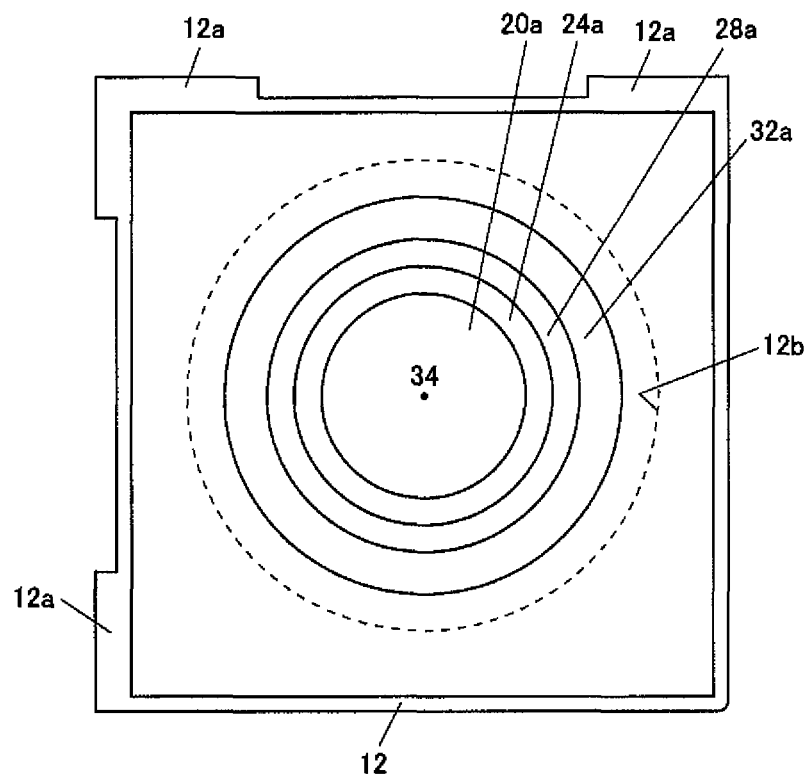
FIG. 2 is a diagram showing a plan view of the image pickup device with a package removed.

When the lens blocks 8 and 10 are viewed from the object side (the convex lens part 20a side), as shown in FIG. 2, the convex lens part 20a, the concave lens part 24a, concave lens part 28a, and the convex lens part 32a are concentrically arranged vertically so that these lens parts share an optical axis 34.

In addition, the spaces between those lens parts are set by controlling the thicknesses of the resin parts 20, 24, 28, and 32, and the thicknesses of the glass substrates 16 and 26. With this arrangement, there is no need for a spacer, which is used for a conventional lens, between the resin part 24 and the resin part 28.

Figure 3:
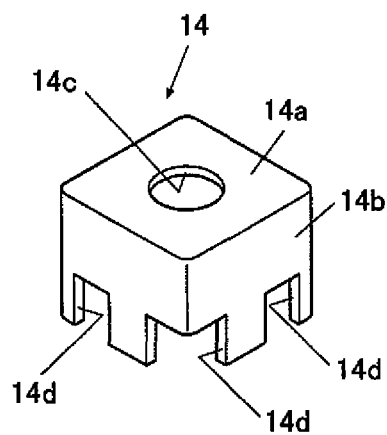
FIG. 3 is a perspective view showing a schematic configuration of the package.

As shown in FIG. 3, the covering package 14 has a bottomless box shape (lower side is open) and is made up of one rectangular upper panel 14a and four side panels 14b.

In the central part of the upper panel 14a, there is formed a circular shaped opening section 14c. In adjacent two side panels 14b of the four side panels 14b, there are formed three notch parts 14d (there is no notch part between the side panels 14b on the back side in FIG. 3).

As shown in FIG. 1, the lens unit 4 is assembled in the image pickup device 2 from the lower opening side of the covering package 14. In particular, the projection including the inclined parts 20c, the flat part 20d, and the inclined parts 20e of the lens block 8 are fit with the opening sections 14c of the covering package 14. The covering package 14 is mounted such that the package 14 is put in the step between the side surfaces of the lens blocks 8, 10 and the spacer substrate 12 and the side surface of the sensor unit 6

Figure 1B:
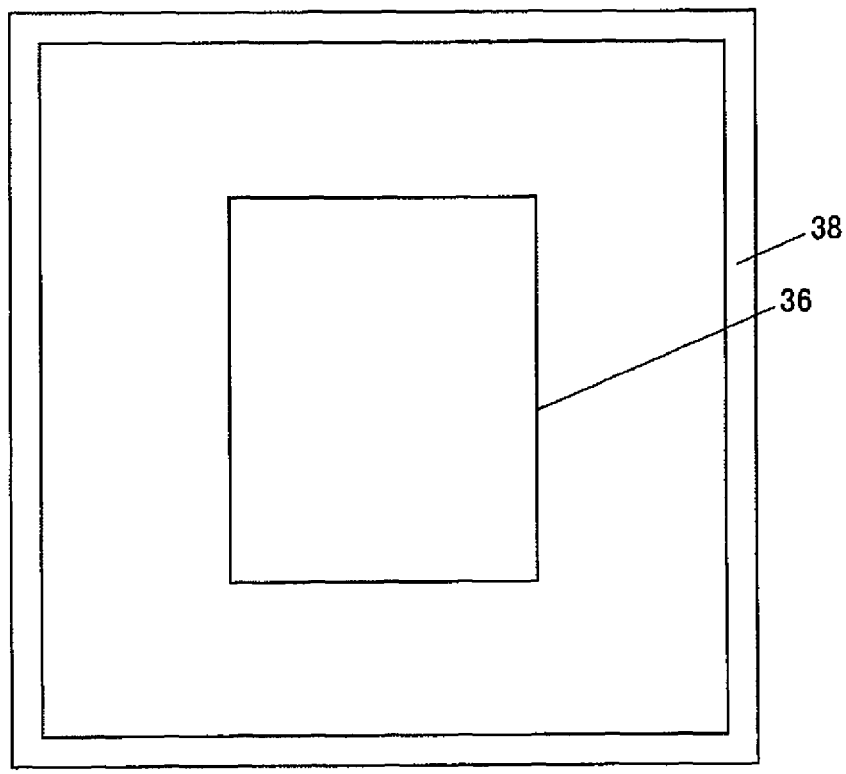
FIG. 1b is a schematic plan view of a sensor unit in the image pickup device.

As shown in FIGS. 1a and 1b, the sensor unit 6 is mainly made up of a sensor 36, a package 38, and a cover glass 40. The sensor 36 is a photo sensor for receiving light through the lens unit 4 and can photoelectrically convert the received light to output an electric signal to an external device (not shown). The package 38 has a shape of a box having a bottom plate, and its upper side is open. As shown in FIG. 1b, the sensor 36 is mounted on the approximately central part of the package 38. The cover glass 40 is provided as a lid body on the upper part of the package 38, and the sensor 36 is sealed in the space surrounded by the package 38 and the cover glass 40.

Figure 4:
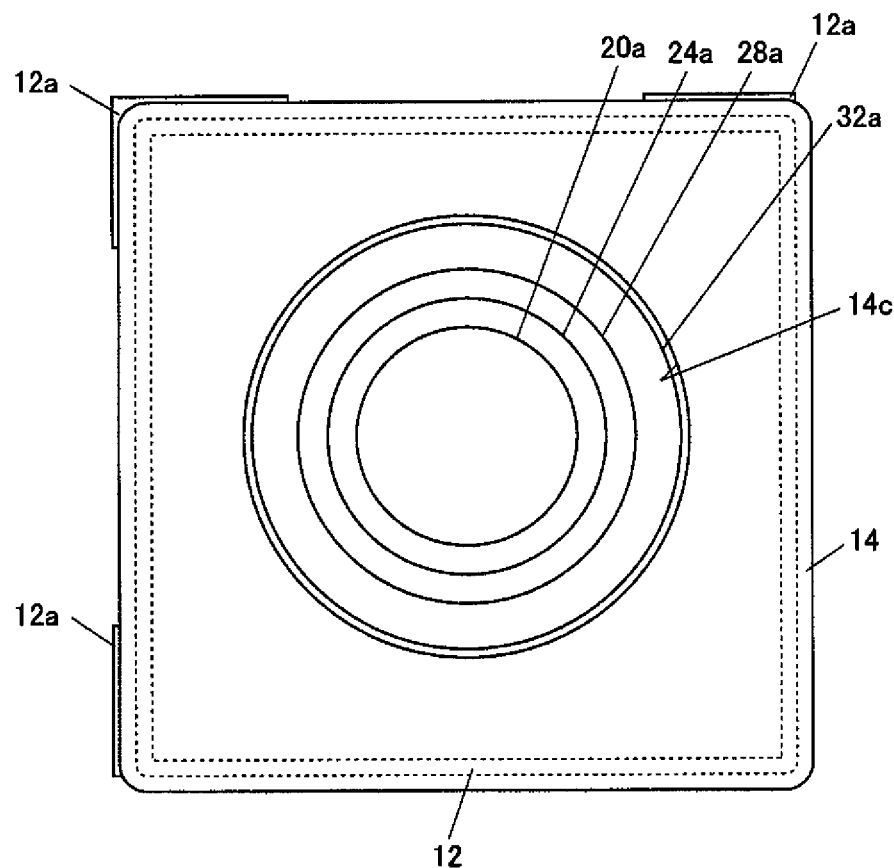
FIG. 4 is a diagram showing a plan view of the image pickup device with the package mounted.

As shown in FIG. 1a, the spacer 12 is located between the lens blocks 8, 10 and the sensor 36, providing a certain space between these components. As shown in FIG. 2 and FIG. 4, the spacer 12 has a rectangular frame shape, and in the adjacent two sides of the four sides and in the corner between the two, there are formed projections 12. The projections 12a extend outside (exposed) through the notch parts 14d of the covering package 14

In the spacer 12, there is formed a circular shaped opening section 12b. Inside the opening section 12b, there is provided an IR cut filter 42. The IR cut filter 42 is located above the cover glass 40 to block the infrared light entering the sensor 36.

FIG. 1 shows that the ER cut filter 42 is arranged between the cover glass 40 and the lens block 10; however, it is not necessarily arranged there and it may be integrated with the substrate such that the IR filter is split into two components, one on the object side and the other on the image side of the substrate (glass substrate 16) of the lens block 8, for example.

[Body of Stacked Wafer Lenses]

Figure 5:
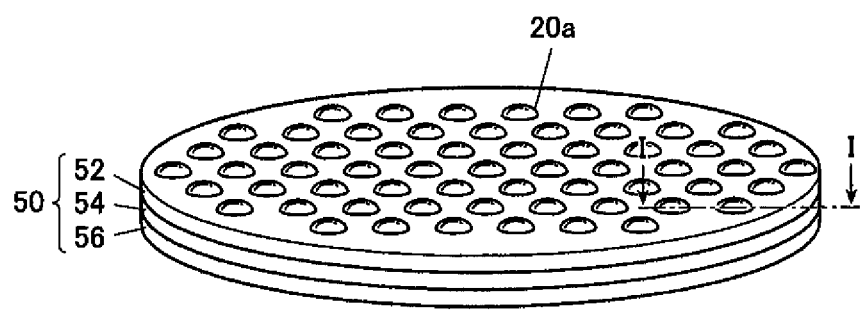
FIG. 5 is a plan view showing a schematic configuration of a body of stacked wafer lenses.

As shown in FIG. 5, the body of stacked wafer lenses 50 is mainly made up of the wafer lenses 52 and 54 and the spacer substrate 56, and these components are stacked.

Figure 6:
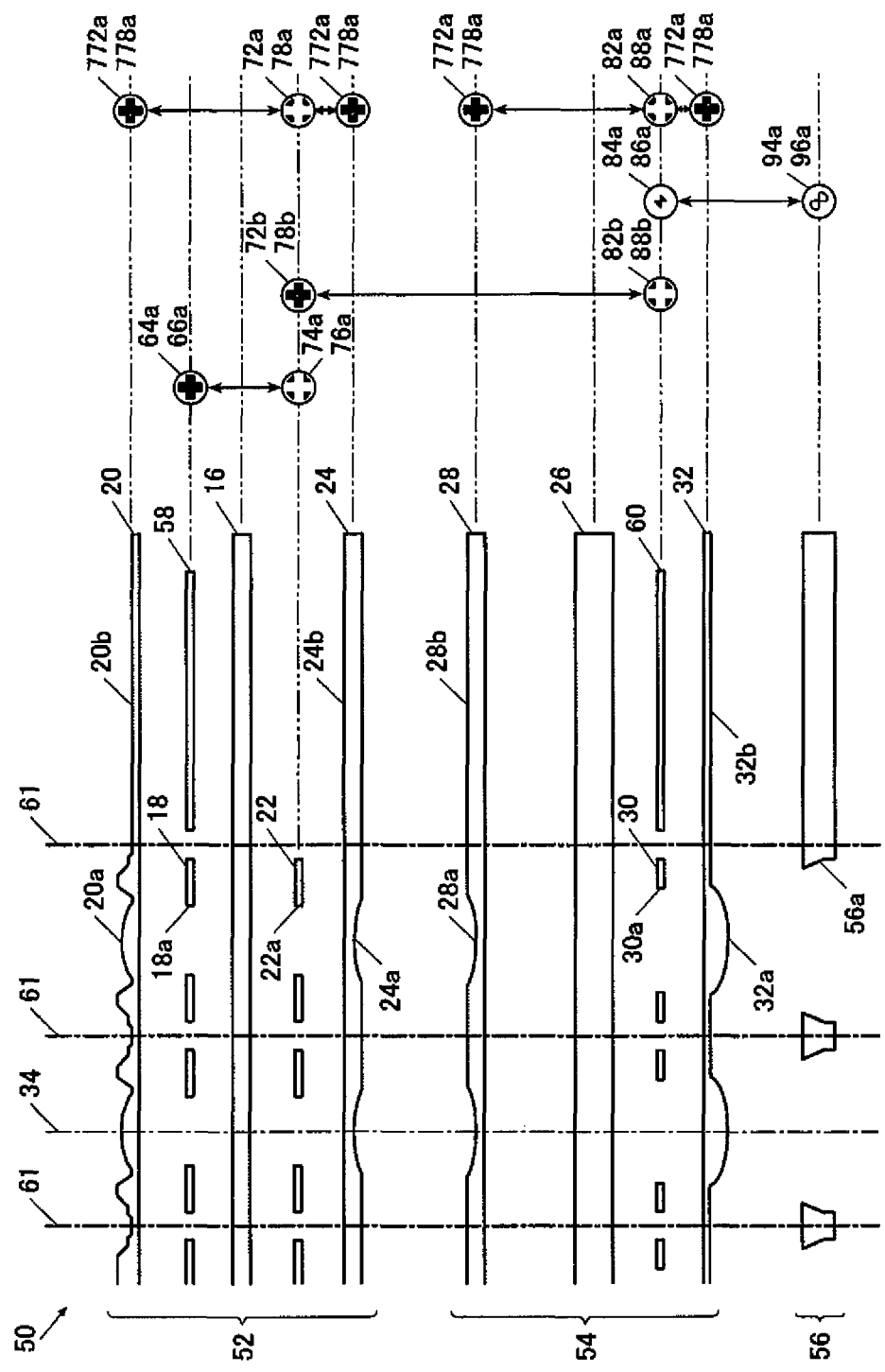
FIG. 6 is an exploded cross section along I-I line of FIG. 5.

As shown in FIG. 6, the wafer lens 52 has the wafer-shaped glass substrate 16. On the glass substrate 16, the aperture stop 18, an ID recording region 58, and the resin part 20 are formed.

Figure 7:
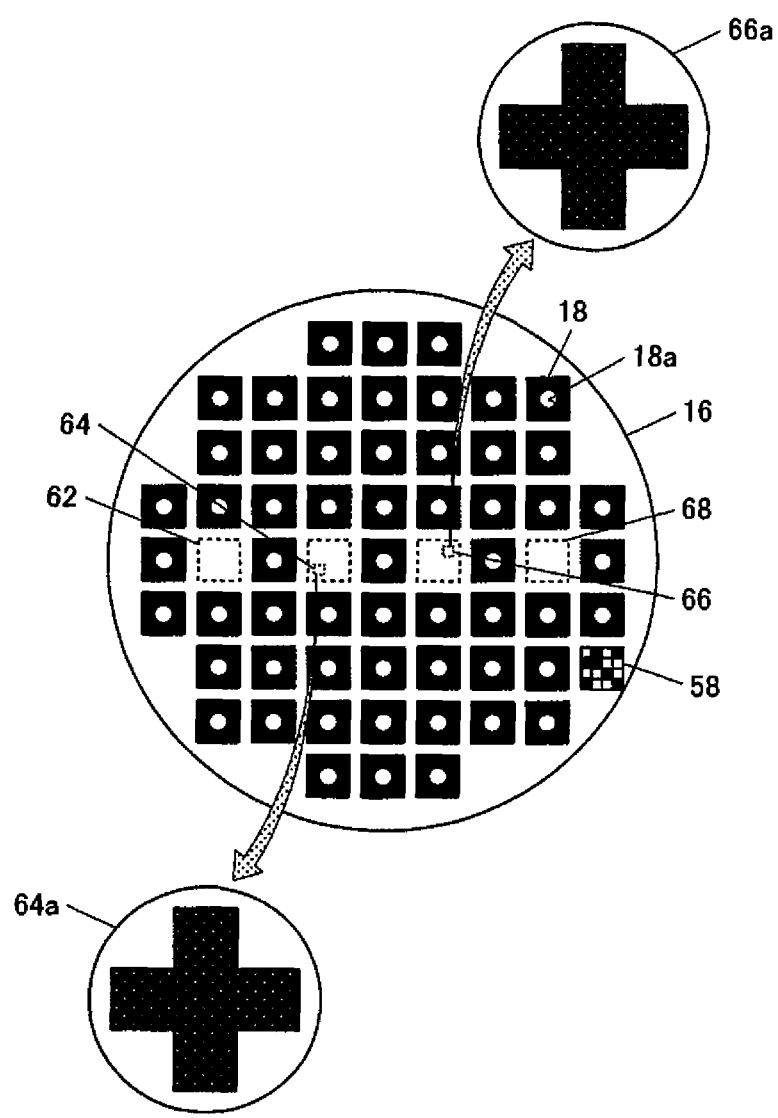
FIG. 7 is a plan view schematically showing S1 surface (aperture pattern) of a glass substrate of a wafer lens.

As shown in FIG. 7, the aperture stops 18 are formed in great number on the most part on the glass substrate 16. The aperture stop 18 has a rectangular shape, and in the central part thereof is formed a circular opening section 18a. The ID recording region 58 is formed on the neighboring part of the aperture stop 18.

The glass substrate 16 has four regions 62, 64, 66, and 68 where no aperture stop 18 is formed. In the inner regions 64 and 66, there are formed cross-shaped alignment marks 64a and 66a, one in each region.

The aperture stops 18, the ID recording region 58, and the alignment marks 64a and 66a are made of the same material, in particular, made of light-blocking photo resist. As the light-blocking photo resist, a photo resist containing carbon black is used.

The ID recording region 58 is constituted by a two-dimensional bar-code. The ID recording region 58 stores information by using predetermined digits of binary expressions, which information includes a wafer ID of the wafer lens 52. This information can be read by a bar-code reader.

As shown in FIG. 6, the aperture stops 18, the ID recording region 58 are covered by the resin part 20. The resin part 20 is formed on the surface of the glass substrate 16 on which the aperture stops 18 and the ID recording region 58 are formed, and the resin part 20 constitute the convex lens parts 20a and the non-lens part 20b.

Under the glass substrate 16, there are formed aperture stops 22 and a resin part 24.

Figure 8:
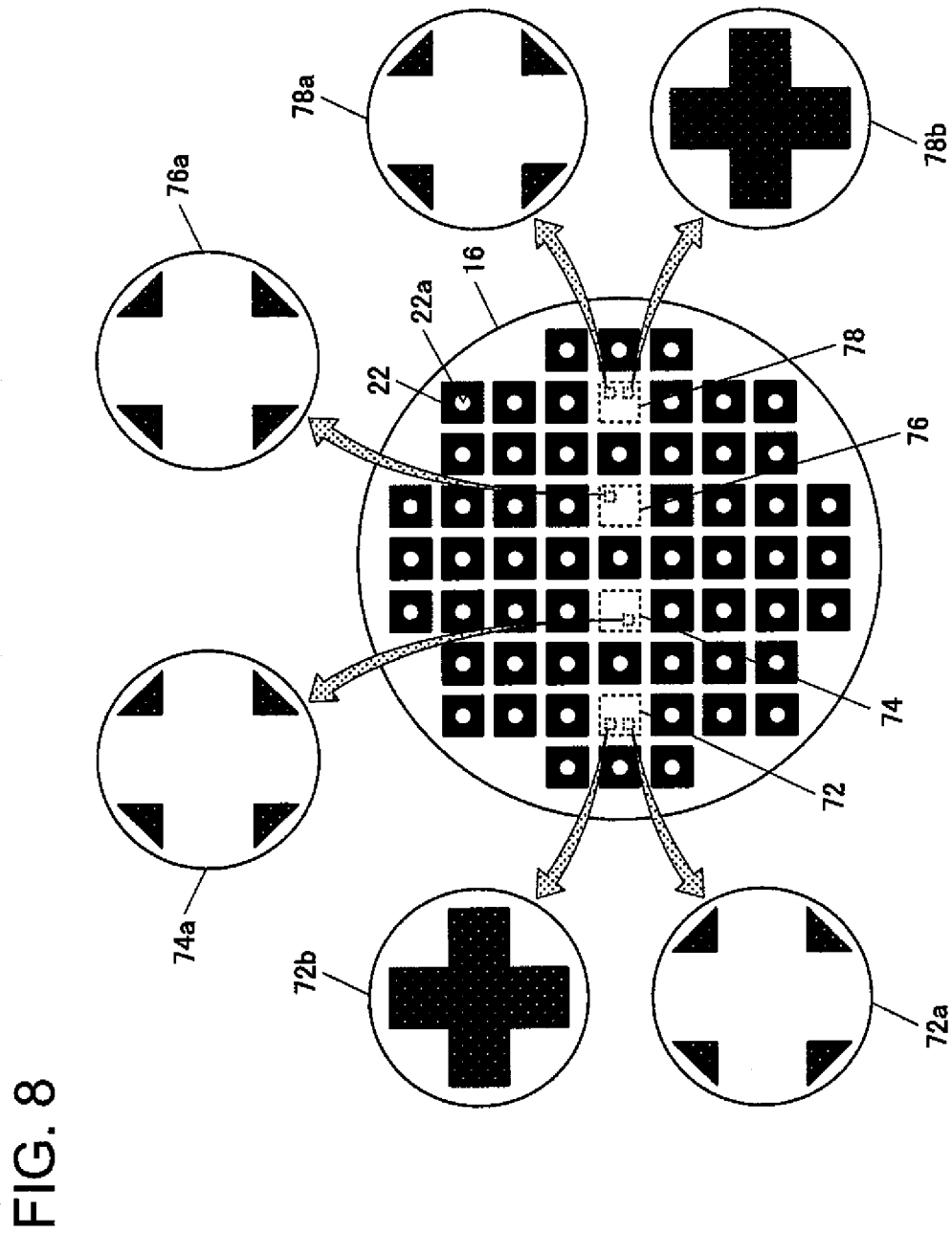
FIG. 8 is a plan view schematically showing S2 surface (aperture pattern) of the glass substrate of the wafer lens.

As shown in FIG. 8, the aperture stops 22 are formed in great number on the most part of the glass substrate 16. The aperture stop 22 has the same shape as the aperture stop 18, and on its central part, there is formed a circular shaped opening section 22a.

On the glass substrate 16, there are four regions 72, 74, 76, and 78, in which no aperture stop 22 is formed, at the positions corresponding to the aforementioned four regions 62, 64, 66, and 68, in which no aperture stop 18 is formed. In the outer regions 72 and 78, there are formed alignment marks 72a and 78a, on each of four corners of which align marks there is provided a triangular shape, and there are formed cross-shaped alignment marks 72b and 78b, respectively. In the inner regions 74 and 76, there are formed alignment marks 74a and 76a, and on each of four corners of the alignment marks there is provided a triangular.

The aperture stops 22, the alignment marks 72a, 72b, 74a, 76a, 78a, and 78b are also made of the similar light-blocking photo resist to that used for the aperture stops 18, the ID recording region 58, and alignment marks 64a and 66a.

The aperture stops 22 are covered by the resin part 24. The resin part 24 constitutes concave lens part 24a located coaxially with the convex lens parts 20a.

A part constituted by a set of the convex lens part 20; the aperture stop 18, the aperture stop 22, and the concave lens part 24a corresponds to one unit of the component; and these parts are combined with the wafer lens 54 and the spacer substrate 56, while these parts are held on the glass substrate 16 in great number, and is unitized.

As shown in FIG. 6, the wafer lens 54 has a glass substrate 26. On the glass substrate 26 there is formed a resin part 28. The resin part 28 constitutes concave lens parts 28a located coaxially with the convex lens parts 20a.

Under the glass substrate 26, there are formed aperture stops 30, an ID recording region 60, and resin parts 32.

Figure 9:
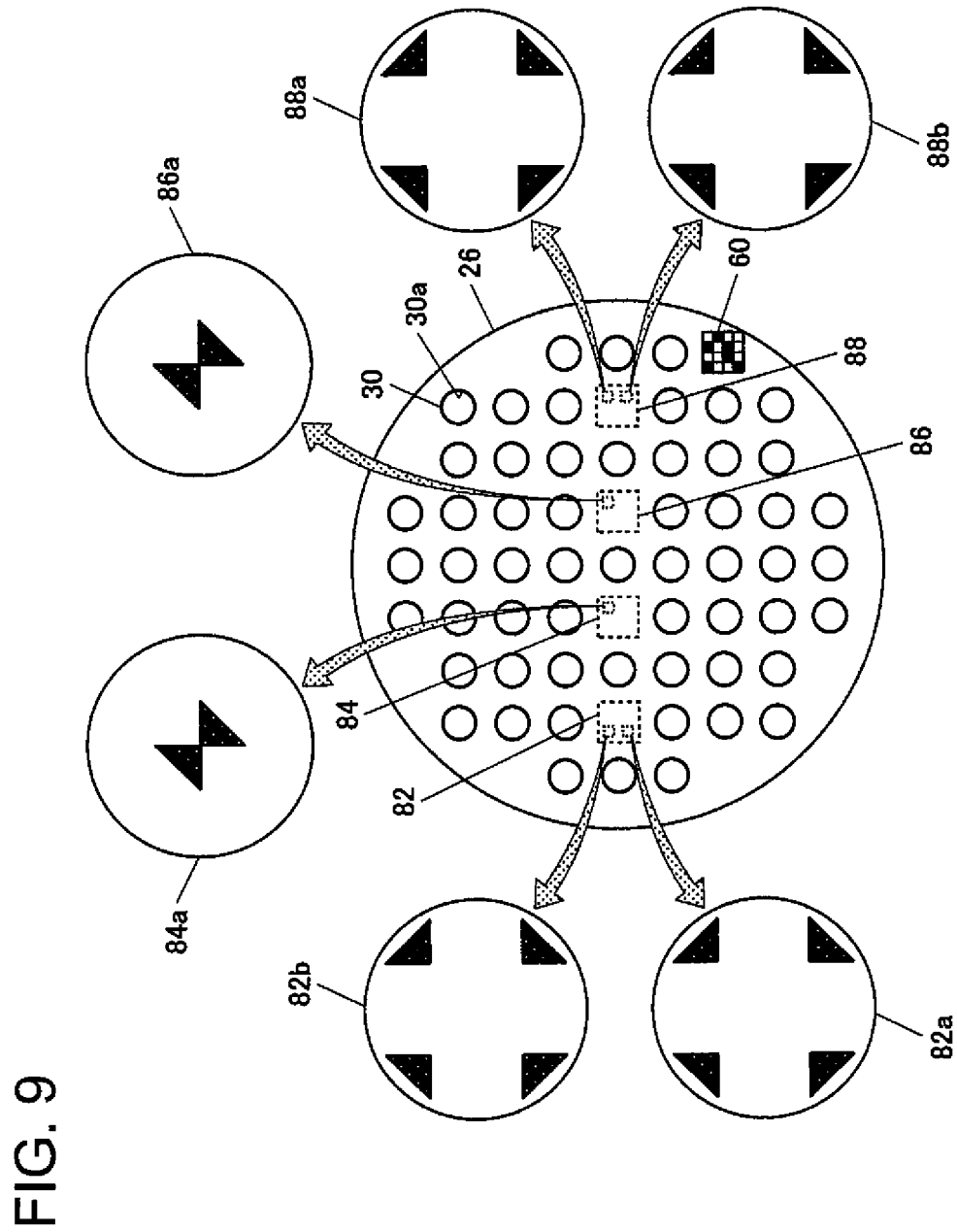
FIG. 9 is a plan view schematically showing S4 surface (aperture pattern) of the glass substrate of the wafer lens.

As shown in FIG. 9, the aperture stops 30 are formed in great number on most part on the glass substrate 26. The aperture stops 30 has a circular shape and have circular opening section 30a formed at the central part. The ID recording region 60 is formed in the neighboring region of the aperture stops 30.

On the glass substrate 26, there are four regions 82, 84, 86, and 88, in which no aperture stop 30 is formed, at positions corresponding to the four regions 72, 74, 76, and 78, in which the aforementioned aperture stop 22 is not formed. In the outer region 82 and 88, there are formed alignment marks 82a, 82b, 88; and 88b two marks for each region, at four corners of each of which marks there are triangular shapes. In the inner regions 84 and 86, there are provided two alignment marks 84a and 86a one for each region, in each of which marks there is provided two triangular shapes facing each other.

The aperture stops 30, the ID recording region 60, the alignment marks 82a, 82b, 84a, 86a, 88a, and 88b are also made of the similar light-blocking photo resist to that used for the aperture stops 18, the ID recording region 58, and alignment marks 64a and 66a.

The ID recording region 60 is similar to the ID recording region 58, and includes the wafer ID of the wafer lens 54.

As shown in FIG. 6, the aperture stops 30 and the ID recording region 60 are covered with the resin part 32. The resin part 32 is formed on the surface of the glass substrate 26 on which the aperture stops 30 and the ID recording region 60 are formed, and constitutes convex lens parts 32a located coaxially with the convex lens parts 20a.

A part constituted by a set of the concave lens part 28; the aperture stop 30, and the convex lens part 32a corresponds to one unit of the components, and these parts are combined with the wafer lens 52 and the spacer substrate 56, while these sets are held on the glass substrate 26 in great number, and are unitized.

Figure 10:
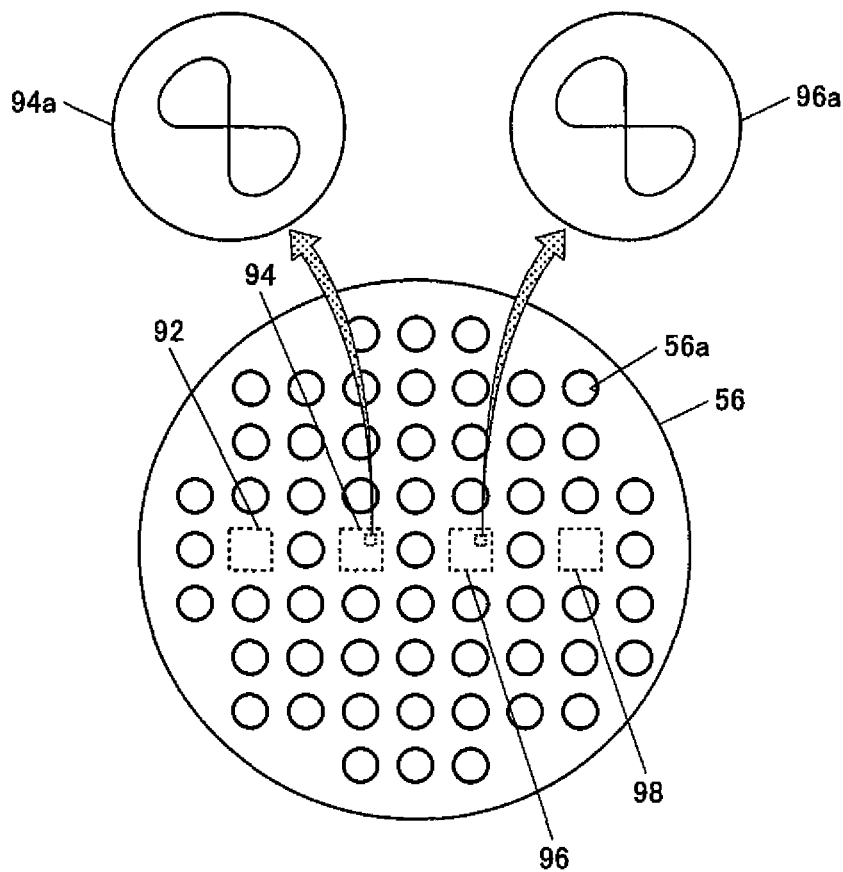
FIG. 10 is a plan view schematically showing a configuration of a spacer.

As shown in FIG. 10, the spacer substrate 56 is a glass flat plate similar to the glass substrates 16 and 26. In the spacer substrate 56, there are formed many circular shaped opening sections 56a.

On the spacer substrate 56, there are four regions 92, 94, 96, and 98 in which the opening section 56a is not formed. In the inner regions 94 and 96, there are formed figure-of-eight alignment marks 94a and 96a, one for each region.

The alignment marks 94a and 96a are also made of the similar light-blocking photo resist to that used for the aperture stops 18, the ID recording region 58, and the alignment marks 64a and 66a.

In the body of stacked wafer lenses 50, on the optical axis 34 of the convex lens part 20a, there are arranged the opening section 18a of the aperture stop 18, the opening section 22a of the aperture stop 22, the concave lens part 24a, the concave lens part 28; the opening section 30a of the aperture stop 30, the convex lens part 32a, and the opening section 56a of spacer substrate 56 (in order from the upper side to the lower side in FIG. 6), and these components are collectively cut along dicing lines 61 to make lens units 4 (see FIG. 1).

In the body of stacked wafer lenses 50, the regions 62, 64, 66, and 68 of the glass substrate 16, the regions 72, 74, 76, and 78 of the glass substrate 16, the region 82, 84, 86, and 88 of the glass substrate 26, and the regions 92, 94, 96, and 98 of the spacer substrate 56 are corresponding on one-to-one basis, and the alignment marks are used for alignment between the components (see FIG. 7-FIG. 10).

Alternatively, after the spacer substrate 56 and the body of the stacked wafer lenses 52 and 54 are respectively cut, they may be then aligned and bonded together.

In addition, the thus formed lens unit 4 is inserted into the covering package 14 from the lower position of the open side as shown in FIG. 1. In that case, on the covering package 14 and on the non-lens part of the most object side of the lens unit 4 such as the non-lens part 20b of FIG. 1, fitting parts may be formed so that they can taper-fit to each other, thus fitting the lens unit 4 makes the center of the opening section 14c of the covering package 14 and the optical axis of the lens unit 4 be matched.

[Lens Material]

The resin parts 20, 24, 28, and 32 are basically made of photo curable resin 44. As the resin 44, there can be used acrylic resin, allyl ester resin, epoxy resin, silicone resin, or the like. The acrylic resin and the allyl ester resin can be made to react and get cured by radical polymerization. The epoxy resin can be made to react and get cured by cationic polymerization.

The resin parts 20, 24, 28, and 32 may be made of thermosetting resin. By using thermosetting resin, other than the radical polymerization and the cationic polymerization, addition polymerization can be used in the case of silicone or the like.

The resin 44 is described in detail as the following sections (1)-(4).

(1) Acrylic Resin

There is no specific restriction in the (meth)acrylate used for polymerization, and the following (meth)acrylate manufactured by common manufacturing methods may be used. The followings are exemplified: ester(meth)acrylate, urethane(meth)acrylate, epoxy(meth)acrylate, ether(meth)acrylate, alkyl(meth)acrylate, alkylene(meth)acrylate, (meth)acrylate containing an aromatic ring, and (meth)acrylate containing an alicyclic structure. One or more than one of these can be used.

In particular, the (meth)acrylate containing an alicyclic structure is preferable, and the alicyclic structure may have an oxygen atom and a nitrogen atom. The followings are exemplified: cyclohexyl(meth)acrylate, cyclopentyl(meth)acrylate, cycloheptyl(meth)acrylate, bicycloheptyl(meth)actylate, tricyclodecyl(meth)acrylate, tricyclodecanedimethanol (meth)acrylate, isobornyl(meth)acrylate, and di(meth)acrylate of hydrogenated bisphenols. In addition, it is preferable that an adamantane skeleton is contained. The followings are exemplified, for example: 2-alkyl-2-adamantyl(meth)acrylate (Japanese Laid-Open Patent Application Publication No. 2002-193883), adamantyl di(meth)acrylate (Japanese Laid-Open Patent Application Publication No. 557-500785), adamantyl dicarboxylic diallyl (Japanese Laid-Open Patent Application Publication No. 860-100537), perfluoroadamantyl acrylic ester (Japanese Laid-Open Patent Application Publication No 2004-123687), 2-methyl-2 adamantylmethacrylate (manufactured by Shin-Nakamura Chemical Co., Ltd.), 1,3-adamantane diol diacrylate, 1,3,5-adamantane triol triacrylate, unsaturated carboxylic adamantyl ester (Japanese Laid-Open Patent Application Publication No. 2000-119220), 3,3'-dialkoxycarbonyl-1,1'-biadamantane (Japanese Laid-Open Patent Application Publication No. 2001-253835), 1,1'-biadamantane compound (U.S. Pat. No. 3,342,880), tetraadamantane (Japanese Laid-Open Patent Application Publication No. 2006-169177), 2-alkyl-2-hydroxyadamantane, 2-alkylene adamantane, curable resin (Japanese Laid-Open Patent Application Publication No. 2001-322950) such as 1,3-adamantane dicarboxylic di-tert-butyl, which does not contain an aromatic ring, bis(hydroxyphenyl)adamantanes containing an adamantane skeleton, and bis(glycidyloxyphenyl)adamantane (Japanese Laid-Open Patent Application Publication No. H11-35522, Japanese Laid-Open Patent Application Publication No. H10-130371).

In addition, other reacting monomers may be contained. As (meth)acrylate, the followings are exemplified: methyl acrylate, methyl methacrylate, n-butyl acrylate, n-butyl methacrylate, 2-ethylhexyl acrylate, 2-ethylhexyl methacrylate, isobutyl acrylate, isobutyl methacrylate, tert-butyl acrylate, tert-butyl methacrylate, phenyl acrylate, phenyl methacrylate, benzil acrylate, benzil methacrylate, cyclohexyl acrylate, cyclohexyl methacrylate, and the like.

As multifunctional (meth)acrylate, the following materials are exemplified: trimethylolpropane tri(meth)acrylate, pentaerythritol tetra(meth)acrylate, pentaerythritol tri(meth)acrylate, dipentaerythritol hexa(meth)acrylate, dipentaerythritol penta(meth)acrylate, dipentaerythritol tetra(meth)acrylate, dipentaerythritol tri(meth)acrylate, tripentaerythritol octa(meth)acrylate, tripentaerythritol septa(meth)acrylate, tripentaerythritol hexa(meth)acrylate, tripentaerythritol penta(meth)acrylate, tripentaerythritol tetra(meth)acrylate, tripentaerythritol tri(meth)acrylate, and the like.

(2) Allyl Ester Resin

This is a resin which has an allyl group and gets cured by radical polymerization, and the following resins are exemplified without being restricted thereto.

The following materials are exemplified: bromine-containing (meth)allyl ester containing no aromatic ring (Japanese Laid-Open Patent Application Publication No. 2003-66201), allyl(meth)acrylate (Japanese Laid-Open Patent Application Publication No. H5-286896), allyl ester resin (Japanese Laid-Open Patent Application Publication No. H5-286896, Japanese Laid-Open Patent Application Publication No. 2003-66201), copolymer of acrylic ester and epoxy group containing unsaturated compound (Japanese Laid-Open Patent Application Publication No. 2003-128725), acrylate compound (Japanese Laid-Open Patent Application Publication No. 2003-147072), and acryl ester compound (Japanese Laid-Open Patent Application Publication No. 2005-2064).

(3) Epoxy Resin

As epoxy resin, there is no restriction as long as it contains an epoxy group and is polymerized and cured by light or heat, and as a curing initiator, anhydride of acid, cation generating agent, or the like can be used. Epoxy resin is preferable since it has a small hardening shrinkage rate and makes a lens having a high casting precision Examples of a kind of epoxy include: novolac phenol-type epoxy resin, biphenyl-type epoxy resin, dicyclopentadiene-type resin. Examples include: bisphenol F diglycidylether, bisphenol A diglycidylether, 2,2'-bis(4-glycidyloxycyclohexyl)propane, 3,4-epoxycyclohexymethyl-3,4-epoxycyclohexanecarboxylate, vinylcyclohexene dioxide, 2-(3,4-epoxy-cyclohexyl)-5,5-spiro-(3,4-epoxycyclohexane)-1,3-dioxane, bis(3,4-epoxycyclohexyl)adipate, 1,2-cyclopropanedicarboxylicacidbisglycidyleste, and the like.

A curing agent is used to constitute the curable resin and is not specifically restricted. In addition, in the present invention, when the transparency of the curable resin and that of optical material containing additive agents are compared, the curing agent is not supposed to be included in the additive agent.

As a curing agent, anhydride acidic curing agent or phenolic curing agent is preferably used. Specific examples of anhydride acidic curing agent include: phthalic anhydride, maleic anhydride, trimellitic anhydride, pyromellitic anhydride, hexahydrophthalic anhydride, 3-methyl-hexahydrophthalic anhydride, 4-methyl-hexahydrophthalic anhydride, or mixture of 3-methyl-hexahydrophthalic anhydride and 4-methyl-hexahydrophthalic anhydride, tetrahydrophthalic anhydride, nadic anhydride, methyl nadic anhydride, and the like.

In addition, curing accelerator is contained if required. There is no specific restriction on curing accelerator as long as it has good curing characteristics, is colorless, and does not impair the clarity of the thermosetting resin, but for example, the following materials can be used alone, or two or more of them can be mixed to use: imidazoles such as 2-ethyl-4-methylimidazole (2E4MZ), tertiary amine, quaternary ammonium salt, bicyclic amidines and their derivatives such as diazabicycloundecene, phosphine, phosphonium salt, and the like.

(4) Silicone Resin

Silicone resin having a siloxane bond whose principal chain is an Si—O—Si can be used. As such silicone series resin, silicone series resin made of predetermined amount of polyorganosiloxane resin can be used (for example, Japanese Laid-Open Patent Application Publication No. H 6-9937).

There is no specific restriction on thermosetting polyorganosiloxane resin as long as it forms three-dimensional network of siloxane-bond skeleton by heated continuous hydrolytic degradation-dehydration condensation reaction, high temperature, and it is hardened after a long time heating and is hard to be soften again by heating after it is once hardened.

Such polyorganosiloxane resin has the following general expression (A) as a structural unit, and its structure may be any one of a chain structure, a cyclic structure, and a network structure.

$$((R_1)(R_2)SiO)_n \qquad (A)$$

where: $R_1$ and $R_2$ each represent a homosubstituted, heterosubstituted unsubstituted, or nonsubstituted monovalent hydrocarbon group. In particular, as $R_1$ and $R_2$ the following materials are exemplified: methyl group, ethyl group, propyl group, alkyl group such as butyl group, vinyl group, alkenyl group such as allyl group, phenyl group, allyl group such as tolyl group, cyclohexyl group, alkyl group such as cyclooctyl group, or group in which hydrogen atom bonded to a carbon atom of these groups is replace by a halogen atom, cyano group, amino group, or the like, for example, examples including: chloromethyl group, 3,3,3-trifluoropropyl group, cyanomethyl group, γ-aminopropyl group, N-(β-aminoethyl)-γ-aminopropyl group, and the like. $R_1$ and $R_2$ may be one selected from hydroxyl group and alkoxy group. In addition, n in the above general expression (A) represents an integer of 50 or more.

When the polyorganosiloxane resin is used, it is generally dissolved in hydrocarbon series solvent such as toluene, xylene, or petroleum series solvent or in a mixture of these materials and polar solvent. In addition, materials of different compositions may be contained as long as they dissolve each other.

There is no specific restriction on a method for manufacturing the polyorganosiloxane resin, and any known method may be used. The polyorganosiloxane resin is obtained by hydrolysising or alcoholysising, for example, a mixture of one kind or more of organohalogenosilane, and the polyorganosiloxane resin generally contains hydrolyzable group of silanol group, alkoxy group, or the like, and their content is 1-10% by mass in silanol group equivalent.

There reactions are usually conducted under the existence of solvent which can dissolve the organohalogenosilane. In addition, it can be obtained also by a method for synthesizing block copolymer by cohydrolysising organo trichloro silane and straight-chain polyorganosiloxane which has a hydroxy group, an alkoxy group, or a halogen atom on its molecular chain end. Thus obtained polyorganosiloxane resin usually has residual HCl, but it is preferable to use one containing 10 ppm or less of HCl, or more preferable to use one containing 1 ppm of HCl or less for the compound of the embodiment, for excellent preservation stability.

[Concave Die (Master Mold)]

Figure 11:
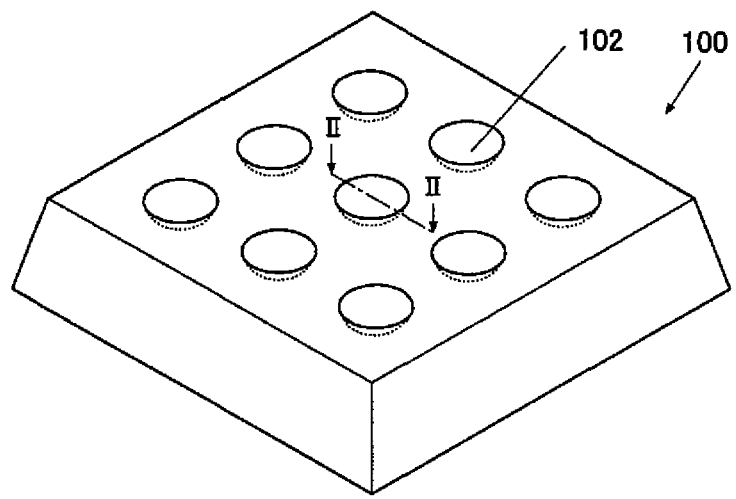
FIG. 11 is a perspective view showing a schematic configuration of a concave die.

As shown in FIG. 11, a concave die 100 has an approximate cuboid shape, and on its surface there are formed a plurality of depressions 102 (cavities). The die 100 is an example of dies for a wafer lens.

Figure 12:
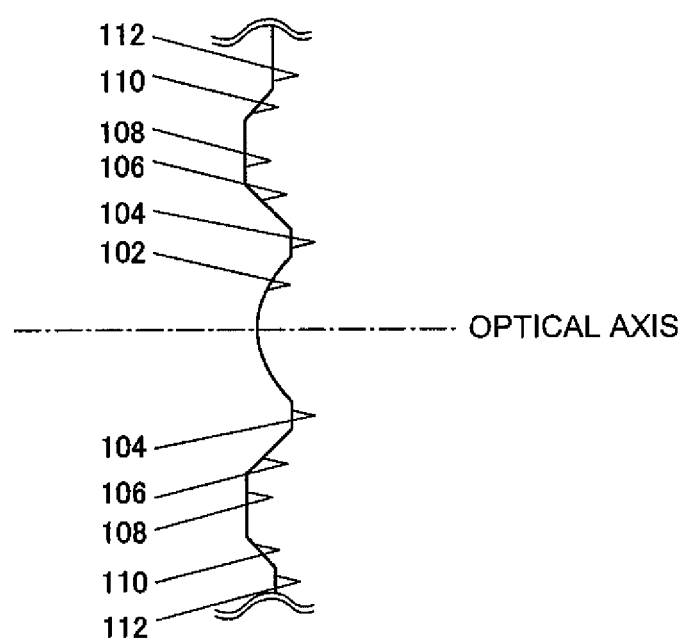
FIG. 12 is a cross section along II-II line of FIG. 11.

Close observation of the cross section of a block in which the depression 102 is formed shows, as shown in FIG. 12, that in the vicinity of the depression 102 there are formed a flat part 104, a declined surface part 106, a flat part 108, a declined surface part 110, and a flat parts 112, and these regions are concentrically formed, being centered at the depression 102. The central part of the depression 102 orthogonally intersects with the optical axis (the optical axis of an optical system to be molded by the concave die 100). Instead of an approximate cuboid, the die 100 may have an approximate circular cylindrical shape or a divided circular shape.

[Material of Concave Die]

The concave die 100 is generally made by metal. Examples of the metal material include iron-based material, iron-based alloy, and non-ferrous alloy.

Examples of iron based material include: hot work tool steel, cool work tool steel, plastic mold steel, high-speed tool steel, rolled steel for general structure, carbon steel for structural use, chromium-molybdenum steel, and stainless steel. Among them, examples of the plastic mold steel include pre-hardened steel, quenching and tempered steel, and age hardening steel. Examples of the pre-hardened steel include SC-based steel, SCM-based steel, and SUS-based steel. Examples of the SC-based steel include PXZ. As SCM-based steel, examples include HPM2, HPM7, PX5, and IMPAX. As SUS-based steel, examples include HPM38, HPM77, S-STAR, G-STAR, STAVAX, RAMAX-S, and PSL.

Examples of the iron-based alloy include the alloys disclosed in Japanese Laid-Open Patent Application Publications No. 2005-113161 and No. 2005-206913.

As non-ferrous alloy, the followings are well-known: copper alloy, aluminum alloy, and zinc alloy, and examples include alloys disclosed in Japanese Laid-Open Patent Application Publications No. H10-219373 and No. 2000-176970.

The concave die 100 may be made of metallic glass or amorphous alloy.

Examples of the metallic glass include PdCuSi and PdCuSNi. A metallic glass has a high machinability in cutting by diamond and causes little wear.

Examples of the amorphous alloy include non-electrically or electrically plated nickelphosphor, and they have excellent drape performance in cutting by diamond. These high cutting-performance materials may constitute whole the concave die 100, or only a surface of an optical surface transfer surface may be covered by a plating method or a sputtering method

[Cutting Machine]

Figure 13A:
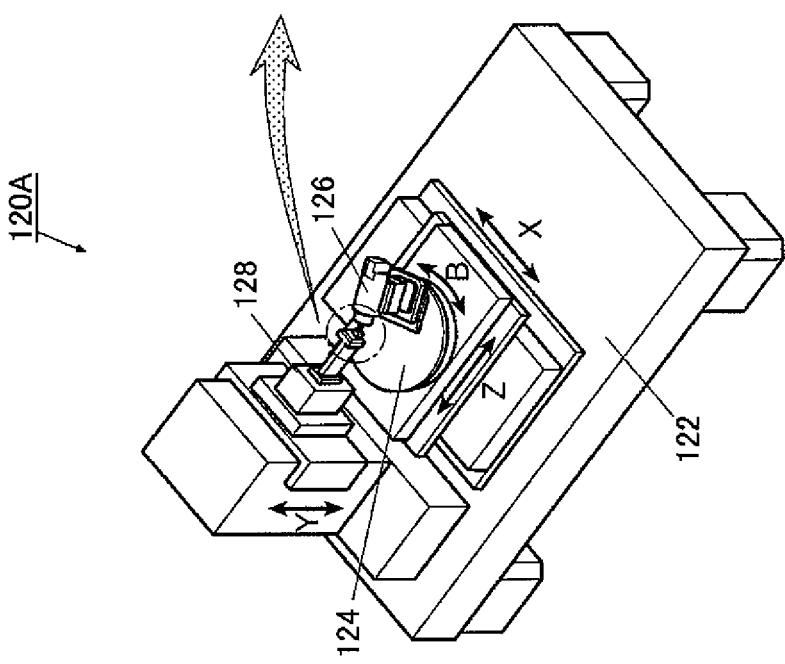
FIG. 13Aa is a perspective view of a schematic configuration of a cutting machine.
Figure 13A:
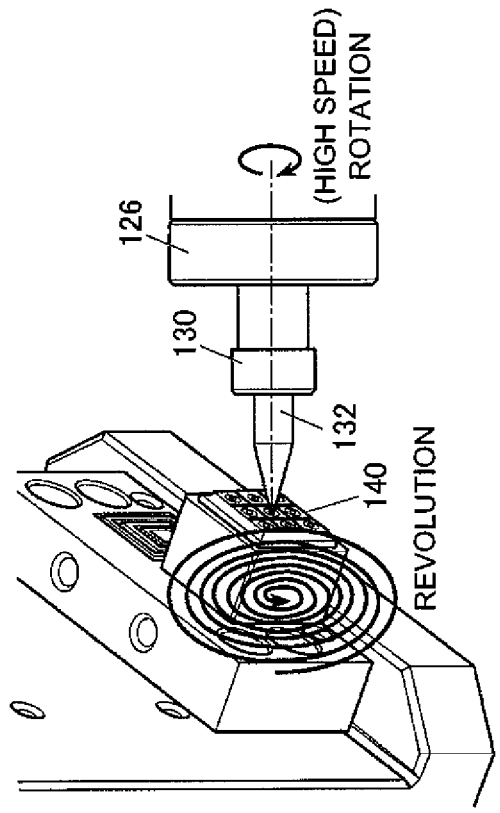

A cutting machine, which is a device for manufacturing a die, is described here. As shown in FIG. 13Aa, a cutting machine 120A has a surface plate 122. On the surface plate 122, there is provided a stage 124 having a straight guide rod and a rotation shaft. The stage 124 can move in an X-axis direction and a Z-axis direction, and rotate along a B-axis direction. On the stage 124 there is provided a spindle 126.

On the surface plate 122, there is provided a fixture 128 for fixing an object to be cut (work). On the surface plate 122, the spindle 126 and the fixture 128 are arranged to face each other. The fixture 128 can move in a Y-axis direction so that the spindle 126 and the work can relatively move.

The spindle 126 has a spindle motor therein. As shown in FIG. 13Ab, on a shaft 130 of the spindle motor there is mounted a ball end mill 132.

The spindle 126, on which the ball end mill 132 as a rotating tool is provided, is preferably a spindle equipped with an air bearing to precisely machine the optical surface. As an engine for rotating source for the spindle 126, examples include a spindle motor type having therein a spindle motor and an air turbine type which is supplied with high pressure air. The spindle motor type is preferably used as the engine to realize high rigidity.

As shown in FIG. 14, on the end part of the ball end mill 132 there is secured a cutting blade 134. The cutting blade 134 is made of a single-crystal diamond.

Figure 14A:
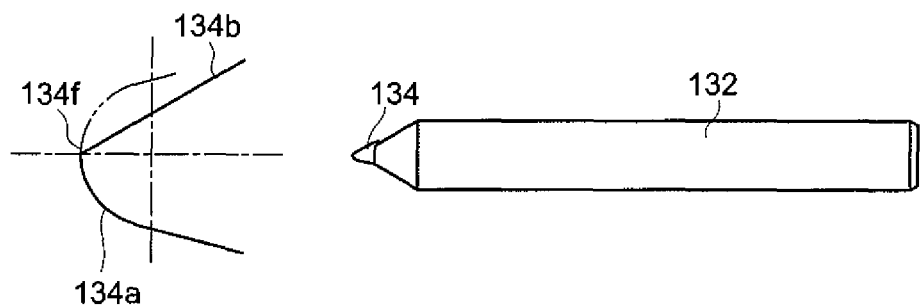
FIG. 14a is a plan view of a schematic configuration of a ball end mill.
Figure 14B:
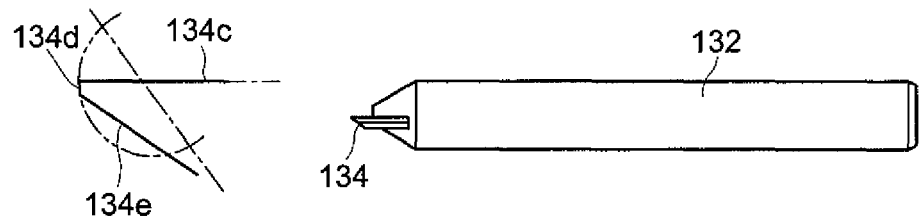
FIG. 14b is a side view of a schematic configuration of the ball end mill.

As shown in FIG. 14a, a plan view of the cutting blade 134 shows that the cutting blade 134 has an arc part 134a and a straight part 134b. As shown in FIG. 14b, the side view of the cutting blade 134 shows that the cutting blade 134 has a straight parts 134c, 134d, and 134e. The arc part 134a, the straight parts 134b-134e are the ridge lines between the surfaces constituting the cutting blade 134.

On the spindle 126, the rotation of the spindle motor makes the cutting blade 134 rotate describing a hemispheric locus (see two-dot chain line of FIG. 14). In this case, the intersection of the arc part 134a, the straight parts 134b, 134c, and 134d is a rotation center 134f of the spindle 126, and the rotation center 134f does not substantially rotate.

Instead of the cutting machine 120A of FIG. 13A, a cutting machine 120B of FIG. 13B may be used.

As shown in FIG. 13Ba, in the cutting machine 120B, a spindle 126 (ball end mill 132) can rotate in an A-axis direction and a C-axis direction. The rotation axes of the A-axis, the B-axis, and the C-axis are perpendicular to each other. The other part of the configuration of the cutting machine 120B is the same as the cutting machine 120A (see FIG. 13Bb).

In the cutting machine 120B, the ball end mill 132 can be posture controlled such that the following two normal lines are always parallel: a normal line from any point on the end cutting blade (cutting blade 134) of the ball end mill 132 to the profile line of the end chip of the cutting blade; and a normal line of the worked surface. As a result, the machining is performed only at a point on the end chip of the tool blade (cutting blade 134), and thus the shape to be made cannot largely affected by the error of the profile line of the end chip of the tool blade.

[Manufacturing Method of Concave Die]

As shown in FIG. 15, the concave die 100 is generally manufactured by steps (a) to (g):

(a) A prepared work 140 is subjected to a blank machining in a predetermined region;

(b) A predetermined region of the work 140 is subjected to a non-electric plating of nickelphosphor to form a plating layer 142;

(c) By using a general-purpose machining center, the surface of the work 140 (plating layer 142) is subjected to rough machining to form an original form (concave-convex shape) such as depressions 102;

(d) The roughly machined surface of the work 140 is polished to make it smooth;

(e) The depression 102 is subjected to finish machining using a diamond cutting blade; and (f) The surface of the work 140 is subjected to a flattening process to make a reference surface, and on the reference surface there are formed alignment marks 144.

The reference surface is a reference surface for adjusting the elevation with respect to other component. In addition, the alignment mark 144 is used to align the die with other component.

Depending on the surface status of the machined surface (reference surface), polishing should be performed to smoothen the surface after steps (e) and (f).

(g) The work 140 is cleaned to remove swarf, then an SiO₂ film is formed on the surface of the work 140, and mold-release agent is applied. The mold-release agent is used to facilitate a molded article to be released from the concave die 100.

The SiO₂ film functions as an under layer of the applied mold-release agent. The SiO₂ film is formed by a vapor deposition or a CVD. In order to form a SiO₂ film having a uniform thickness on the surface of the work 140, a CVD is preferably used.

In step (e), the cutting machine 120A is basically used.

As shown in FIG. 13Ab, the spindle motor of the spindle 126 is powered to rotate the ball end mill 132 at a high speed. In addition to that, the stage 124 is moved in the X-axis direction and Z-axis direction in combination with the movement of the fixture 128 in the Y-axis direction so as to revolve the ball end mill 132 with respect to the work 140. In other words, the ball end mill 132 is rotated and spirally revolved to finish machine the surface of the depression 102.

Figure 16:
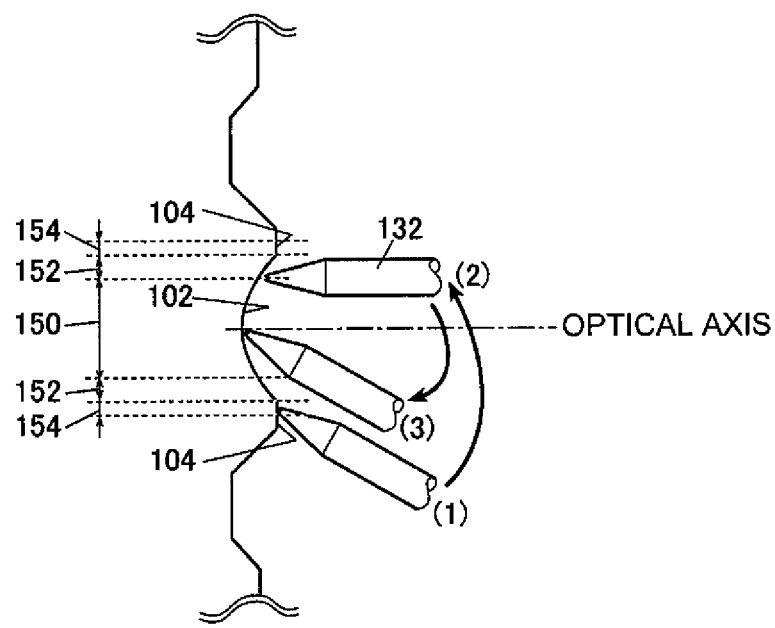
FIG. 16 is a diagram schematically showing a finish machining.

In step (e), the depressions 102 and a part of or the whole of the flat part 104 are machined. As shown in FIG. 16, in this step, the posture of the ball end mill 132 is changed for each of regions 150, 152, and 154.

The region 150 is located on the center of the depression 102 and includes the region orthogonally intersecting with the optical axis. The "region including a region perpendicular to the optical axis" represents, as described below, the region which is in the surface under formation of the depression 102 and with which the deviated rotation shaft does not interfere when the rotation shaft of the ball end mill 132 is inclined from the optical axis by a predetermined angle; and represents at least the area to the point at which the angle between the following two lines are not 0 anymore: the line perpendicular to the rotation shaft of the ball end mill 132 included from the optical axis of the depression 102; and the tangential line at the intersection between the included rotation shaft line and the surface under formation of the depression 102 (0 degree means that the rotation shaft center of the inclined is still in contact with the surface under construction of the depression 102).

The region 152 is a circumferential area of the depression 102 and is adjacent to the region 150.

The region 154 is part of or the whole of the flat part 104 and is adjacent to the region 152.

Especially in step (e), the machining is done front the region 154 through the region 152 to the region 150 in this order while the ball end mill 132 is being spirally revolved (see FIG. 13Ab): (1) in the region 154, the rotation shaft of the ball end mill 132 is slightly inclined from the optical axis; (2) in the region 152, the rotation shaft of the ball end mill 132 is set parallel to the optical axis; and (3) in the region 150, the rotation shaft of the ball end mill 132 is again slightly inclined from the optical axis.

It is preferable that in the posture variation of the ball end mill 132 from the region 154 to the region 152, or from the region 152 to the region 150, the variation of the posture should be completed in one cycle of revolution (one revolution of the ball end mill 132).

It is further preferable that in the regions 150 and 154, the ball end mill 132 is revolved keeping the viewing angle to be 10-90% of the inclination angle of the ball end mill, with which inclination angle the ball end mill 132 is mounted.

Figure 17:
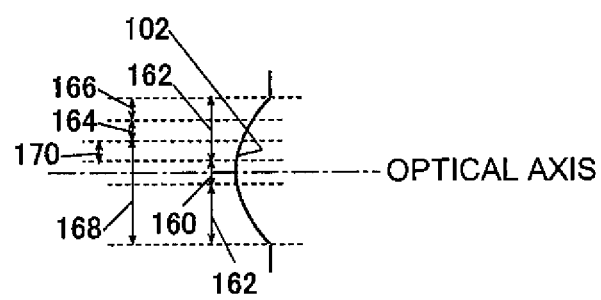
FIG. 17 is a diagram schematically showing a principle of the finish machining.

The posture of the ball end mill 132 is varied according to the following principle (see FIG. 17).

If the rotation shaft of the ball end mill 132 is kept parallel to the optical axis, the rotation center 134$f$ is in contact with the region 160 on the center of the depression 102 containing the optical axis and is dragged by the revolving operation of spindle 126, but the rotation center 134$f$ is not in contact with the surrounding region 162. In contrast, if the rotation shaft of the ball end mill 132 is inclined from the optical axis, the rotation center 134$f$ is in contact with a certain region 164 of the depression 102 apart from the optical axis and is dragged by the revolving operation of the spindle 162, and the rotation center 134$f$ is not in contact with the surrounding region 166 or 168.

Thus, the posture variation of the ball end mill 132 in a region 170 between the region 160 and the region 164 prevents the rotation center 134$f$ from being dragged in the region 160 and the region 164.

Figure 18A:
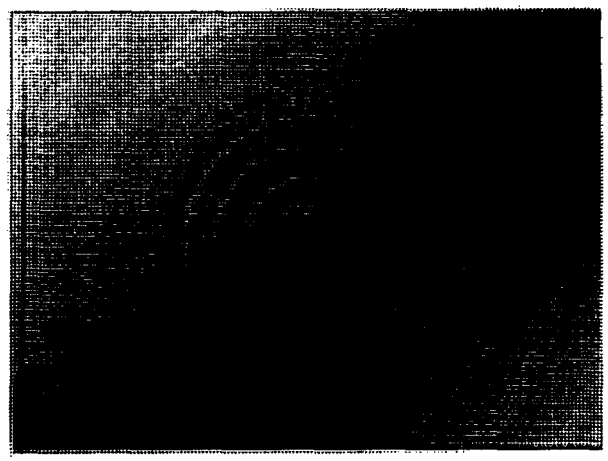
FIG. 18 is a microscopic photograph showing a cavity of a molding die having being subjected to the finish machining.
Figure 18B:
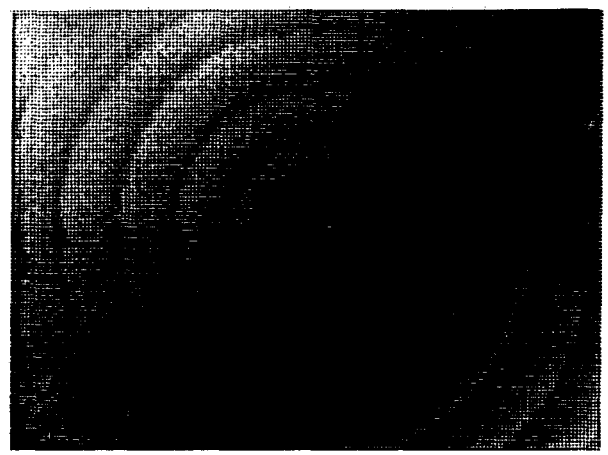

If the rotation shaft of the ball end mill 132 is kept parallel to the optical axis, since the rotation center 134$f$ is dragged, in the state of no rotation, by the revolving operation of the spindle 162, a concave-convex shaped machined flaw is formed in the region 160 of the depression 102 as shown in FIG. 18$a$. Also in the case that the rotation shaft of the ball end mill 132 is kept inclined from the optical axis, the similar phenomenon is occurred.

In contrast, if the posture of the ball end mill 132 is varied in the region 170 from the position parallel to the optical axis to the position inclined from the optical axis, the rotation center 134$f$ cannot be in contact with the depression 102, whereby a machined flaw is prevented as shown in FIG. 18$b$.

In addition, the posture variation of the ball end mill 132 may cause the error in the central position of the revolution of the spindle 126. This error can be corrected.

In step (e), the cutting machine 120B may be used. Also in the case of using the cutting machine 120B, similar to the case of using the cutting machine 120A, the spindle motor of the spindle 126 is powered to make the ball end mill 132 rotate at a high speed as shown in FIG. 13Bb. In addition to that, the stage 124 is moved in the X-axis direction and the Z-axis direction in combination with the movement of the fixture 128 in the Y-axis direction so as to revolve the ball end mill 132 with respect to the work 140.

In this operation, the ball end mill 132 is also rotated in the A-axis direction and the C-axis direction and is spirally revolved so as to finish machine the surface of the depression 102 while the machining is performed always at one position of the tool blade (cutting blade 134).

Also in step (f), the cutting machine 120A or 120B is used. In this step, the ball end mill 132 is replaced by a square end mill, and the square end mill is rotated and revolved to perform a flattening process on the surface of the flat part 104 (the region other than the region which is finish machined), 108, and 112. As a result, the flat part 104, 108, and 112 are efficiently subjected to the flattening process.

The square end mill is an end mil, the locus of the profile line of which end mil is a circular cylinder shape or a circular truncated cone shape while the end mil rotates.

In step (f), the square end mill may be replaced by a radius end mill having a partially R-shaped blade. Of course, in the step following step (e), the ball end mill 132 can be used for the flattening process without being replaced.

Figure 19A:
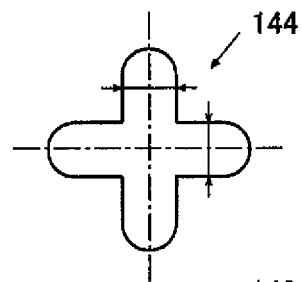
FIG. 19 is a plan view schematically showing the view of an alignment mark.

Then, on the flat part 112 there is formed a cross-shaped alignment mark 144 (groove) having a predetermined line width as shown in FIG. 19$a$. The alignment mark 144 is formed with a square end mill, a ball end mill, or a flat cutting blade having a sharp angle being relatively moved linearly.

The central lines of the vertical line and the horizontal line of the alignment mark 144 are used for alignment with respect to other components.

Figure 19B:
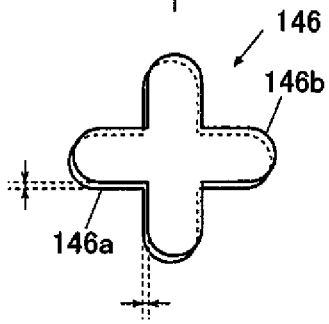

In step (f), an alignment mark 146 shown in FIG. 19b may be formed. The alignment mark 146 is made by superposing cross-shaped grooves 146a and 146b. The groove 146a and the groove 146b are slightly deviated to each other in position, and the groove 146a is shallower than the groove 146b. Between the groove 146a and the groove 146b, there is formed a step, and the width of the step can be used for alignment with respect to other components.

The alignment mark 146 may have a circular shape or a rectangular shape other than the cross-shape. Any shape can be used as long as it can be used to calculate a desired position of the alignment mark 146.

[Convex Die (Master Mold)]

Figure 20:
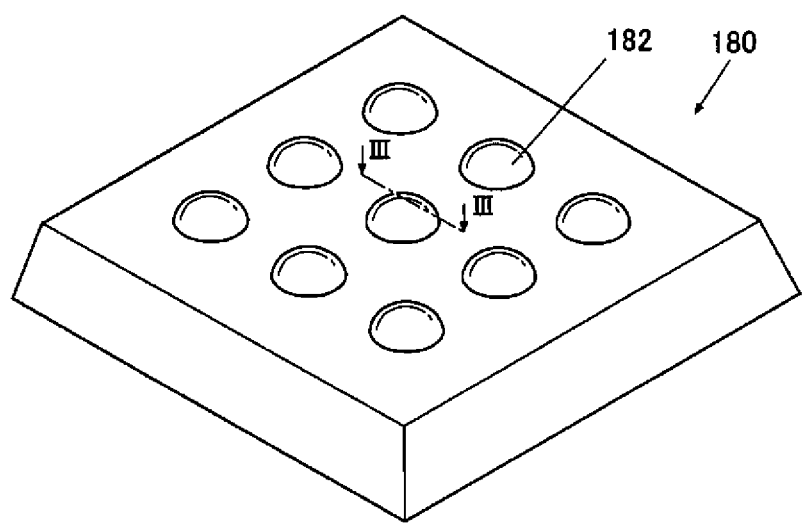
FIG. 20 is a perspective view showing a schematic configuration of a convex die.

As shown in FIG. 20, a convex die 180 has an approximate cuboid shape and is provided with a plurality of protrusions 182 (core) formed on its surface. The die 180 is an example of dies for a lens array.

Figure 21:
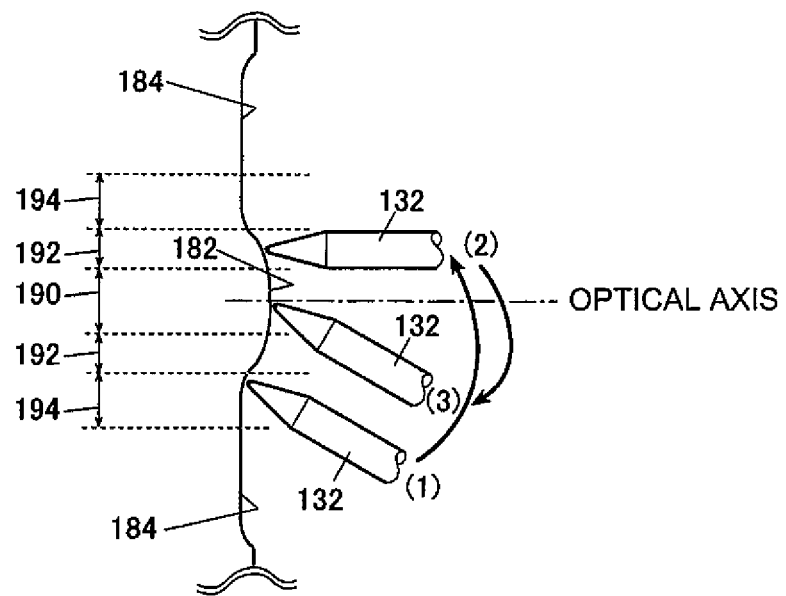
FIG. 21 is a cross section along III-III line of FIG. 20.

Close observation of the cross section of a block in which the protrusion 182 is formed shows that as shown in FIG. 21, there is formed a flat part 184 in the area surrounding the protrusion 182, and the flat part 184 is concentrically formed, being centered at the protrusion 182. The central part of the profusion 182 orthogonally intersects with the optical axis.

Instead of an approximate cuboid, the die 180 may have an approximate circular cylindrical shape or a divided circular shape.

[Material for Convex Die]

The convex die 180 is made of a similar material to that for the concave die 100.

[Manufacturing Method of Convex Die]

The manufacturing method of the convex die 180 is almost the same as the manufacturing method of the concave die 100, but the following points are different.

In step (e), the whole or a part of the protrusion 182 and the flat part 184 is machined.

In this step, as shown in FIG. 21, the posture of the ball end mill 132 is changed for each of the regions 190, 192, and 194. The region 190 is located on the center of the protrusion 182 and includes the region orthogonally intersecting with the optical axis. The region 192 is a circumferential area of the protrusion 182 and is adjacent to the region 190. The region 194 in part of or the whole of the flat part 184 and is adjacent to the region 192.

Especially in step (e), the machining is done from the region 194 through the region 192 to the region 190 in this order while the ball end mill 132 is being spirally revolved (see FIG. 13Ab): (1) in the region 194, the rotation shaft of the ball end mill 132 is slightly inclined from the optical axis; (2) in the region 192, the rotation shaft of the ball end mill 132 is set parallel to the optical axis; and (3) in the region 190, the rotation shaft of the ball end mill 132 is again slightly inclined from the optical axis.

One of the methods for manufacturing a wafer lens uses a die and two plastic dies as follows: a first plastic die is produced by using a die; then a second plastic die is produced by using the first plastic die; and the second plastic die is used to produce a plastic wafer lens. Instead, the first plastic die may be used to produce the wafer lens. Here, the die is a master die, and the plastic dies are sub master dies. Using a sub master die to produce a wafer lens reduces the number of times of using an expensive master die, thereby reducing the cost of the wafer lens. The plastic die is described below.

[First Concave Plastic Die]

Figure 22:
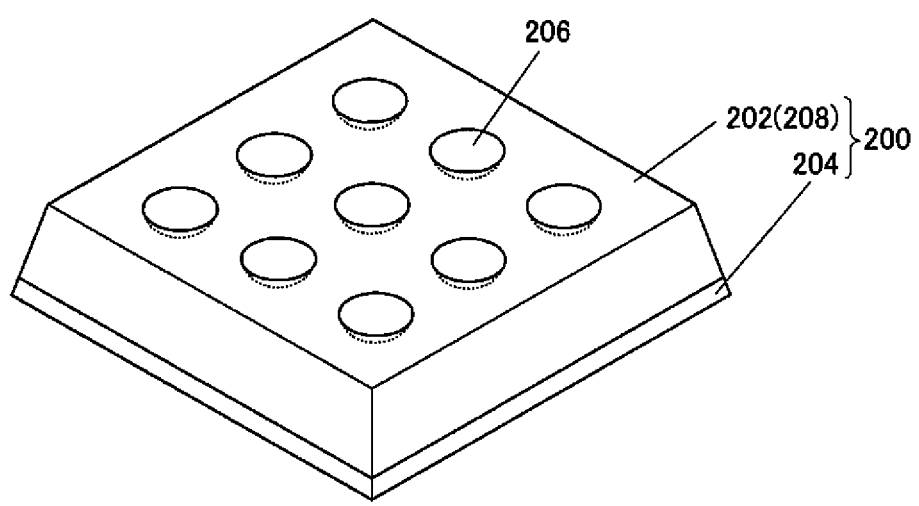
FIG. 22 is a perspective view showing a schematic configuration of a first concave plastic die.

As shown in FIG. 22, the first concave plastic die 200 is mainly constituted by a molding part 202 and a substrate 204. In the molding part 202, there are formed a plurality of depressions 206 (cavity) in an array. The molding part 202 is made of resin, and the depressions 206 are formed by transfer of the convex die 180 as a molding die.

The substrate 204 is a so-called lining member. If the first concave plastic die 200 is made of only the molding part 202 and weak in strength, providing a substrate 204 can increase the strength of the first concave plastic die 200 itself, and the first concave plastic die 200 can be repeatedly used accordingly many times as a molding die.

The first concave plastic die 200 is used plural times to mold a second convex plastic die 230 to be described below. Alternatively, it is repeatedly used plural times to mass-produce wafer lenses 52 and 54 (convex lens parts 20a, convex lens parts 32a). Its objective and the frequency of use are different from those of the concave die 100.

[Material of First Concave Plastic Die]

(1) Molding Part 202:

The molding part 202 is made of resin 208. The resin 208 is preferably a resin excellent in demoldability, especially preferably is a transparent resin, and further preferably is a resin which can be demolded without mold-release agent. As the resin 208, any one of the photo-curable resin, thermosetting resin, and thermoplastic resin can be used.

Examples of the photo-curable resin include fluorine series resin; examples of the thermosetting resin include fluorine series resin and silicone series resin; and examples of the thermoplastic resin include olefinic resin such as polycarbonate, cycloolefin series polymer which is transparent and relatively good in demoldability.

The demoldability gets better in the following order: fluorine series resin, silicone series resin, and olefinic series resin. When these resins are used as the resin 208, the substrate 204 does not need to be provided. In addition, it is advantageous that the first concave plastic die 200 can be bent in releasing the mold.

The resin 208 is described in detail in the following (1.1) to (1.3).

(1.1) Fluorine Series Resin

Examples of the fluorine series resin include: PTFE (polytetrafluoroethylene), PFA (tetrafluoroethylene.perfluoroalkylvinylether copolymer), FEP (tetrafluoroethylene-.hexafluoropropylene copolymer (4,6 fluorinated)), ETFE (tetrafluoroethylene.ethlene copolymer copolymer), PVDF (polyvinylidene fluoride (2 fluorinated)), PCTFE (polychlorotrifluoroethylene (3 fluorinated)), ECTFE (chlorotrifluoroethylene.ethylene copolymer), PVF (polyvinyl fluoride).

The fluorine series resin has advantages such as demoldability, heat resistance, chemical resistance, insulation properties, and low frictional properties, and has disadvantage of low transparency because it is crystal. It has a high melting point, and a high temperature (about 300° C.) is needed when molding.

Examples of molding methods includes injection molding, extrusion molding, blow molding, and transfer molding, and among those materials, FEP, PFA, PVDF are especially preferable for their excellent optical transparency and applicability to an injection molding and an extrusion molding Examples of a resin capable of melt-molding include, for example: the Fluon PFA made by Asahi Glass Co., Ltd., the Dyneon PFA and the Dyneon THV made by Sumitomo 3M Ltd. In particular, the Dyneon THV series are preferable since they have a low melting point (about 120° C.) so that they are molded at relatively low temperatures, and are highly transparent.

As a thermosetting amorphous fluorine resin, the Cytop Grade S made by Asahi Glass Co., Ltd. is also preferable for its high transparency and excellent demoldability.

(1.2) Silicone Series Resin

The silicone series resins included a one-liquid moisture curing type, a two-Liquid type, two liquid addition reaction type, and a two-liquid condensation type. They have advantages of demoldability, flexibility, heat resistance, flame resistance, moisture permeability, low water absorbability, having many transparency grades, but has disadvantages such as a large linear expansion coefficient.

In particular, silicone resin for casting containing PDMS (polydimethylsiloxane) structure is preferable for its excellent demoldability, and RTV elastomer of high-transparency grade is preferable. For example, preferable materials includes: TSE3450 (two-liquid mixing, addition type) made by Momentive Performance Materials Inc.; ELASTOSIL M 4647 (two-liquid type RTV silicone rubber) mad by Waker Asahikasei Silicone Co., Ltd.; KE-1603 (two-liquid mixing, addition type RTV rubber) made by Shin-Etsu Chemical Co., Ltd.; SH-9555 (two-liquid mixing, addition type RTV rubber), SYLGARD 184, SILPOT 184, WL-5000 series (photosensitive silicone buffer material, can be patterned with UV) made by Dow Corning Toray Co., Ltd. The molding method for the two-liquid RTV rubber is room temperature setting or thermo-setting.

(1.3) Thermoplastic Resin

Examples of the thermoplastic resin include a transparent resin such as alicyclic hydrocarbon series resin, acrylic resin, polycarbonate resin, polyester resin, polyether resin, polyamide resin, and polyimide resin; and among these resins the alicyclic hydrocarbon series resin is preferably used.

When the thermoplastic resin is used for configuration, the conventionally used injection molding technique can be used as is, whereby the molding part 202 can be manufactured without difficulties. If the thermoplastic resin of alicyclic hydrocarbon series resin is used, the service life of the molding part 202 can be prolonged due to its low moisture absorbency.

The alicyclic hydrocarbon series resin such as cycloolefin resin is excellent in light resistance and optical transparency, and even a short wavelength light such as UV light source for curing an active light curable resin does not cause much deterioration and the molding die is used for a long time.

As the alicyclic hydrocarbon series resin, one example is a material represented by following Chemical Formula 1.

[Chemical Formula 1]

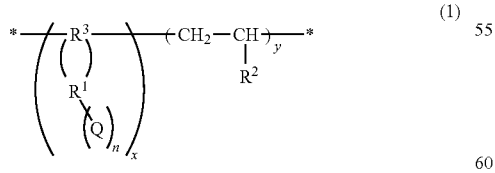

(1)

In Chemical Formula 1 above, characters x and y represent the ratio of copolymerization, and are real numbers satisfying the relation $0/100 \leq y/x \leq 95/5$. Character n is 0, 1, or 2 and represents the number of displacement of a substituent Q. Character $R_1$ represents one or more of (2+n)-valent groups selected from a group consisting of hydrocarbon groups having 2-20 carbon atoms. Character $R_2$ is a hydrogen atom or a one or more monovalent groups which consists of carbon and hydrogen selected from a group of structures having 1-10 carbon atoms. Character $R_3$ is one or more divalent groups selected from a group consisting of hydrocarbon groups having 2-20 carbon atoms. Character Q is one of more monovalent groups selected from a group of structures represented by $COOR_4$ ($R_4$ is a hydrogen atom or one or more monobalent group selected flour a group of structures having 1-20 carbon atoms).

In the above general formula (1), $R_1$ is preferably one or more divalents selected from a group of hydrocarbon groups having 2-12 carbon atoms, more preferably a divalent expressed by the following general formula (2) (p in formula (2) is an integer from 0-2).

[Chemical Formula 2]

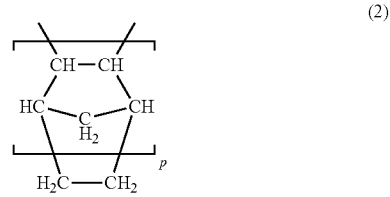

(2)

It is more pre arable that R1 is a divalent group in which pin the above general formula (2) is 0 or 1. One or more kinds of the structure $R_1$ may be used Examples of $R_2$ include: hydrogen atom, methyl group, ethyl group, n-propyl group, i-propyl group, n-butyl group, and 2-methylpropyl group, and R2 is preferably hydrogen atom and/or methyl group and more preferably hydrogen atom. Regarding examples of $R_3$, preferable examples of a structural unit containing this group include, when n=0, for example, the following (a), (b), and (c) (where $R_1$ in formulas (a)-(c) are as described above). In addition, n is preferably 0.

[Chemical Formula 3]

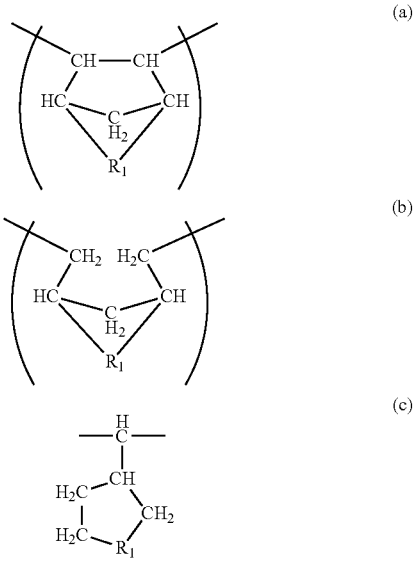

In the embodiment, there is no specific restriction on the type of copolymerization, and there can be applied known types of copolymerization such as random copolymerization, block copolymerization, alternating copolymerization, and the random copolymerization is preferable.

In addition, a polymer to be used in the embodiment may contain a repeated structure unit delivered from other copolymerizable monomer as required unless it impairs the physicality of a product manufactured by a molding method of the embodiment. The copolymerization ratio of such materials is not specifically restricted, but it is preferably 20 mole percent or less, more preferably 10 mole percent or less, if more amount than that is copolymerized, the optical performance may be impaired, whereby high precision optical components may not be obtained. In this case, the type of copolymerization is not specifically limited, and random copolymerization is preferable.

As another example of a preferable thermoplastic alicyclic hydrocarbon series polymer applied to the molding part 202, there is exemplified a polymer in which an repetitive unit having an alicyclic structure contains such that the total content of the repetitive units (d) having alicyclic structure expressed by the following general formula (4) and the chain structure repetitive units (e) expressed by the following formula (5) and/or (6) and/or (7) is 90% by mass or more, and the content of the repetitive unit (e) 1% by mass or more and less than 10% by mass.

[Chemical Formula 4]

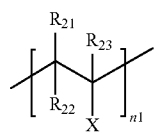
(4)

[Chemical Formula 5]

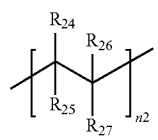
(5)

[Chemical Formula 6]

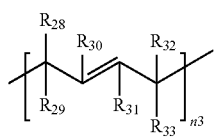
(6)

[Chemical Formula 7]

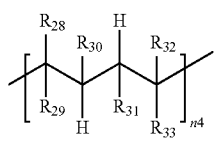
(7)

Each of $R_{21}$-$R_{33}$ in formulas (4), (5), (6), and (7) represents a hydrogen atom, chain hydrocarbon group, halogen atom, alkoxy group, hydroxy group, ether group, ester group, cyano group, amino group, imide group, silyl group, and chain hydrocarbon group replaced by polar group (halogen atom, alkoxy group, hydroxy group, ester group, cyano group, amide group, imide group, or silyl group). In particular, examples of the halogen atom include fluorine atom, chlorine atom, bromine atom, and iodine atom; and examples of chain hydrocarbon group replaced by the polar group include, for example, a halogenated alkyl group having 1-20, preferable 1-10, and more preferable 1-6 of carbon atoms. Examples of the chain hydrocarbon group include, for example, an alkyl group having 1-20, preferably 1-10, and more preferably 1-6 of carbon atoms; and an alkenyl group having 2-20, preferably 2-10, and more preferably 2-6 of carbon atoms.

Character X in the above formula (4) represents an alicyclic hydrocarbon group, and the number of carbon atoms constituting the group is typically 4-20, preferably 4-10, and more preferably 5-7. By limiting the number of the carbon atoms constituting the alicyclic structure within these ranges, the birefringence can be reduced. In addition, the alicyclic structure is not limited to be a monocyclic structure, and it may have a polycyclic structure such as norbornane ring.

The alicyclic hydrocarbon group may have a carbon-carbon unsaturated bond, and its content is 10% or less, preferably 5% or less, and more preferably 3% or less of all the carbon-carbon bonds. By limiting the content of the carbon-carbon unsaturated bond of the alicyclic hydrocarbon group within these ranges, the transparency and the heat resistance is improved. To the carbon constituting the alicyclic hydrocarbon group, the followings may be bonded: a hydrogen atom, halogen atom, alkoxy group, hydroxy group, ester group, cyano group, amid group, imide group, silyl group, and chain hydrocarbon group and the like which is replaced by a polar group (a halogen atom, alkoxy group, hydroxy group, ester group, cyano group, amid group, imide group, or silyl group). Among these, the hydrogen atom or a chain hydrocarbon group having 1-6 of carbon atoms is preferable because of a low water absorption rate.

In addition, the above formula (6) has a carbon-carbon unsaturated bond the main chain, and the above formula (6) has a saturated bond in the main chain. When the transparency and the heat resistance are strongly required, the content percentage of the unsaturated bond is typically 10% or less, preferably 5% or less, and more preferably 3% or less of all the carbon-carbon bonds constituting the main chain.

In the embodiment, in the alicyclic hydrocarbon series copolymer, the total content of the repetitive unit (d) containing the alicyclic structure expressed by the general formula (4) and the chain structural repetitive units (e) expressed by the general formula (5) and/or (6) and/or (7) is typically 90% by weight, preferably 95% by weight, and more preferably 97% by weight. By limiting the total content within the above range, low birefringence, heat resistance, a low water absorption rate, mechanical strength are highly balanced.

Examples of manufacturing methods of the above alicyclic hydrocarbon series copolymer include a method in which aromatic vinyl series compounds and other copolymerizable monomers are copolymerized and the carbon-carbon unsaturated bonds of the main chain and the aromatic ring are hydrogenated.

The molecular weight of the copolymer before hydrogenation is in the rage of 1,000-1,000,000, preferably 5,000-500,000, more preferably 10,000-300,000 in terms of molecular weight (Mw) of styrene (or polyisoprene) equivalent mean weight measured by GPC. If the mean weight molecular weight (Mw) of the copolymer is too small, the alicyclic hydrocarbon series copolymer obtained from that is inferior in strength; and instead if it is too large, it is inferior in hydrogenation reactivity.

The specific examples of the aromatic vinyl series compound used in the above method include: styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, and 4-phenylstyrene; and the styrene, 2-methylstyrene, 3-methylstyrene, 4-methylstyrene are preferable. These aromatic vinyl series compounds can be used alone or in combination of two or more.

As other copolymerizable monomers, there is no specific restriction, and chain vinyl compounds and chain conjugated diene compounds are used. The use of the chain conjugated diene provides an excellent operability during manufacturing and an excellent strength of the obtained alicyclic hydrocarbon series copolymer.

Specific examples of the chain vinyl compound include ethylene, propylene, 1-butene, 1-pentene, chain olefinic monomer such as 4-methyl-1-pentene; 1-cyanoethylene (acrylonitrile), 1-cyano-1-methylethylene (methacrylonitrile), nitryl series monomers such as 1-cyano-1-chloroethylene (α-chloroacrylonitrile); 1-(methoxycarbonyl)-1-methylethylene (methacrylic acid methyl ester), 1-(ethoxycarbonyl)-1-methylethylene (methacrylic acid ethyl ester), 1-(propoxycarbonyl)-1-methylethylene (methacrylic acid propyl ester), 1-(butoxycarbonyl)-1-methylethylene (methacrylic acid butyl ester), 1-methoxycarbonyl ethylene (acrylic acid methyl ester), 1-ethoxycarbonyl ethylene (acrylic acid ethylester), 1-propoxycarbonyl ethylene (acrylic acid propyl ester), (meth)acrylic acid ester monomer such as 1-butoxycarbonyl ethylene (acrylic acid butyl ester), 1-carboxy ethylene (acrylic acid), 1-carboxy-1-methylethylene (methacrylic acid), unsaturated fatty acid series monomer such as maleic anhydride; and among them the chain olefinic monomer is preferable, and the ethylene, the propylene, and the 1-butene are most preferable.

Examples of chain conjugated diene include 1,3-butadiene, isoprene, 2,3-dimethyl-1,3-butadiene, 1,3-pentadiene, and 1,3-hexadiene. Among these chain vinyl compounds and chain conjugated dienes, the chain conjugated dienes are preferable and the butadiene and the isoprene am specifically preferable. These chain vinyl compounds and the chain conjugated dienes are used alone or in combination of two or more.

There is no restriction on copolymerization reaction, and radical polymerization, anionic polymerization, or cationic polymerization may be used, but an anionic polymerization method is preferable in terms of easiness of copolymerization, easiness of hydrogenation in the post processes, and mechanical strength of the finally obtained hydrocarbon series copolymers.

In the case of anionic polymerization, a bulk polymerization process, a solution polymerization method, and slurry polymerization method can be used, under the existence of initiator, at a temperature range of generally 0° C.-200° C., preferably 20° C.-100° C., and especially preferably 20° C.-80° C., and the solution polymerization method is preferably in terms of removing the reaction heat. In this case, inactive solvent capable of solving copolymer and its hydride should be used. Examples of the inactive solvents used in solution reaction include: hydrocarbons such as n-butane, n-pentane, iso-pentane, n-hexane, n-heptane, and iso-oxtane; alicyclic hydrocarbons such as cyclopentane, cyclohexane, methylcyclopentane, methylcyclohexane, and decalin; and aromatic hydrocarbon such as benzene and toluene. As the initiator for the above anionic polymerizations, followings can be used, for example; mono-organic lithium such as n-butyllithium, sec-butyllithium, t-butyllithium, hexyllithium, and phenyllithium; and polyfunctional-organic lithium compounds such as dilithiomethane, 1,4-diobutane, 1,4-dilithio-2-ethylcyclohexane.

In the process of hydrogenation of carbon-carbon double bond of unsaturated rings such as hydrogenating aromatic rings and cycloalkene rings of copolymers before hydrogenation and unsaturated bonds of main chains, there is no restriction on reaction methods or reaction modes, but the reactions may be performed according to known methods. However, preferably methods of hydrogenation are methods having a high hydrogenation rate and having copolymer chain cutting reaction co-occurring with hydrogenation reaction, and examples include a method by using in organic solvent a catalyst containing at least one metal selected from the group: nickel, cobalt, iron, titanium, rhodium, palladium, platinum, ruthenium, and rhenium. Hydrogenation reaction is generally performed at 10° C.-250° C., but to increase hydrogenation ratio and reduce the copolymer chain cutting reaction co-occurring with hydrogenation reaction, it is preferably preformed at 50° C.-200° C., more preferably performed at 80° C.-180° C. In addition, the pressure of hydrogen is generally set at 0.1 MPa-30 MPa, but in addition to the above reason, from the viewpoint of operability, the preferable pressures are 1 MPa-20 MPa, and the more preferable pressures are 2 MPa-10 MPa.

The hydrogenate ratio of the thus obtained hydrides is generally 90% or higher, preferably 95% or higher, and more preferably 97% or higher for any of carbon-carbon unsaturated bond of main chain, carbon-carbon double bond of aromatic ring, and carbon-carbon double bond of unsaturated ring in terms of measurement by the $^1$H-NMR. If the hydrogenate ratio is low, the low birefringence, thermo stability and the like of the obtained copolymer will deteriorate.

Methods for recovering the hydride after the hydrogenation reaction are not specifically limited. In general, examples include: a method in which the solvent is directly dried and removed from the hydride solution after removing the residual hydrogenation catalyst by, filtration, centrifugal separation, or the like; and a method in which the hydride solution is poured into solvent less dissolvable of the hydride so as to solidify.

(2) Substrate 204

The substrate 204 is configured by flat and smooth materials such as quartz, a silicon wafer, metallic glass, or resin. From the view point of transparency (for light to be able to be applied from above or below the first concave plastic die 200), the substrate 204 is preferably made of quartz, glass, transparent resin, or the like.

The transparent resin may be any one of thermoplastic resin, thermosetting resin, and photo-curable resin. The transparent resin may be added with non-organic fine particles therein. With this arrangement, the linear expansion coefficient of the resin can be reduced. The substrate 204 made of resin can bend more than glass, and it is accordingly easier to release mold when demolding. However, resin has a disadvantage that when applied light generates heat, deformation is generated due to its large linear expansion coefficient and the deformation impairs precise transfer.

[First Convex Plastic Die]

Figure 23:
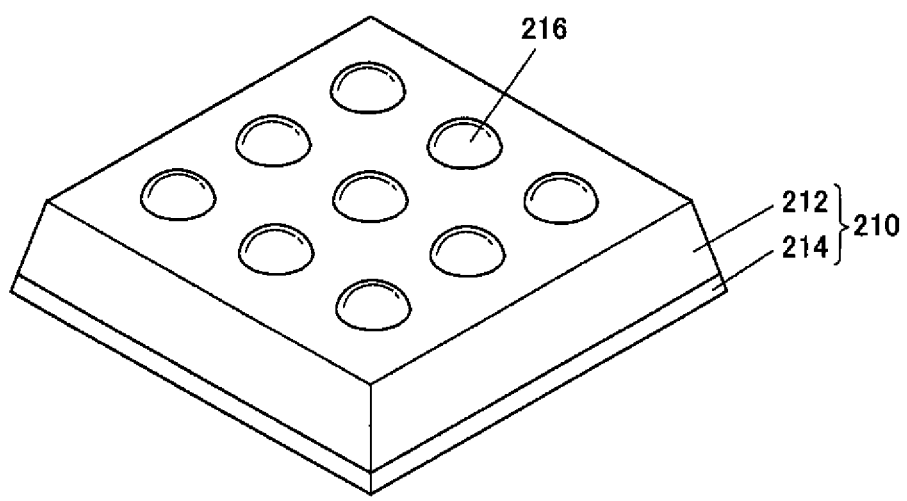
FIG. 23 is a perspective view showing a schematic configuration of a first convex plastic die.

As shown in FIG. 23, the first convex plastic die 210 is mainly configured by a molding part 212 and a substrate 214. The molding part 212 is provided with a plurality of protrusion 216 (core) formed in an array.

The molding part 212 is made of resin, and the protrusions 216 are formed by transfer of the concave die 100 as the molding die. The substrate 214 is a so-called lining member. If the first convex plastic die 210 made of only the molding part 212 is inferior in strength, providing the substrate 214 improves the strength of the first convex plastic die 210 itself, and the first convex plastic die 210 can be used a molding die many times.

The first convex plastic die 210 is used plural times to form a second concave plastic die 220. Alternatively, it is used plural times to mass-produce wafer lenses 52 or 54 (concave lens part 24a, concave lens part 28a), and its purpose and frequency of use is different from the convex die 180.

[Material for the First Convex Resin]

The molding part 212 and the substrate 214 are made of similar materials to those for the first concave plastic die 200.

[Second Concave Plastic Die]

Figure 24:
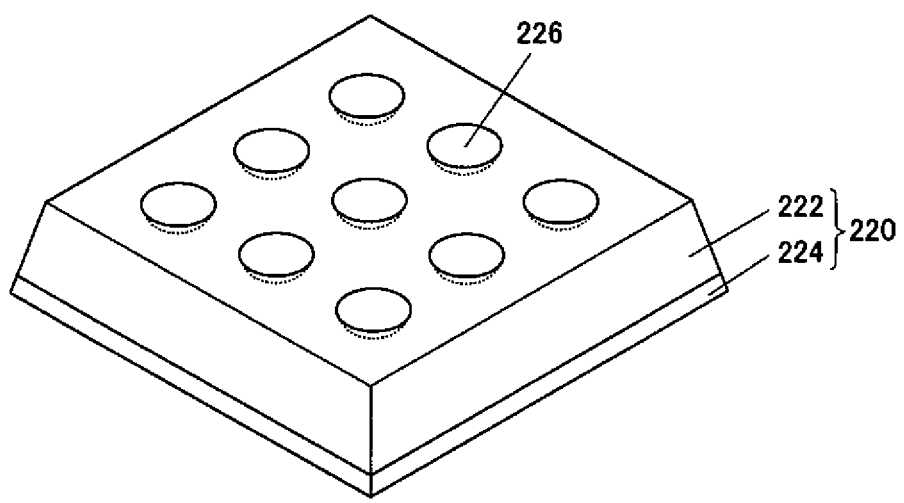
FIG. 24 is a perspective view showing a schematic configuration of a second concave plastic die.

As shown in FIG. 24, a second concave plastic die 220 is mainly configured by a molding part 222 and a substrate 224. The molding part 222 is provided with a plurality of depressions 226 (cavity) formed in an array.

The molding part 222 is made of resin, and the depressions 226 are formed by transfer of the first convex plastic die 210 as a molding die. The substrate 224 is a so-called lining member. If the second concave plastic die 220 made of only the molding part 222 is inferior in strength, providing the substrate 224 improves the strength of the second concave plastic die 220 itself, and the second concave plastic die 220 can be used many times as a molding die.

The second concave plastic die 220 is used plural times to mass-produce the wafer lenses 52 or 54 (convex lens part 20a, convex lens part 32a), and its objective and the frequency of use are different from those of the concave die 100. However, since the second concave plastic die 220 has the same surface shape as the concave die 100, the second concave plastic die 220 is more preferable to mass-produce the wafer lenses 52 or 54 than the first concave plastic die 200 made by transfer of the convex die 180.

The molding part 222 and the substrate 224 are made of similar materials to those for the first concave plastic die 200.

[Second Convex Plastic Die]

As shown in FIG. 25, a second convex plastic die 230 is mainly configured by a molding part 232 and a substrate 234. The molding part 232 is provided with a plurality of protrusions 236 (core) formed in an array.

The molding part 232 is made of resin, and the protrusions 236 are formed by transfer of the first concave plastic die 200 as a molding die. The substrate 234 is a so-called lining member. If the second convex plastic die 230 made of only the molding part 232 is inferior in strength, providing the substrate 234 improves the strength of the second convex plastic die 230 itself, and the second convex plastic die 230 can be used as molding die many times.

The second convex plastic die 230 is used to mass-produce the wafer lenses 52 or 54 (concave lens part 24a, concave lens part 28a), and its objective and the frequency of use are different from those for the convex die 180. However, since the second convex plastic die 230 has the same surface shape as the convex die 180, the second convex plastic die 230 is preferable to mass-produce the wafer lenses 52 or 54 than the first convex plastic die 210 made by transfer of the concave die 100.

The molding part 232 and the substrate 234 are made of similar materials to those for the first concave plastic die 200.

[Wafer Lens Manufacturing Apparatus (Step & Repeat Method)]

Figure 27:
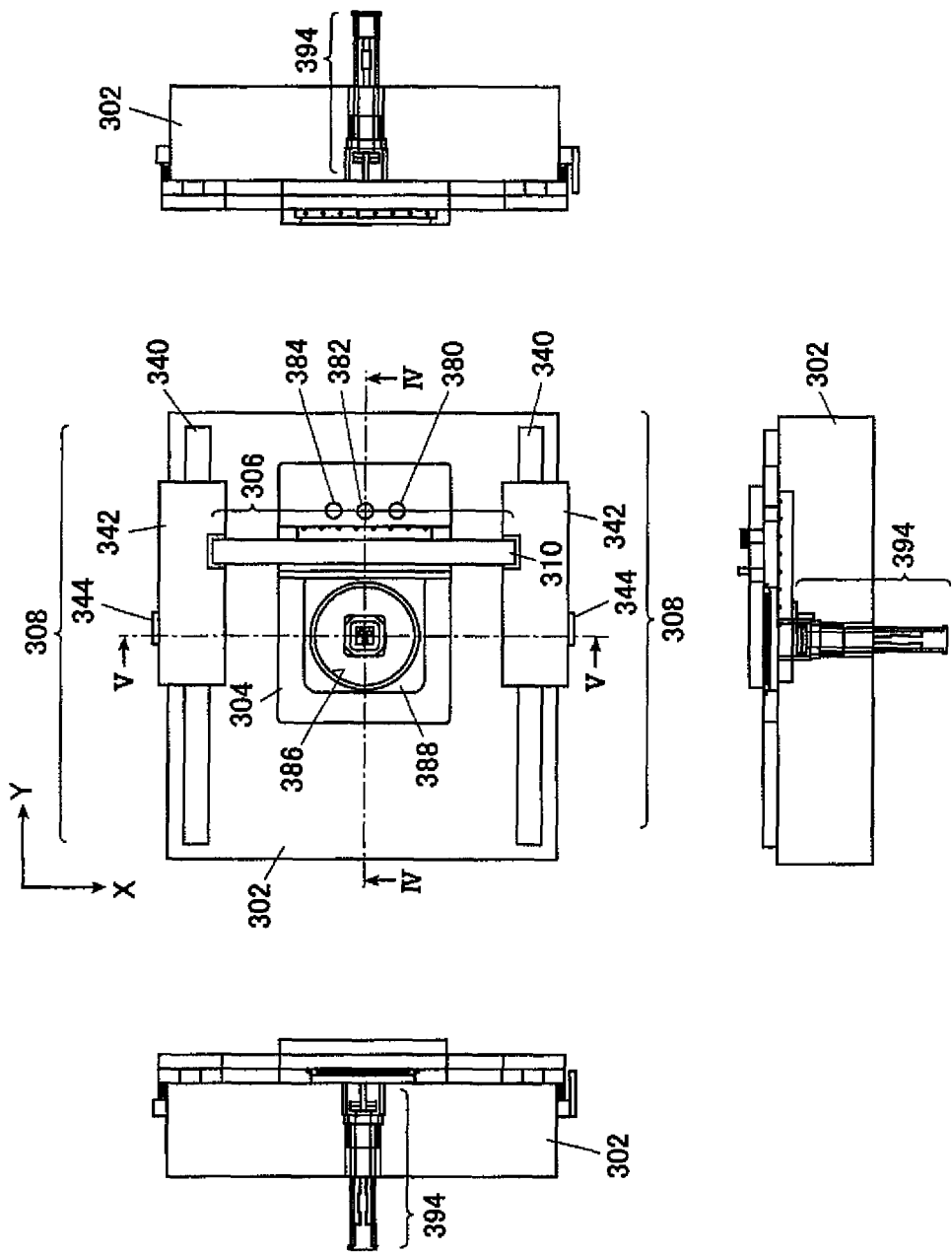
FIG. 27 is a plan view and a side view of the wafer lens manufacturing apparatus of FIG. 26.

As shown in FIG. 26 and FIG. 27, a wafer lens manufacturing apparatus 300 is mainly configure of a cuboid shaped surface plate 302; an X-Y stage 304 provided on the surface plate 302; an X-axis moving mechanism 306 for moving the X-Y stage 304 along the X-axis direction; and a pair of Y-axis moving mechanisms 308 for moving X-Y stage 304 along the Y-axis direction.

Figure 28:
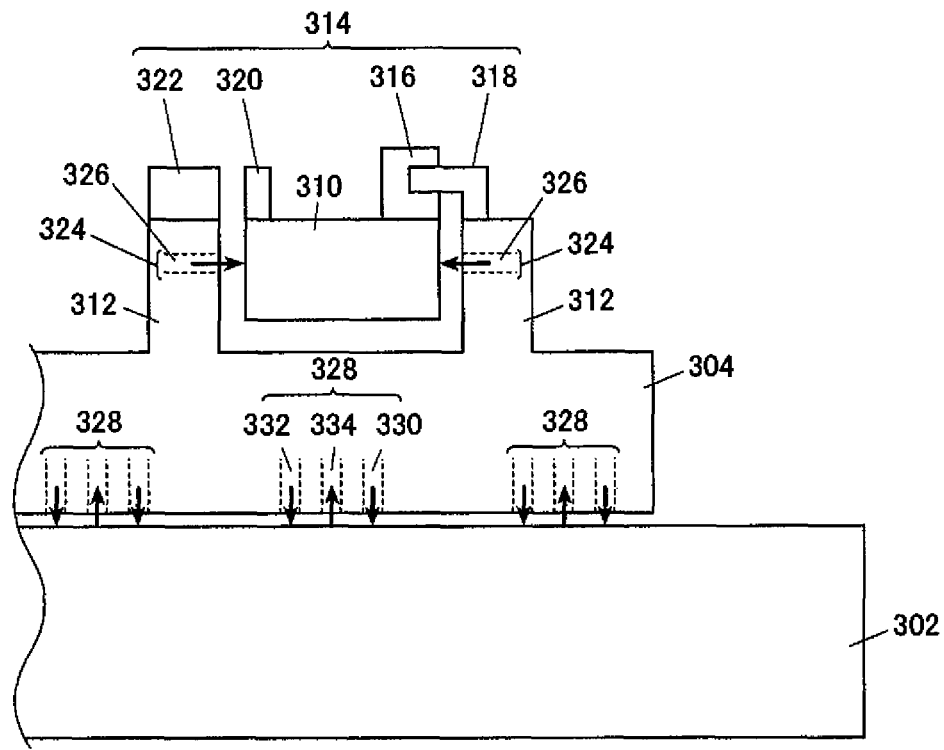
FIG. 28 is a diagram showing a schematic configuration of an X-axis moving mechanism and is a cross section along IV-IV line of FIG. 27.

As shown in FIG. 27 and FIG. 28, the X-axis moving mechanism 306 has an X-axis guide 310 extending in the X-axis direction. As shown in FIG. 28, below the X-axis guide 310 is disposed the X-Y stage 304. On the X-Y stage 304, there are formed a pair of projections 312 extending in the X-axis direction, and between the projections 312, the X-axis guide 310 is arranged.

As shown in FIG. 28, the X-axis moving mechanism 306 is provided with a linear motor 314 for actually moving the X-Y stage 304 in the X-axis direction. The linear motor 314 has a known mechanism mainly made up of a stator 316, a rotor 318, a scale 320, and a sensor 322.

The stator 316 is fixed on the X-axis guide 310. On one of projections 312 on the X-Y stage 304, the rotor 318 is fixed, and the rotor 318 is movable along the X-axis guide 310. The scale 320 is secured on the X-axis guide 310. The sensor 322 is fixed on the other projection 312 on the X-Y stage 304.

In the X-axis moving mechanism 306, the rotor 318 moves along the stator 316 while the sensor 322 is sensing the scale 320, and this arrangement allows the X-Y stage 304 to move in the X-axis direction along the X-axis guide 310 by a predetermined distance.

On each of the projections 312 on the X-Y stage 304, there is provided an air slide guide mechanism 324. The air slide guide mechanisms 324 have blowout holes 326 for blowing out air. The air slide guide mechanisms 324 operate such that air is blown from the blowout holes 326 toward the X-axis guide 310 so that the X-Y stage 304 is levitated from the X-axis guide 310.

In the bottom part of the X-Y stage 304, a plurality of air slide guide mechanisms 328 are provided. Each air slide guide mechanism 328 has two blowout holes 330 and 332 for blowing out air and a suction hole 334 to suction air. The air slide guide mechanism 328 operates such that air is blown out from each of the blowout holes 330 and 332 toward the surface plate 302, and at the same time air is suctioned from the suction hole 334, so that the X-Y stage 304 is floated above the surface plate 302 at a certain height.

Since the X-Y stage 304 is floated by the air slide guide mechanisms 324 and 328 above the X-axis guide 310 and the surface plate 302, the X-axis moving mechanism 306 can be smoothly moved.

Figure 29:
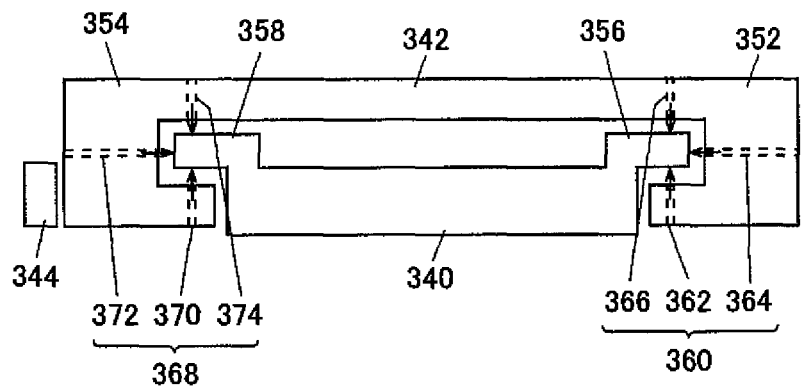
FIG. 29 is a diagram showing a schematic configuration of a Y-axis moving mechanism and is a cross section along V-V line of FIG. 27.

As shown in FIG. 27 and FIG. 29, the Y-axis moving mechanism 308 has a pair of Y-axis guides 340 extending in the Y-axis direction. On the Y-axis guides 340, a pair of Y-axis moving bodies 342 are provided.

On the Y-axis movable bodies 342, both ends of the X-axis guide 310 are secured, and the Y-axis movable body 342 moves in the Y-axis direction along the Y-axis guides 340 while supporting the X-axis guide 310 holding the X-Y stage 304.

In detail, on the Y-axis moving mechanism 308 are provided linear motors 344. The linear motor 344 is mainly constituted by a stator 346, a rotor 348, a scale 350, and a sensor (not shown), similarly to the configuration of the linear motor 314 of the X-axis moving mechanism 306; the rotor 348 moves along the stator 346 while the sensor is sensing the scale 350, and this arrangement allows the Y-axis movable body 342 to move in the Y-axis direction along the Y-axis guide 340 by a predetermined distance.

As shown in FIG. 29, on the end parts of the Y-axis movable body 342 are formed hook-shaped hook parts 352 and 354, and inside the hook parts 352 and 354, end parts 356 and 358 of the Y-axis guide 340 are disposed to be fit with a clearance, respectively.

In the hook part 352 is provided an air slide guide mechanism 360. The air slide guide mechanism 360 is provided with blowout holes 362, 364, and 366 for blowing out air from three directions (up, side, and down). In the hook part 354 is provided an air slide guide mechanism 368, too. The air slide guide mechanism 366 is provided with blowout holes 370, 372, and 374 for blowing out air from three directions (up, side, and down), too.

The air slide guide mechanism 360 operates such that air is blown out from the blowout holes 362, 364, and 366 toward the end part 356 of the Y-axis guide 340; and in the meantime, the air slide guide mechanism 368 also operates such that air is blown out from the blowout holes 370, 372, and 374 toward the end part 358 of the Y-axis guide 340, whereby the Y-axis movable body 342 levitates above the Y-axis guide 202.

As shown in FIG. 26 and FIG. 27, on the X-Y stage 304, there are provided a dispenser 380 for dropping resin, a laser end-measuring machine 382 for measuring the flatness (inclination) and height position of the molding die, and a microscope 384 used for alignment (positioning) between the components.

As shown in FIG. 26, in the X-Y stage 304, there is formed a through hole 386 vertically extending through and having a circular shape when viewed from above, and the glass substrate 16 or 26 (see, FIG. 7-FIG. 9) can be held over the through hole 386.

In detail, in the through hole 386, there is formed a step on which the glass substrate 16 or 26 is fixed by a spring (not shown). Over the X-Y stage 304, there is provided a lid body 388 having a rectangular shape when viewed from above such that the lid body 388 covers the through hole 386. The lid body 388 is made of a light transmissive member such as quartz or the like, and there is provided a light source 390 above the lid body 388.

Figure 30:
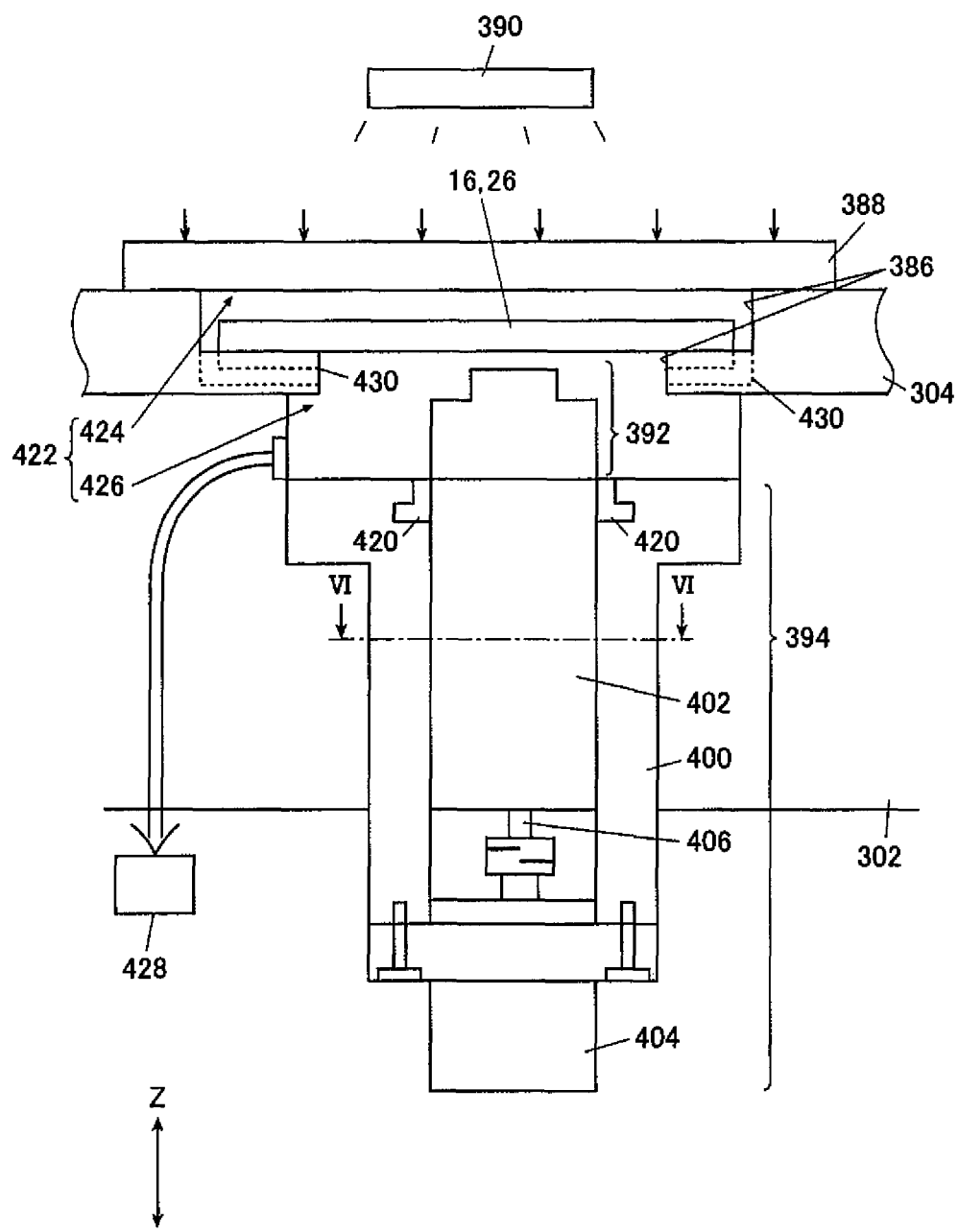
FIG. 30 is a cross section showing a schematic configuration of the inside of an X-Y stage and a surface plate.

As shown in FIG. 30, in the surface plate 302, there is buried a molding die section 392 for holding the molding die, and a Z-axis movement mechanism 394 for vertically moving the molding die section 392 in the Z-axis direction. The molding die section 392 is disposed on the top of the Z-axis movement mechanism 394 (Z stage 402).

The Z-axis movement mechanism 394 is mainly provided with: a rectangular cylindrical Z-axis guide 400 having a flange on its top; a Z stage 402 which moves in the Z-axis direction inside the Z-axis guide 400; and a motor 404 for moving the Z stage 402 in the Z-axis direction (up and down).

The motor 404 has a potentiometer therein. To the motor 404, there is connected a shaft 406. In the Z-axis movement mechanism 394, the operation of the motor 404 causes the shaft 406 to vertically extend and contract, and this motion causes the Z stage 402 and the molding die section 392 to move vertically.

Figure 31A:
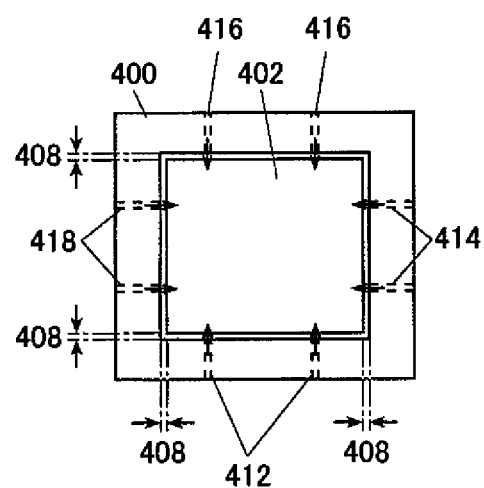
FIG. 31 is a cross section along VI-VI line of FIG. 30.

As shown in FIG. 31a, between the inner circumferential surface of the Z-axis guide 400 and the side surface of the Z stage 402, there are provided clearance gaps 408. On the Z-axis guide 400, there is provided an air slide guide mechanism 410. The air slide guide mechanism 410 has blowout holes 412, 414, 416, and 418 for blowing out air. The air slide guide mechanism 410 operates such that air is blown out from the blowout holes 412, 414, 416, and 418 toward the Z stage 402 so as to levitate the Z stage 402.

As shown in FIG. 30, the inner circumferential surface of the Z-axis guide 400 which constitutes the flange is sealed by a sealing member 420 such that the seal is provided between the Z-axis guide 400 and the Z stage 402 so that the air in the clearance gaps 408 does not leak (get out) upward above the Z-axis guide 400. As the sealing member 420, silicone grease, an oil seal, an O-ring, or the like is used. There may be provided a flange around the Z stage 402, and the space between the stage and the flange of the Z-axis guide 400 may be covered by a metal bellows to seal.

As shown in FIG. 30, there is formed a space 422 in a region surrounded by the lid body 388, the X-Y stage 304, the surface plate 302, and the Z-axis guide 400. The space 422 is divided into two parts: an upper space 424 formed between the lid body 388 and the glass substrate 16 or 26 placed on the X-Y stage 304; and a lower space 426 formed between the Z-axis movement mechanism 394 and the substrate 16 or 26.

To the lower space 426, a decompression mechanism 428 such as a vacuum pump is connected. The decompression mechanism 428 operates so as to have the space 422 in decompressed state. In the X-Y stage 304, there are formed communication holes 430 for communicating the upper space 424 and the lower space 426 to generate no pressure difference between the both spaces.

Figure 32:
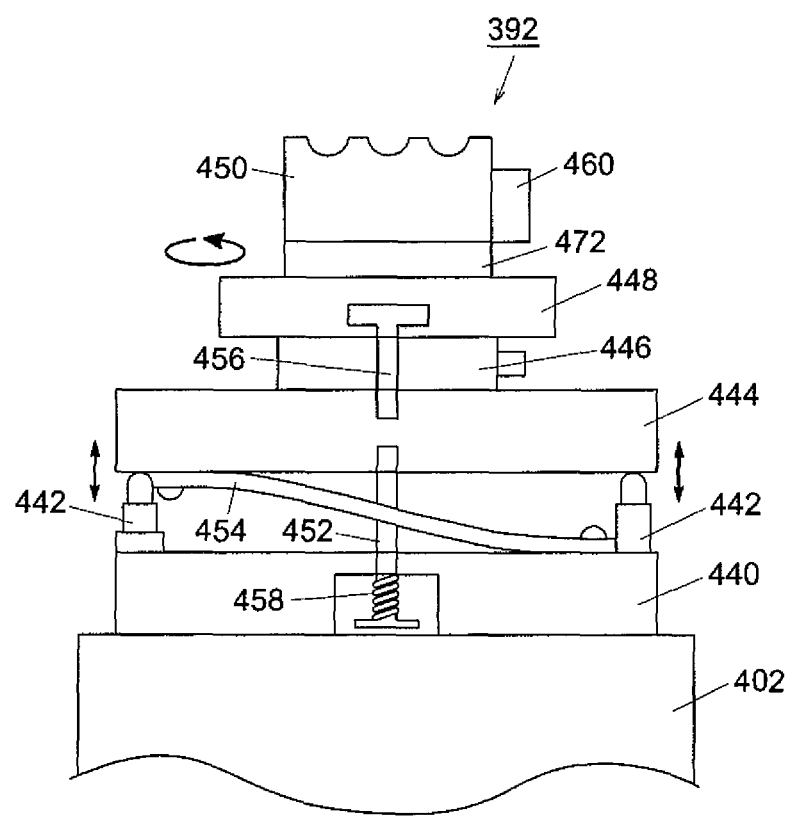
FIG. 32 is a cross section showing a schematic configuration of a molding die section.

As shown in FIG. 32, the molding die section 392 is mainly equipped with a first support base 440, piezoelectric actuators 442, a second support base 444, a pressure sensor 446, a third support platform 448, and molding die 450, which are provided on the Z stage 402 in this order.

The first support base 440 and the second support base 444 are connected to each other through a screw 452 for precompression, and they are biased by a spring 458 to get closer to each other. Between the first support base 440 and the second support base 444, there are disposed three piezoelectric actuators 442 and an L-shaped leaf spring 454 (see FIG. 33). The second support base 444 and the third support platform 448 are connected by a screw 456, and between the second support base 444 and the third support platform 448, the pressure sensor 446 is arranged.

Figure 33:
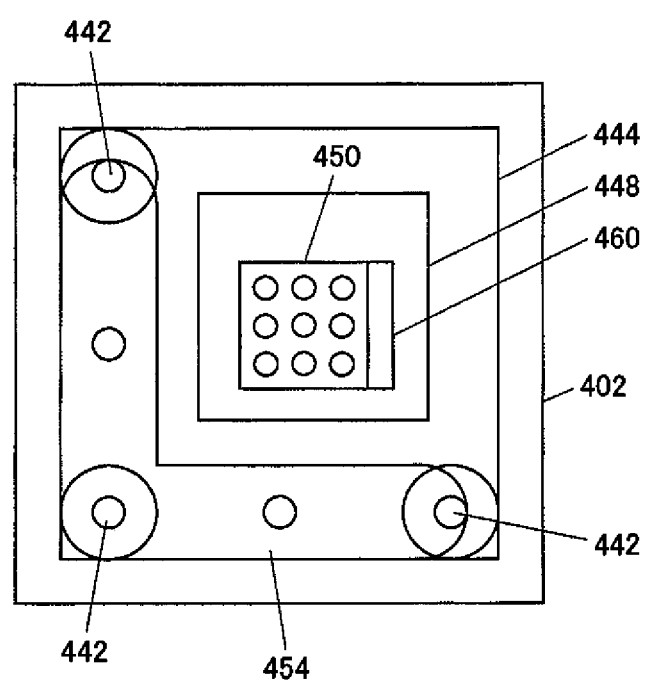
FIG. 33 is a plan view showing the schematic configuration of FIG. 32.

As shown in FIG. 33, the three piezoelectric actuators 442 are each arranged on each of the three corners on the first support base 440 to support the second support base 444 on the three points. In the molding die section 392, by controlling the operation of the piezoelectric actuators 442 on the basis of the output value of the pressure sensor 446, the inclinations of the second support base 444, the third support platform 448, and the molding die 450 are adjusted. As a result, the molding die 450 and the glass substrate 16 or 26 can be adjusted to be parallel, and after dropping resin on the molding die 45, mold clamping and imprint molding can be performed while controlling the load on the resin to a desired pressure.

However, the number and the arrangement of the piezoelectric actuators 442 may be altered if desired as long as the tilt and the load control for parallelization can be performed.

As the molding die 450, any one of the followings can be used: the concave die 100, the convex die 180, the first concave plastic die 200, the first convex plastic die 210, the second concave plastic die 220, and the second convex plastic die 230.

In order to form the convex lens part 20a or 32a, any one of the concave die 100, the first concave plastic die 200, and the second concave plastic die 220 is used, and the second concave plastic die 220 is preferably used.

In order to form the concave lens part 24a or 28a, any one of the convex die 180, the first convex plastic die 210, and the second convex plastic die 230 is used, and the second convex plastic die 230 is preferably used As shown in FIG. 32, on the molding die 450 there is provided a non-contact optical sensor 460 to measure the height position of a member (such as glass substrate 16 or 26) facing the molding die 450. Instead of the optical sensor 460, other types of sensor can be used as long as they are a known means capable of measuring a height position, and preferable is a non-contact sensor, which does not affect the optical performance of the wafer lens.

Figure 34:
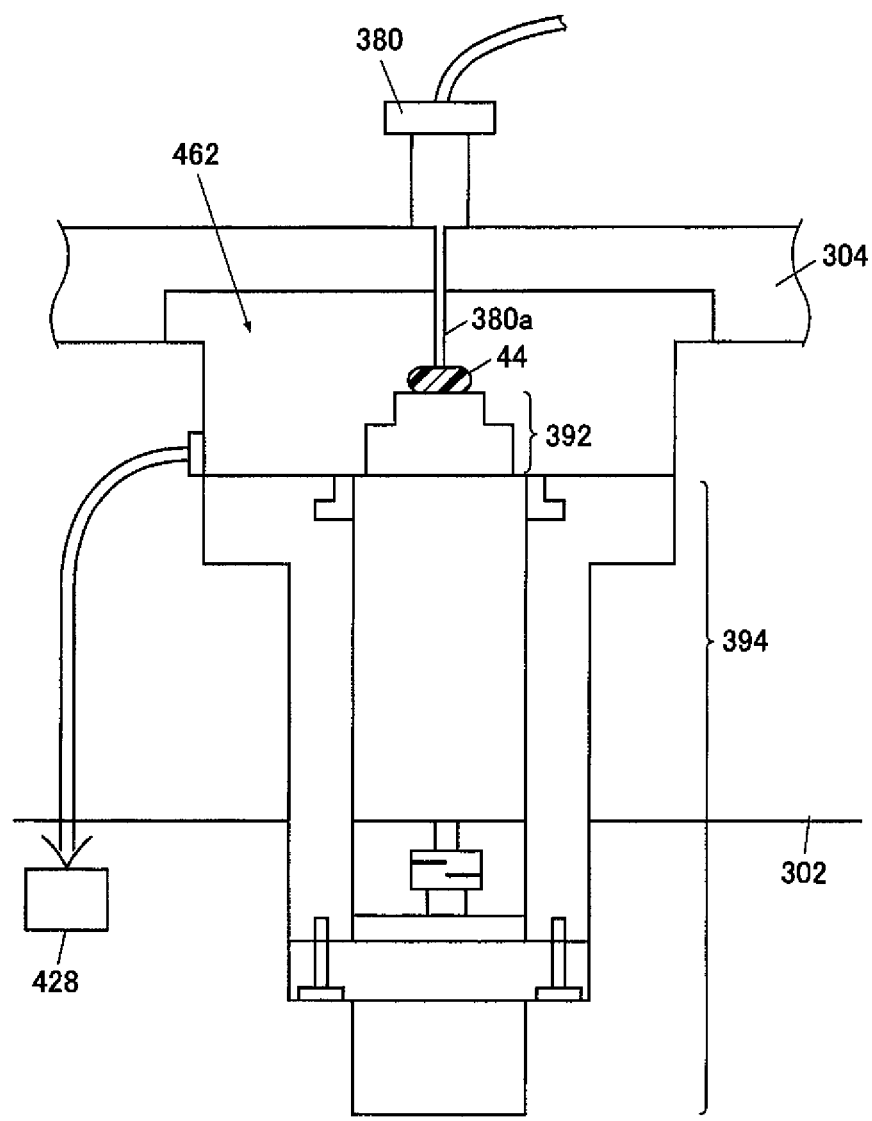
FIG. 34 is a cross section showing a schematic configuration in which a dispenser is disposed to face the molding die section.

As shown in FIG. 34, the dispenser 380 has a needle part 380a for dropping resin, and the needle part 380a extends through the X-Y stage 304. In the state that the dispenser 380 on the X-Y stage 304 and the molding die section 392 are made to face each other, the space 462 is formed in the region surrounded by the X-Y stage 304, the surface plate 302, and the Z-axis movement mechanism 394, and the apex of the needle part 380a of the dispenser 380 is placed in the space 462. In this state, the operation of the decompression mechanism 428 has the space 462 in decompressed state.

Figure 35:
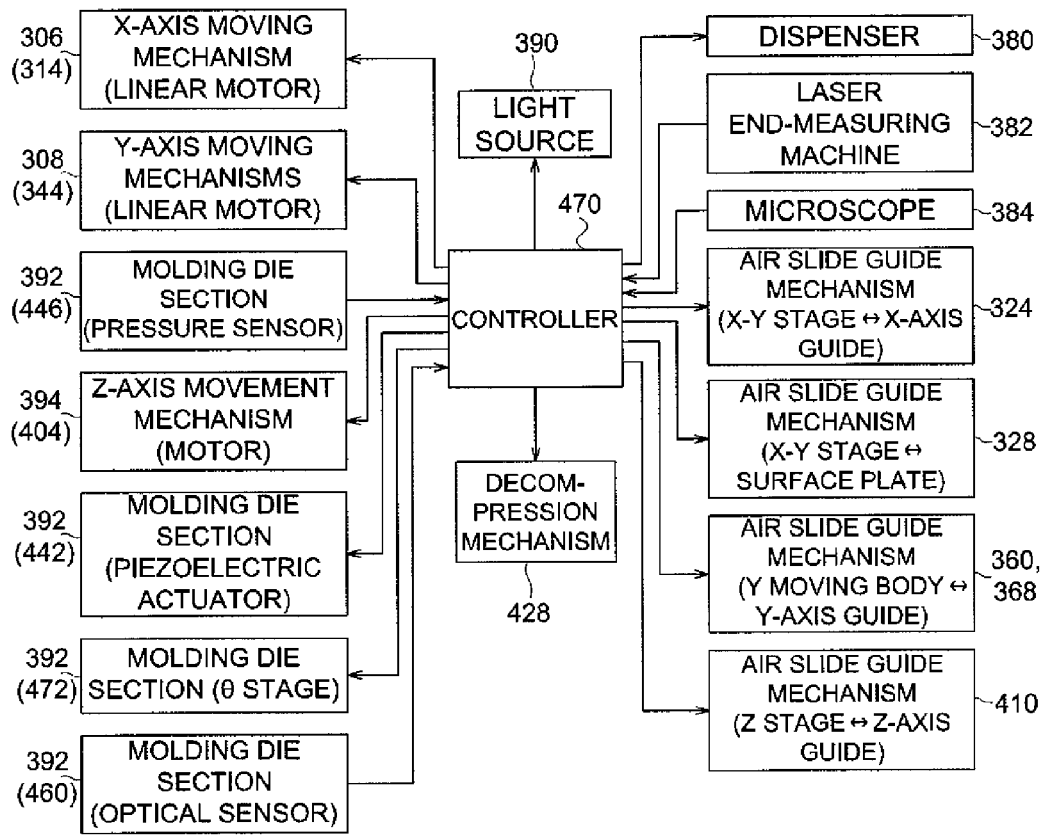
FIG. 35 is a block diagram showing a schematic configuration of control of the wafer lens manufacturing apparatus.

The wafer lens manufacturing apparatus 300 having the above arrangement is equipped with a controller, as shown in FIG. 35. To the controller 470, the followings are connected: the dispenser 380, the laser end-measuring machine 382, the microscope 384, the light source 390, the molding die section 392 (such as the piezoelectric actuator 442, the pressure sensor 446, and the optical sensor 460), the X-axis moving mechanism 306, the Y-axis moving mechanism 308, the Z-axis movement mechanism 394, the air slide guide mechanisms 324, 328, 360, 368, and 410, the decompression mechanism 428 and the like, and the controller 470 receives the detection results from these components and controls the operation (start and stop) of these components.

[Manufacturing Method of Image Pickup Device]

Figure 36:
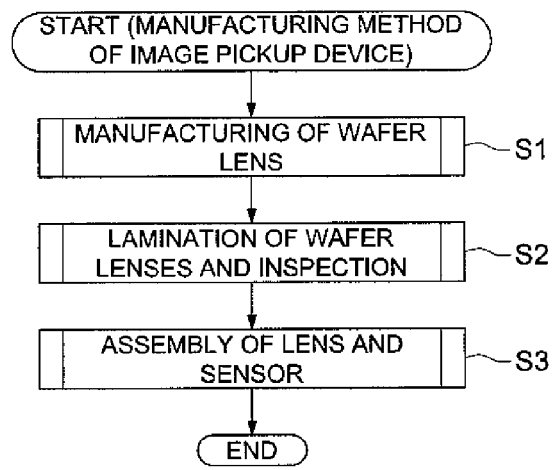
FIG. 36 is a flow chart schematically showing a method for manufacturing an image pickup device.

As shown in FIG. 36, image pickup device 2 is manufactured generally through steps S1-S3.

Step S1: Manufacture a wafer lens.
Step S2: Laminate wafer lenses and inspect the qualities.
Step S3: Assemble the lens unit and the sensor unit.

[Manufacturing Method of Wafer Lens (S1, First Example)]

Figure 37:
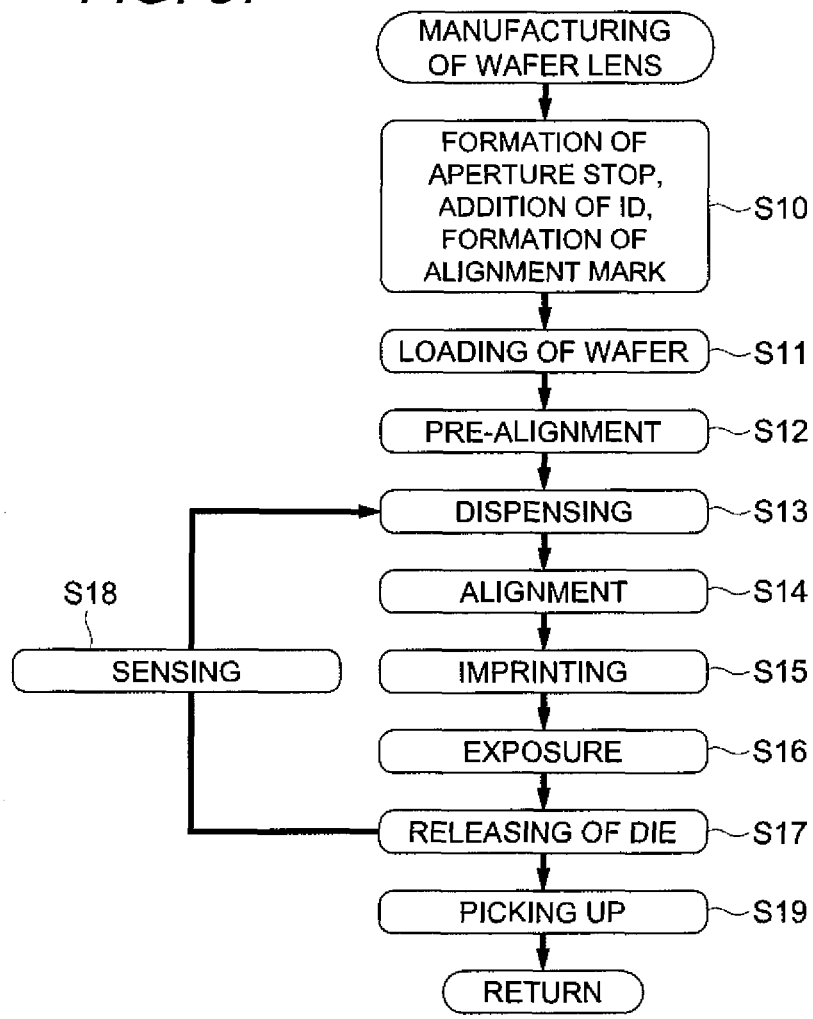
FIG. 37 is a flow chart schematically showing a method (a first example) for manufacturing a wafer lens.

As shown in FIG. 37, the wafer lenses 52 and 54 are manufactured generally through Steps S10-S19.

Step S10: Form on the glass substrate the aperture stop, the ID recording region, and the alignment mark.
Step S11: Load the glass subs e on the wafer lens manufacturing apparatus.
Step S12: Position the dispenser and the molding die.
Step S13: Drop resin on the molding die.
Step S14: Align the glass substrate and the molding die.
Step S15: Press the molding die against the glass substrate.
Step S16: Apply light to the resin.
Step S17: Release the glass substrate after hardening the resin from the molding die.
Step S18: Measure the height positions of the glass substrate and the like.
Step S19: Unload the glass substrate out of the wafer lens manufacturing apparatus.

In step S10, on the upper surface of the glass substrate 16, the aperture stops 18 as optical components, the ID recording regions 58, on which the wafer ID is recorded, and alignment marks 64a and 66a are formed in the same material layer.

Figure 38:
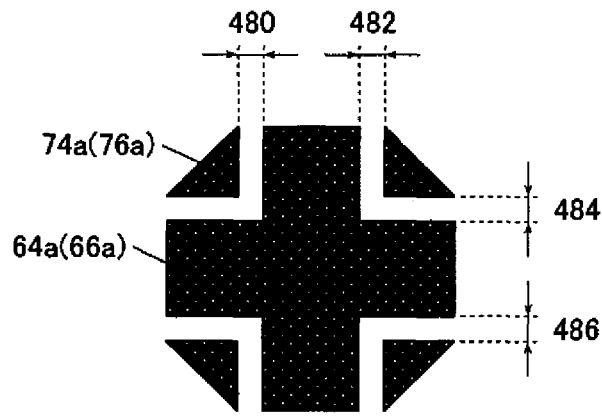
FIG. 38 is a schematic diagram showing an alignment mark having been viewed and aligned to form an aperture stop.

Then, on the lower surface of the glass substrate 16, the aperture stops 22 and the alignment marks 72a, 72b, 74a, 76a, 78a, and 78b are formed of the same material layer. In this step, the previously formed alignment marks 64a, 66a and the alignment marks 74a, 76a are observed to be aligned (see FIG. 6). When the alignment marks 64a, 66a and the alignment marks 74a, 76a are aligned, the four spaces 480, 482, 484, and 486 are set to be the same as shown in FIG. 38. This measure prevents the aperture stops 18 and the aperture stops 22 from deviating from each other between the upper surface and the lower surface of the glass substrate.

Also on the glass substrate 26, the aperture stops 30 and the ID recording regions 60 are formed of the same material layer.

In order to form these material layers, photo resist containing carbon black is applied on the glass substrates 16 and 26, and then the material layer is selectively removed by known patterning exposure and development process, whereby the aperture stops 18 or 22 are formed on the glass substrate 16, and the aperture stops 30 are formed on the glass substrate 26.

Figure 56:
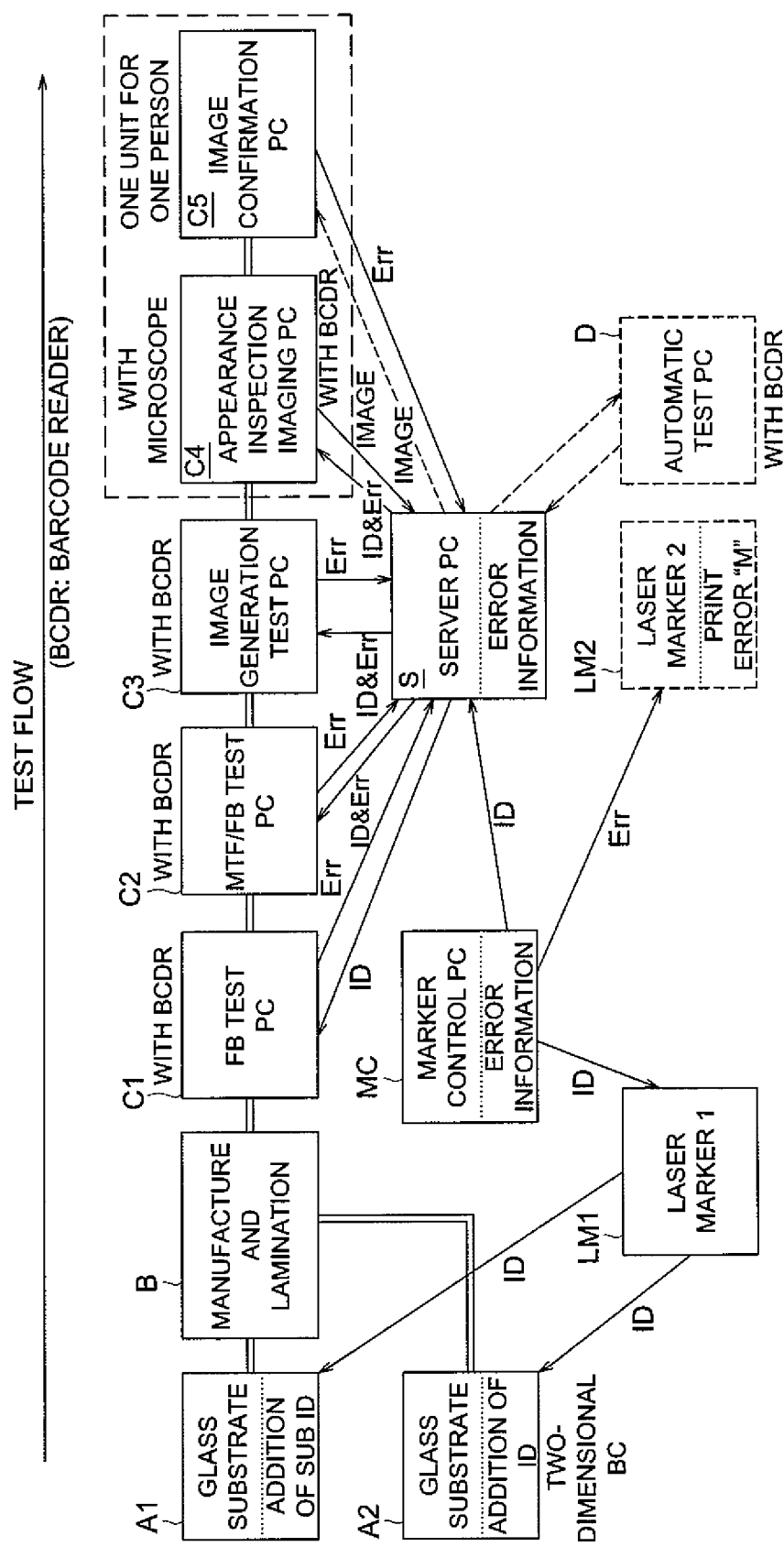
FIG. 56 is a block diagram showing a flow of the quality inspection of the wafer lens.

After that, by using a laser marker LM1, the material layer left in the neighboring part of the aperture stop 18 is selectively removed to form the ID recording region 58, and the material layer left in the neighboring part of the aperture stop 30 is selectively removed to form the ID recording region 60 (corresponding to the blocks A1 and A2 in FIG. 56). "Forming the ID recording region" corresponds to recording the wafer ID.

The laser marker LM1 is controlled by a marker control PC (block MC), and the information about the wafer ID is stored in the marker control PC. The marker control PC controls the laser marker LM1 and provides a wafer ID to individual wafer lenses 52 and 54.

The wafer ID assigned by the marker control PC (block MC) is sent from the marker control PC to a server PC (block S), and the server PC generates a data file of each wafer ID. In the data file, production information such as production date is stored.

The server PC, when it generates a data file, sets component identification information for identifying the lens on the wafer lenses 52 and 54. The component identification information for identifying the lens is set corresponding to individual lenses on the wafer lenses 52 and 54. The individual lenses and their component identification information correspond to each other depending on the position of the region where the lens is formed. In other words, address information is set in the region where each lens is formed, and this address information is used as the identification information of the lens to be formed there. With this arrangement, component identification information for identifying the lens does not have to be recorded on the product.

Inspection information of the lens on the wafer lenses 52 and 54 identified by the wafer ID is stored in the data file assigned with the wafer ID as the production history information in association with the address information of the lens.

In steps S11 and after, the wafer lens manufacturing apparatus 300 is used.

In step S11, the glass substrate 16 is placed on the X-Y stage 304, and the through hole 386 of the X-Y stage 304 is covered with the lid body 388.

In step S12, the X-axis moving mechanism 306 (linear motor 314), the Y-axis moving mechanism 308 (linear motor 344), the air slide guide mechanisms 324, 328, 360, and 368, and the like are operated such that the X-Y stage 304 is slidingly moved in the X-axis direction and the Y-axis direction, while being levitated by air, so as to position the dispenser 380 being located over the molding die 450.

In this step, an alignment mark was previously provided at a predetermined position on the surface plate 302, and the dispenser 380 is positioned by observing the alignment mark through the microscope 384.

After the positioning, the operations of the air slide guide mechanism 324, 328, 360, and 368 are interrupted, the X-Y stage 304 is locked at its current position, and the X-Y stage 304 and the surface plate 302 are kept in contact.

In step S13, a predetermined amount of resin 44 is dropped from the needle part 380a of the dispenser 380 on the molding die 450 of the molding die section 392 (see FIG. 34).

Figure 39:
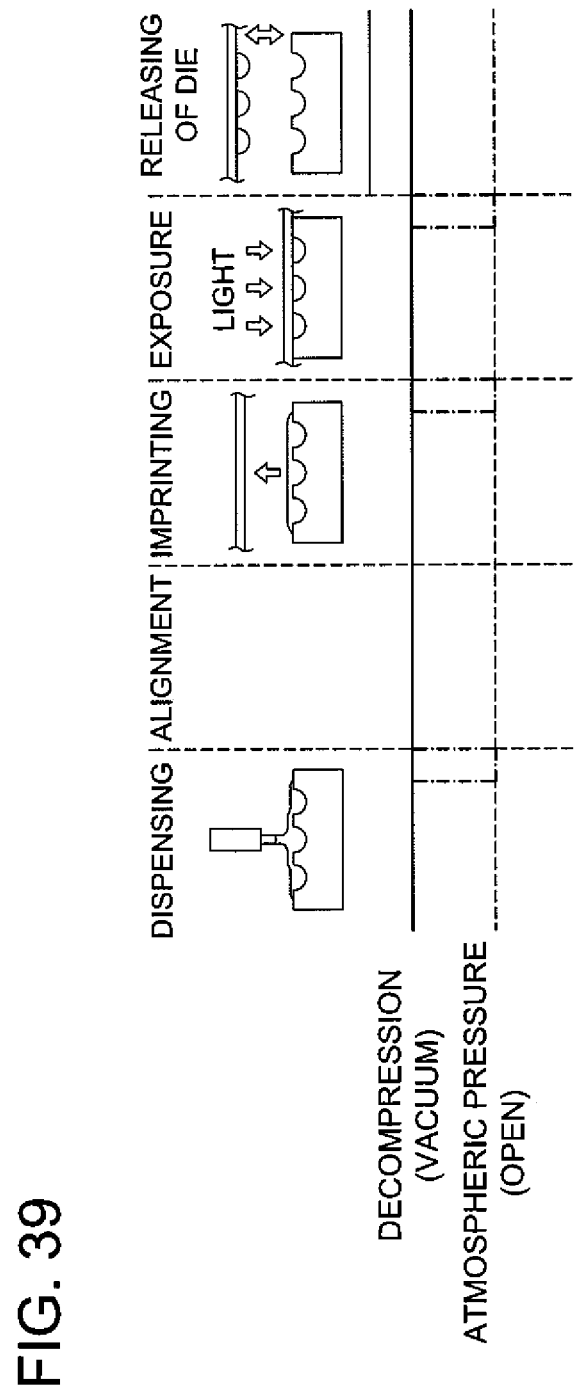
FIG. 39 is a timing chart schematically showing the state of pressure from a dispensing step to a mold releasing step of FIG. 37.

In step S13, as shown in FIG. 39 by the solid line, the decompression mechanism 428 is controlled to decompress the space 462. The term "compress" basically means to make a vacuum state and means to reduce the pressure so that bubbles are not generated inside of the resin 44 and the bubbles taken from air into the resin 44 are removed.

For example, if epoxy-based resin is used as the resin 44 dropped from the dispenser 380, bubbles are prevented from developing when the space 462 is set at 2000 Pa or higher and $10^{-2}$ MPa or lower. When the process is performed under such decompressed state, bubbles cannot be taken into the resin 44. In the embodiment, steps S13-S17 basically shall be performed under the decompression state. The definition of the term "decompression" is in accordance with the above description.

In step S14, the air slide guide mechanisms 324, 328, 360, and 368 are operated such that the X-Y stage 304 is slidingly moved in the X-axis direction and the Y-axis direction while being levitated by air so as to position the previously placed glass substrate 16 to be located over the molding die 450 of the molding die section 392 (see FIG. 30).

After that, as shown in FIG. 40, the laser end-measuring machine 382 is positioned directly above the molding die 450, and the operation of the air slide guide mechanisms 324, 328, 360, and 368 are interrupted to have the X-Y stage 304 and the surface plate 302 locked.

Figure 31B:
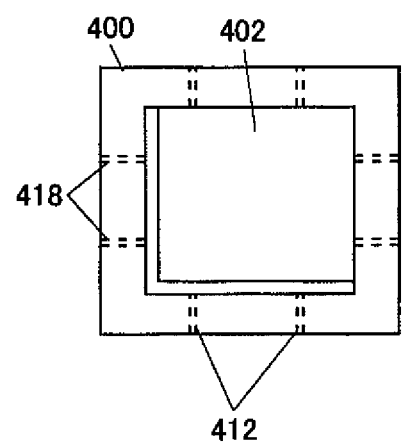

At that moment, the motor 404 and the air slide guide mechanism 410 are controlled to start to blow out air from the blowout holes 412, 414, 416, and 418 to position the Z stage 402 at a predetermined height position. After that, as shown in FIG. 31b, air is blown out from, for example, only the blowout holes 412 and 418 so as to bring the Z stage 304 in contact with the Z-axis guide 302 at some part. With this arrangement, the molding die section 392 is held and locked at a position by the friction force between the Z stage 402 and the Z-axis guide 400.

In this situation, the laser end-measuring machine 382 is used to measure the heights at three points or more, and depending on the measurement result, the inclination of the upper surface of the molding die 450 and the height position of the molding die 450 are calculated; then depending on the output value (the error value of angle α, see FIG. 40), piezoelectric actuator 442 is controlled to have the lower surface of the glass substrate 16 and the upper surface of the molding die 450 parallel.

After that, the locked state is released, and the microscope 384 is positioned directly above the molding die 450. The operation of the air slide guide mechanisms 324, 328, 360, and 368 is stopped to have the X-Y stage 304 and the surface plate 302 locked.

At that time, as shown in FIG. 31b, the air slide guide mechanism 410 is controlled to blow air, for example, only the blowout holes 412 and 418 to bring the Z stage 402 in contact with the inner surface of the Z-axis guide 400 at some part. With this arrangement, the molding die section 392 is locked at a position (positioning done). In other words, the molding die section 392 is held at a position by the friction force between the Z stage 402 and the Z-axis guide 400.

With this arrangement, by bringing the Z-axis guide 400 and the Z stage 402 in contact with each other, the molding die 450 can be surely held at a predetermined position and angle with respect to the Z-axis guide 400. As a result, in the unlocked state the Z stage 402 and the molding die 450 can be smoothly moved, and in the locked state the molding operation can be repeatedly performed at the same posture as when the position is adjusted.

Next, the molding die 450 is sensed through the microscope 384, and based on the detection result, the actual placement position of the molding die 450 is obtained; in conformity with the actual placement position, the axial coordinate of the initial position of the molding die 450, which is predetermined as an axial coordinate, is converted in the controller 470. In detail, positions of at least two points are recognized from above the molding die 450 through the microscope 384, and one of the positions is recognizes as an origin O and the other is recognized as a correction point.

For example, alignment marks are previously provided on the molding die 450 at diagonal positions, and one of the alignment marks is recognized as the origin and the other alignment mark is recognized as the correction point. In addition, in the embodiment, the microscope 384 is used as an example of a position sensing device for sensing the placement position of the molding die 450.

After that, the straight line from the origin O to the correction point correction point for coordinate conversion is calculated, and the error (error value of the angle θ, see FIG. 41), between the calculated straight line and the predetermined axial coordinate is calculated; then from the error, the axial coordinate is converted. That is to say, in the controller 470, the placement position on the plane of the molding die 450 is previously set as the axial coordinate, the error between the previously set axial coordinate and the straight line for coordinate conversion recognized on the microscope 384 and calculated is recognized, and as shown in FIG. 41, the predetermined axial coordinate (see the broken line part) is converted into the axial coordinate (see the solid line part) calculated from the error. With this arrangement, the two-dimensional relative-positional relation between the molding die 450 and the glass substrate 16 can be fixed, and the glass substrate 16 can be moved precisely with respect to the molding die 450.

However, instead of the above axial coordinate conversion in the controller 470, a θ stage 472 (see FIG. 32) for rotating the molding die 450 may be provided, and the θ stage 472 may be controlled to rotate the molding die 450 such that the molding die 450 conforms to the previously set coordinate axes (turning the deviated axial back).

In step S15, the molding die section 392 is position-controlled so that the molding die 450 is raised to a predetermined position with respect to the glass substrate 16, and the molding die 450 is held at the predetermined position.

In detail, the Z-axis movement mechanism 394 (motor 404) is operated so that the shaft 406 extends upward to move the Z stage 402 upward. In this step, based on the output value of the potentiometer installed in the motor 404, the operation of the motor 404 is controlled so as to move the Z stage 402 to the predetermined height position. As a result, the resin 44 is gradually spread by being pressed by the glass substrate 16 and is filled between the molding die 450 and the glass substrate 16.

Also in step S15, the decompression mechanism 428 is controlled to decompress the space 422. By pressing the resin 44 against the glass substrate 16 under the decompressed state, bubbles are prevented to be taken into the resin 44. The decompression of the space 422 does not generate pressure difference between the upper space 424 and the lower space 426, and the glass substrate 16 is thus prevented to warping or deforming.

In step S16, keeping the Z stage 402 at the set position, the light source 390 is turned on to irradiate the resin 44 with light to cure the resin 44. In this step, since decompression mechanism 428 is operated to have the space 422 in decompressed state, the oxygen inhibition to the resin 44 is prevented, thereby surely curing the resin 44. In step S16, the light from the light source 390 may enter the element of the optical sensor 460 and destroy it, and to address this issue a light shielding member is preferably provided on the optical sensor 460 to temporarily shield the element from the light.

In step S16, if the Z stage 402 is kept at the predetermined height position while the resin 44 is cured (when the resin 44 is hardened or after that), possible cure shrinkage of the resin 44 cannot followed by the glass substrate 16, thereby generating distortion in the resin or impairing the transfer of the surface shape of the molding die 450 to the resin 44.

To deal with this issue, it is preferable that after the light source 390 is turned on for a certain time to apply a certain amount of light to the resin 44, the molding die section 392 is pressure-controlled to increase the pressure of the molding die 450 against the glass substrate 16 to a predetermined pressure and hold it. In this step, the piezoelectric actuator 442 is operated to move the molding die 450 upward, based on the output value of the pressure sensor 446.

In step S17, the light source 390 is turned off to stop the application of light to the resin 44. After the termination of the application of light, the motor 404 is operated to contract the shaft 406 downward to move the Z stage 402 downward, thereby releasing the cured resin 44 and the glass substrate 16 from the molding die 450. Also in step S17, since the decompression mechanism 428 is controlled to have the space 422 in decompressed state, the atmospheric pressure does not act and the demolding is accordingly easy. As a result, a plurality of convex lens part 20a whose number corresponds to the number of the depression of the molding die 450 are formed on the glass substrate 16.

Figure 42:
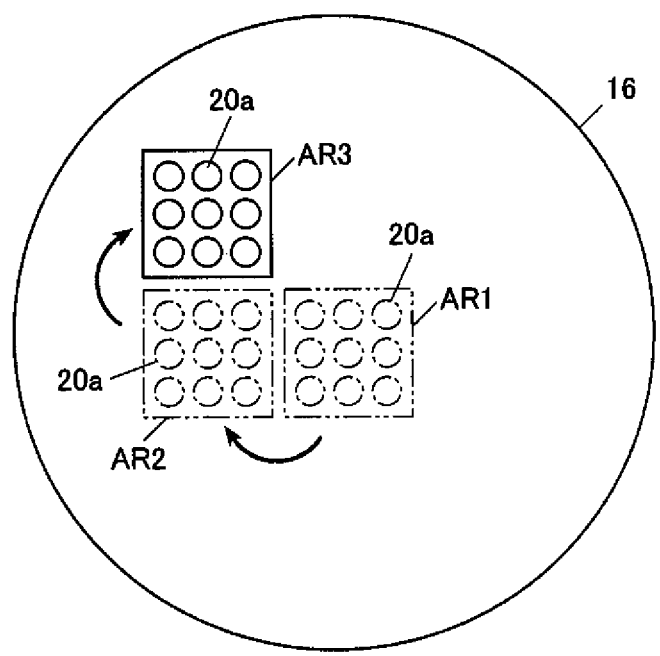
FIG. 42 is a plan view schematically showing relative movement of the molding die.
Figure 43:
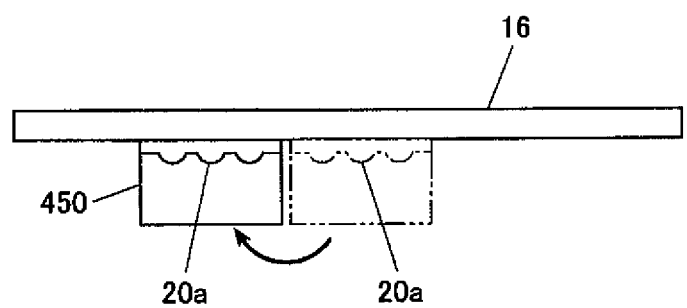
FIG. 43 is a cross section schematically showing the relative movement of the molding die.

After that, the process from step S13 to step S17 is assumed to be one cycle, and this cycle is repeated for predetermined times to sequentially form a predetermine number of convex lens parts 20a on the glass substrate 16 (see FIG. 42 and FIG. 43).

In this process, when the convex lens parts 20a are formed on the glass substrate 16, there is a narrow gap (clearance) is provided, in practice, between the flat surface of the molding die 450 and the glass substrate 16; thus, the non-lens part 20b (see FIG. 1 and FIG. 6) is formed on the neighboring area of the convex lens parts 20a.

In step S18, after the first cycle of process has been completed, the X-axis moving mechanism 306 (linear motor 314), the Y-axis moving mechanism 308 (linear motor 344), the air slide guide mechanism 324, 328, 360, and 368, and the like are operated to move the X-Y stage 304 by a small distance, and then as shown in FIG. 44, the optical sensor 460 is controlled to measure the height positions of the glass substrate 16 and the non-lens part 20b.

Figure 44A:
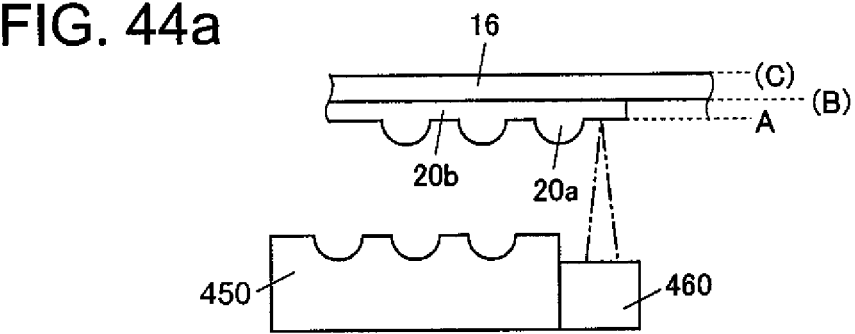
FIG. 44 is a diagram schematically showing measurement of heights of a resin part and the glass substrate.
Figure 44B:
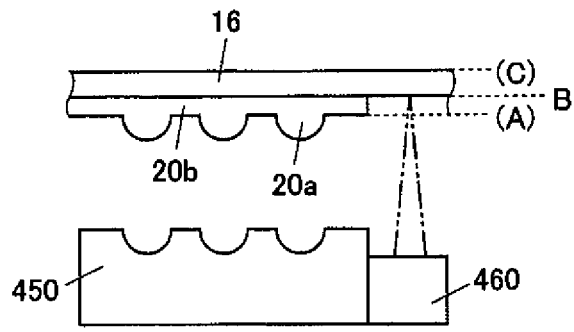
Figure 44C:
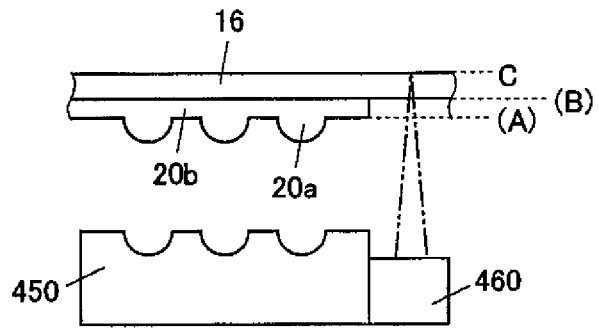

In detail, the non-lens part 20b is made to face the optical sensor 460 to measure the height position of the lower surface of the non-lens part 20b as shown in FIG. 44a; and the glass substrate 16 is made to face the optical sensor 460 to measure the height positions of the lower surface and the upper surface of the glass substrate 16 as shown in FIGS. 44b and 44c.

The measurement of the height position of the glass substrate 16 is conducted before forming the convex lens parts 20a (for example in step S14).

In the following description, the height position of the lower surface the non-lens part 20b is supposed to be "point A"; the height position of the lower surface of the glass substrate 16 is supposed to be "position B", in other words, the surface on which the molding die 450 presses the resin 44 is supposed to be a first glass position; and the height position of the upper surface of the glass substrate 16 is supposed to be "position C", in other words, the surface opposite to the surface on which the molding die 450 presses the resin 44 is supposed to be a second glass position.

Figure 45A:
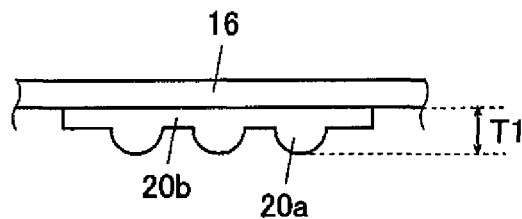
FIG. 45 is a diagram showing a thickness of the wafer lens on the optical axis.

In this case, as shown in FIG. 45a, in order to control the thickness T1 of the convex lens part 20a to be a certain value, the Z-axis movement mechanism 394 (motor 404) is controlled to correct the height position of the molding die 450, based on the height position of point A and the height position of point B, which is a thickness other than the thickness of the lens part, which is determined by the depth of the forming surface in step S15 of the second cycle and later.

That is to say, the position of the molding die 450 is previously stored in the controller 470 as an initial value of the thickness T1 (designed value); thus, in step S5 of the first cycle, the position of the molding die 450 is determined according to the initial value. In step S18, the height positions of the point A and point B are measured to calculate the thickness of the non-lens part 20b from the height positions of the point A and point B, and the calculated values is used to calculate the post-cure thickness T1 (measured value) for that position of the molding die 450. As a result, the difference between the designed T1 and the post-cure thickness T1 (measured value) is calculated; thus, the position of the molding die 450 (position in the X direction) is slightly varied in step S15 of the second cycle and later.

Since the position of the molding die 450 is corrected as described above, the molding die 450 is held with a certain clearance between itself and the lower surface of the glass substrate 16 in step S15 of the second cycle and later, thereby assuring the thickness on the optical axis to be a certain value. In addition, even after the glass substrate 16 has been replaced because a desired convex lens part 20a was not attained in the first cycle, or the convex lens parts 20a was formed fully on the glass substrate 16, the clearance between the molding die 450 and the lower surface of the glass substrate 16 previous to the replacement can be maintained, thereby assuring the thickness T1 of the convex lens part 20a on the optical axis to be a certain value.

In the above description, only the clearance correction is controlled, but the amount of the resin to be dropped on the forming surface of the molding die 450 may also be corrected. In this arrangement, the amount of correction is weighted by the following equation, assuming a correction coefficient to be a.

Correction amount of clearance=$a$×(the clearance between the molding die 450 and the resin-pressing surface of the glass substrate)

Dropping amount of resin=$(1-a)$×(the above clearance)

Figure 45B:
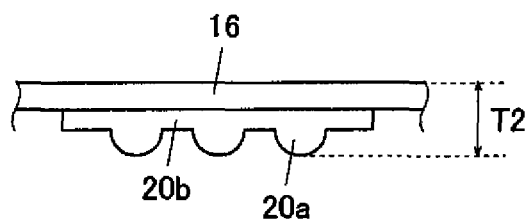

Instead, as shown in FIG. 45b, in order to control the thickness T2, which is a sum of the convex lens part 20a (resin part 20) and the glass substrate 16, to be a certain value, the dispenser 380 is controlled to correct the resin amount to be dropped on the molding die 450 in step S13 of the second cycle and later.

That is to say, the amount of resin 44 to be dropped on the molding die 450 corresponding to T2 (designed value) is previously stored in the controller 470 as an initial value; thus in step S13 of the first cycle, the dropping amount of the resin 44 to be dropped on the molding die 450 is determined, based on the initial value. Then, in step S18, the height positions of the point A and point B are measured during scanning while the flat surface of the molding die 450 and the surface of the glass substrate 16 opposite to the resin-pressing surface are kept parallel and the clearance between these surfaces are kept to a predetermined value; and from the difference between the measured distance from the point A to the point B and the above-mentioned certain clearance, the post-cure thickness T2 (measured value) is calculated. As a result, since the difference of the thicknesses T2 (measured value) between before and after the curing of the resin 44 can be calculated, the dropping amount of the resin 44 is varied by the amount corresponding to the difference, in step S3 of the second cycle and later.

In order to keep the above-mentioned flat surface of the molding die 450 and the surface of the glass substrate 16 opposite to the resin-pressing surface to be parallel and to have a predetermined clearance, the height of the point C may be scanned and measured and the molding die 450 may be moved slightly in the Z direction so as to keep the position C at the certain height.

Since the dropping amount of the resin 44 is corrected as described above, the volume (area×thickness) of the sum of the convex lens part 20a and the part of the glass substrate 16 corresponding to that can be maintained to be a certain value after completing step S17 of the second cycle and later, thereby assuring the thickness T2 on the optical axis to be a certain value.

As described above, since the thicknesses T1 and T2 of the lens part are controlled precisely in the second cycle and later, there is no need for a spacer to be provided between the first lens block and the second lens block for correcting the distance between the lenses. Because such spacer is not needed, it is possible to correctively and precisely cut including spacers between the first lens block and the second lens block or the sensor block to make it into individual pieces.

In step S19, the air slide guide mechanisms 324, 328, 360, 368, and 410 are operated to move the X-Y stage 304 and the Z stage 402 to a predetermined position, and the lid body 388 is finally removed from the X-Y stage 304 to pick up the glass substrate 16.

When the above-described steps S11-S19 (the concave molding die 450 is replaced by the convex molding die 450) are performed on the opposite side of the glass substrate 16 to form the concave lens parts 24a and thus produce the wafer lens 52. In order to manufacture the wafer lens 54, the steps similar to those used for the manufacturing of the wafer lens 52 can be used to produce the wafer lens 54.

In step S1, different glass substrates 16 and 26 may be used between the steps of the first cycle and steps of the second cycle and later. That is to say, in the steps of the first cycle, the glass substrate 16 or 26 for test may be used, and in the steps of the second cycle and later, the glass substrate 16 or 26 for manufacture the wafer lens may be used.

Figure 46:
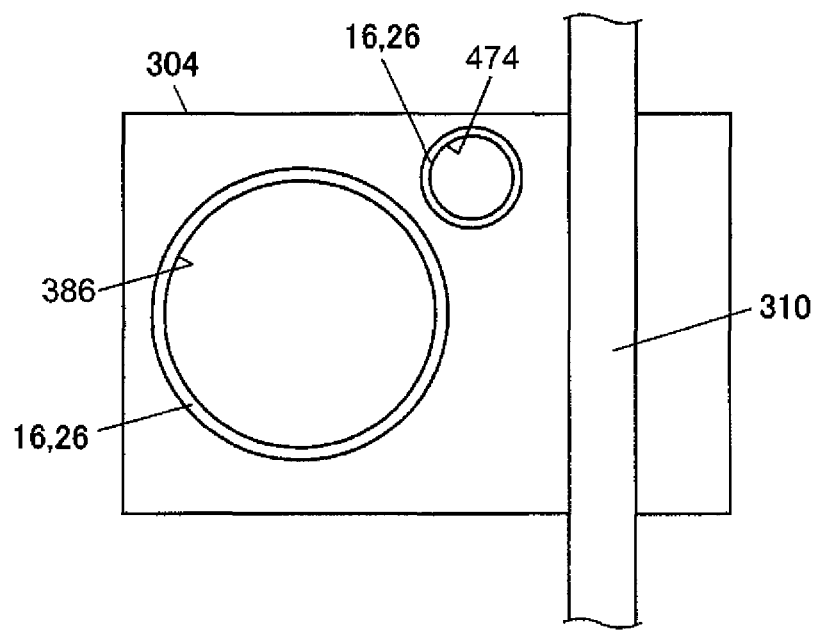
FIG. 46 is a schematic plan view showing a modified example of the wafer lens manufacturing apparatus of FIG. 26 and FIG. 27.

In this case, as shown in FIG. 46, the X-Y stage 304 is provided with, in addition to the through hole 386, a through hole 474 having a diameter smaller than that. The glass substrate 16 or 26 for test is mounted in the through hole 474, and the glass substrate 16 or 26 for manufacture is mounted in the through hole 386. Thus, in the steps of the first cycle, the convex lens parts 20a and the concave lens parts 24a are formed on the glass substrates 16 and 26 for test, and the height positions of the point A, point B, and point C are measured.

In the steps of the second cycle and later, based on the height positions of the point A, point B, and point C measured by using the glass substrate 16 or 26 for test, the convex lens parts 20a and the concave lens parts 24a are sequentially formed on the glass substrates 16 and 26 for manufacturing the wafer lens.

The processes in step S1 can be applied to the production of a plastic die for manufacturing the wafer lenses 52 and 54.

The "plastic die" is a first concave plastic die 200 or a first convex plastic die 210 made by using the concave die 100 or the convex die 180 as a molding die, or is a second concave plastic die 220 or a second convex plastic die 230 made by using the first concave plastic die 200 or the first convex plastic die 210 as a molding die; and it is basically a substrate 204, 214, 224, or 234 on which plastic concavities and convexities are formed (see FIGS. 22-25) in a similar manner that the convex lens parts 20a and the concave lens parts 24a are formed on the glass substrate 16. The use of the plastic dies reduces the frequency of use of the expensive master die, and there is no need for remaking the molding dies frequently, thereby reducing the cost of the wafer lens.

As shown in FIG. 45a, the method in which the position of the molding die 450 is corrected to control the thickness T1 to be a certain value is preferable to manufacture the wafer lens 52 since the T1 of the convex lens 20a is made to be a certain value by using the lower surface of the glass substrate 16 as a reference.

As shown in FIG. 45b, the method in which the dropping amount of the resin 44 is corrected to control the thickness T2 to be a certain value is preferable to manufacture the plastic die since the thickness T2 of the convex lens part 20a and the glass substrate 16 is made to be a certain value by using the upper surface of the glass substrate 16 as a reference.

In the first example, the vicinity of the glass substrate 16 is partially decompressed in steps S13-S17; however the whole of the wafer lens manufacturing apparatus 300 (except the controller 470) may be placed in a closed system such as a chamber and the whole of the wafer lens manufacturing apparatus 300 including the vicinity of the glass substrate 16 may be decompressed.

In the first example, as shown by the part of a one-dot chain line in FIG. 39, opening to the atmospheric pressure may be made in at least one of step S13, step S15, and step S16.

In step S13, filling the resin 44 in the decompressed state prevents bubbles from being taken into the resin, but the surface tension applied to the resin 44 may create bubbles in the resin 44. In order to address this issue, opening to the atmospheric pressure once after decompressing prevents the bubble from occurring, whereby cavities of the resin 44 into the molding die 450 (depressions) can be prevented.

In step S16, the exposure of the resin 44 in the decompressed state surely hardens resin 44 by preventing the cure inhibition of the resin 44 possibly caused by oxygen, and the opening thereafter to the atmospheric pressure improves the transfer from the molding die 450 to the resin 44.

[Manufacturing Method of Wafer Lens (Second Example)]

The second example is different from the first example on the following points but the same as the first example on the other points.

Figure 47:
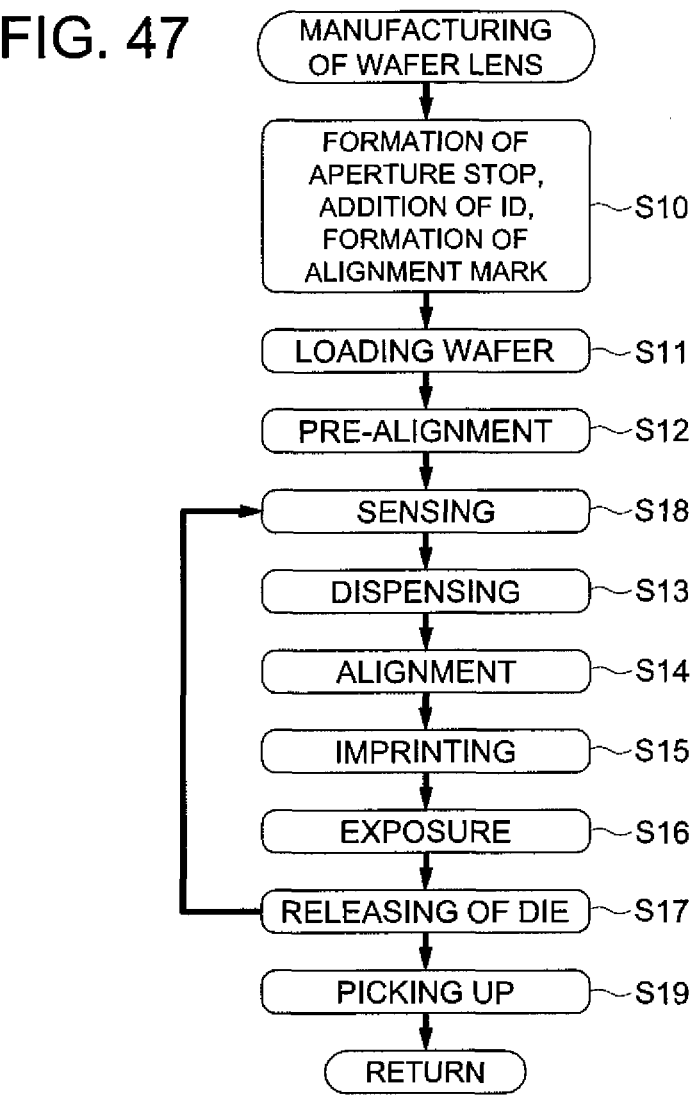
FIG. 47 is a flow chart schematically showing a method (a second example) for manufacturing a wafer lens.

As shown in FIG. 47, step S18 is performed between step S12 and step S13, and step S18 through step S17 are assumed to be one cycle.

In step S18, as shown in FIGS. 44a, 44b, and 44c, the height positions of the point A (non-lens part), point B (the surface of the glass substrate 16 on which the molding die 450 presses the resin 44), and point C (the surface opposite to the pressing surface) are measured. In practice, in the first cycle the points B and points C are measured at plural positions on the glass substrate; and in the second cycle and later the point A is measured to correct the position of the molding die.

As shown in FIG. 45a, in order to control the thickness T1 of the convex lens part 20a to be a certain value, in step S15 of some cycle the Z-axis movement mechanism 394 (motor 404) is controlled to correct the height position of the molding die 450, based on the height positions of the point A and point B measured in the step S18 of the immediately preceding cycle.

Figure 48A:
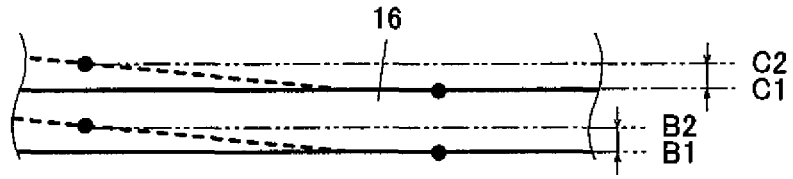
FIG. 48 is a diagram showing a warp and a variation in thickness of the glass substrate.
Figure 48B:
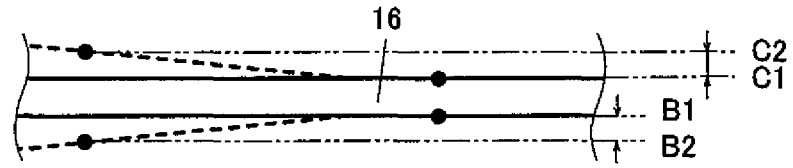

For example, assuming the height position of the point B measured in step S18 of the first cycle to be B1 and the height position of the point B measured in step S18 of the second cycle to be B2, as shown in FIG. 48. In this case, if the glass substrate 16 is deforms and warps slightly (see FIG. 48a) or the glass substrate 16 has variations in thickness (see FIG. 48b), there is a difference between B1 and B2; thus the amount of variation of the glass substrate 16 between the first cycle and the second 2 cycle can be calculated. As a result, in step S15 of the second cycle, the position of the molding die 450 is slightly varied by a distance corresponding to that error, with respect to the position of the molding die 450 in step S15 of the first cycle.

Since the position of the molding die 450 is corrected in this manner, the molding die 450 can be kept at a certain distance from the lower surface of the glass substrate 16 in step S15 of each cycle, thereby controlling the thickness T1 on the optical axis to be a certain value. In addition, since comparison is made, in each cycle, with B measured in the immediately preceding cycle, the thickness T1 can be surely made to be a certain value even if the deformation of the glass substrate 16 such as expansion or contraction is generated by the heat due to the operation of the wafer lens manufacturing.

In the meantime, as shown in FIG. 45b, in order to control the thickness which is the sum of the convex lens part 20a (resin part 20) and the glass substrate 16 to be a certain value, the dispenser 380 is controlled to correct the resin amount to be dropped on the molding die 450 in step S13 of each cycle, depending on the height positions of the point A and point C measured in step S18 of the immediately preceding cycle.

For example, as shown in FIG. 48, assuming that the height position measured in step S18 of the first cycle to be C1 and the height position of the point C measured in step S18 of the second cycle to be C2. In this case, if the glass substrate 16 deforms and slightly warps (see FIG. 48a) or the glass substrate 16 have variations in thickness (see FIG. 48b), there is a difference between C1 and C2; thus the amount of the variation of the glass substrate 16 between the each step of the first cycle and each step of the second cycle can be calculated. As a result, in step S13 of the second cycle, the position of the molding die 450 is slightly varied by a distance corresponding to that error, with respect to the position of the molding die 450 in step S13 of the first cycle.

In addition, also in the second example, the height positions of the point B may be measured during scanning while the flat surface of the molding die 450 and the surface of the glass substrate 16 opposite to the resin-pressing surface are kept parallel and the clearance between these surfaces are kept to a predetermined value, and the variations of the thickness of the glass substrate 16 may be measured from this.

Since the dropping amount of the resin 44 is corrected as described above, the volume (area×thickness) of the sum of the convex lens part 20a and the part of the glass substrate 16 corresponding to that can be maintained to be a certain value in each cycle, thereby assuring the thickness T2 on the optical axis to be a certain value. In addition, since comparison is made, in each cycle, with C measured in the immediately preceding cycle, the thickness T2 can be surely made to be a certain value even if the deformation of the glass substrate 16 such as expansion or contraction is generated by the heat due to the operation of the wafer lens manufacturing.

However, the height positions of the point B and point C may be measured in advance, before forming convex lens parts 20a (see AR1-AR3 in FIG. 42), in all or some arbitrary regions of the glass substrate 16 which press the molding die 450, and the height positions of the point B and point C in a specific region may be used as references for calculating the variations of the glass substrate 16 in the other regions, and thus the amount of the resin 44 or the position of the molding die 450 may be corrected.

[Manufacturing Method of Wafer Lens (Third Example)]

The third example is different from the first example on the following points but is the same as the first example on the other points.

Figure 49:
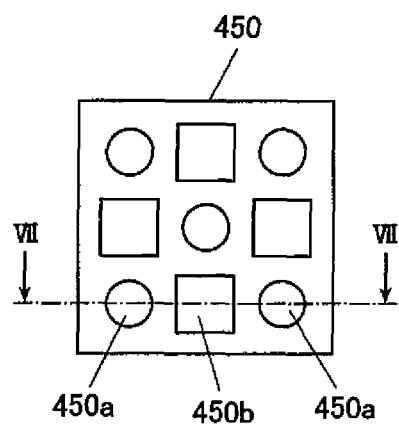
FIG. 49 is a schematic plan view showing a modified example of the molding die.

First, water-repellent treatment has been conducted on the surface of the molding die 450. In addition, the depressions 450a (cavities) are arranged in a zigzag alignment when the molding die 450 is viewed from above, as shown in FIG. 49. In other words, there is enough clearance for one depression 450a to be provided between adjacent depressions 450a, and the depressions 450a are arranged in a thinned-out manner.

Figure 50:
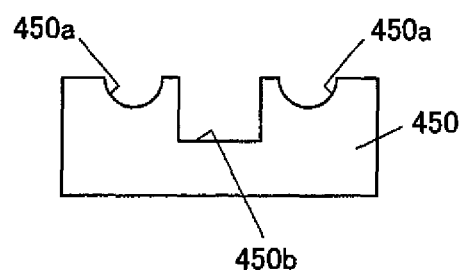
FIG. 50 is a cross section along VII-VII line of FIG. 49.

In addition, as shown in FIG. 50, between the adjacent depressions 450a, there is provided a depression 450b having enough depth for the depression 450a to be buried.

Figure 51:
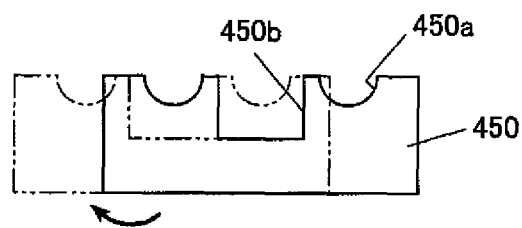
FIG. 51 is a cross section schematically showing relative movement of the molding die.
Figure 52:
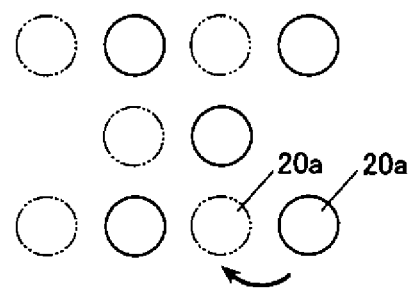
FIG. 52 is a plan view schematically showing an order in forming the lens part.

In step S14 of each cycle, the glass substrate 16 is aligned such that the formed convex lens parts 20a and the depressions 450b of the molding die 450 are faced with each other, and the depressions 450a of the molding die 450 are faced with the area between the formed convex lens parts 20a. Relatively, as shown in FIG. 51, the glass substrate 16 is aligned such that the molding die 450 is shifted one by one in increments of the size of the depression 450a. As a result, as shown in FIG. 52, the convex lens parts 20a are formed such that the space between the convex lens parts 20a is filled in series.

In this case, since water-repellent treatment is conducted on the surface of the molding die 450; even if the resin 44 is filled slightly to excess, the excessive resin 44 is stuck to the surface of the glass substrate 16 and does not drop into the depression 450b. When the next convex lens parts 20a are formed between the formed convex lens parts 20a, the non-lens part 20b surrounding the convex lens parts 20a works as a wall to prevent the excessive resin 44 from dropping into the depression 450b.

The configuration of the molding die 450 and its relative displacement only have to satisfy the condition of p/s≥2, where the pitch of the depressions 450b (that is, the pitch of the depressions 450a) is assumed to be p mm and the displacement pitch of the molding die 450 is assumed to be s mm.

The molding die 450 is not limited to one in which the depressions 450a and the depressions 450b are arranged in a lattice (two-dimensionally), but they may be linearly (one-dimensionally) arranged only in a relative traveling direction.

According to the third example, the depressions 450a of the molding die 450 are thinned out and arranged so as to satisfy P/s≥2, and the resin 44 is dropped in the depressions 450a in step S13; thus the resin 44 is filled in the depressions 450a in just proportion.

In step S14, since the glass substrate 16 is aligned such that the depressions 450a face the area between the formed convex lens parts 20a, the convex lens parts 20a are formed in a thinned-out manner on the glass substrate 16, and new convex lens parts 20a are formed in the thinned-out region. In this process, since the convex lens parts 20a are independently formed, sink marks can be prevented from occurring.

As described above, in the resin part 20, the generation of a projection on the non-lens part 20b and the generation of an unfilled part in the convex lens part 20a can be prevented.

Figure 53:
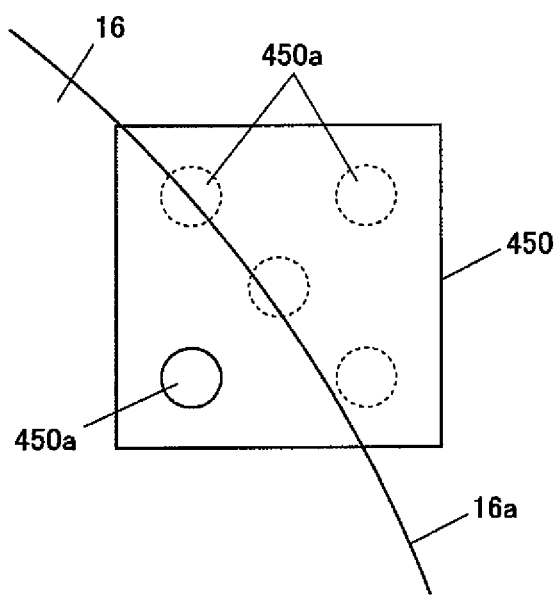
FIG. 53 is a plan view schematically showing how to deal when the molding die faces the outer circumference of the glass substrate.

However, as shown in FIG. 53, in the case of the molding die 450 and the glass substrate 16 are positioned to face each other on the outer circumference 16a of the glass substrate; in step S13, the resin 44 is dropped only in the depression 450a (solid line) facing the inside of the glass substrate 16 but not dropped in the depression 450a (broken line) facing the outside or the outer circumference 16a of the glass substrate 16.

Figure 54:
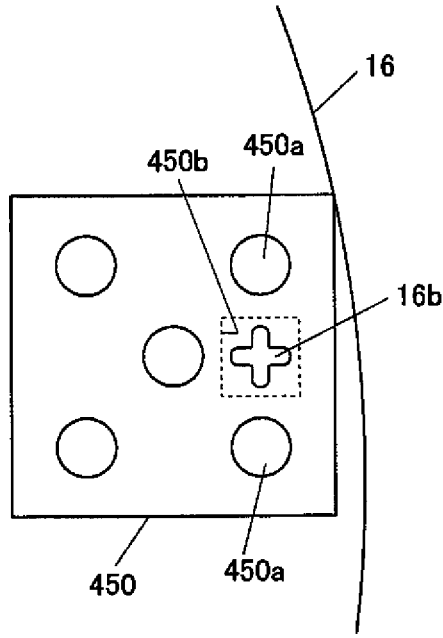
FIG. 54 is a plan view schematically showing how to deal when the glass substrate is provided with an identifier.

As shown in FIG. 54, in the case that the identifier 16b (such as the alignment mark 64a for alignment and the production number of the glass substrate 16) is provided on the glass substrate 16; in step S14, the glass substrate 16 is aligned such that the identifier 16b faces the depression 450b of the molding die 450 not to form the convex lens part 20a on the identifier 16b.

[Lamination of Wafer Lenses and Quality Inspection (Step S2)]

Figure 55:
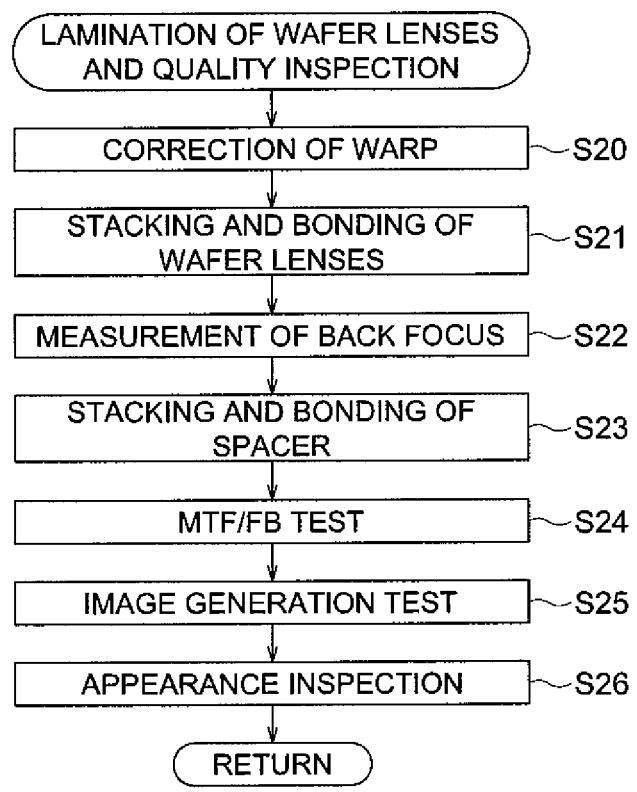
FIG. 55 is a flow chart schematically showing how to laminate and inspect quality.

As shown in FIG. 55, the wafer lens 52 or 54 is subjected to lamination and quality inspection generally through steps S20-S26.

Step S20: Correct the warp of the wafer lens.
Step S21: Stack and bond the wafer lenses.
Step S22: Measure the back focus of the wafer lens.
Step S23: Stack and bond the spacer to form a body of stacked wafer lenses.
Step S24: Conduct an MTF/FB test of the body of stacked wafer lenses.
Step S25: Conduct an image generation test of the body of stacked wafer lenses.
Step S26: Conduct an appearance inspection of the body of stacked wafer lenses.

Figure 57:
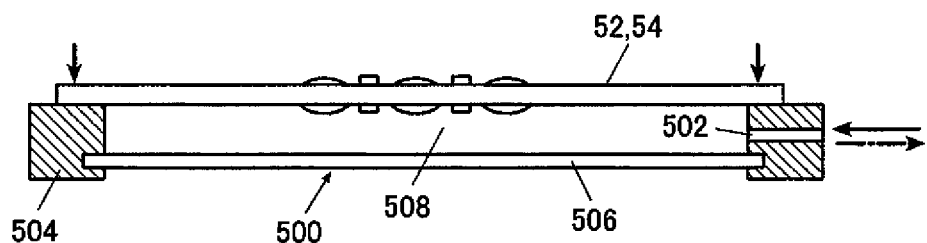
FIG. 57 is a cross section showing a schematic configuration of a warp correction tool.
Figure 58:
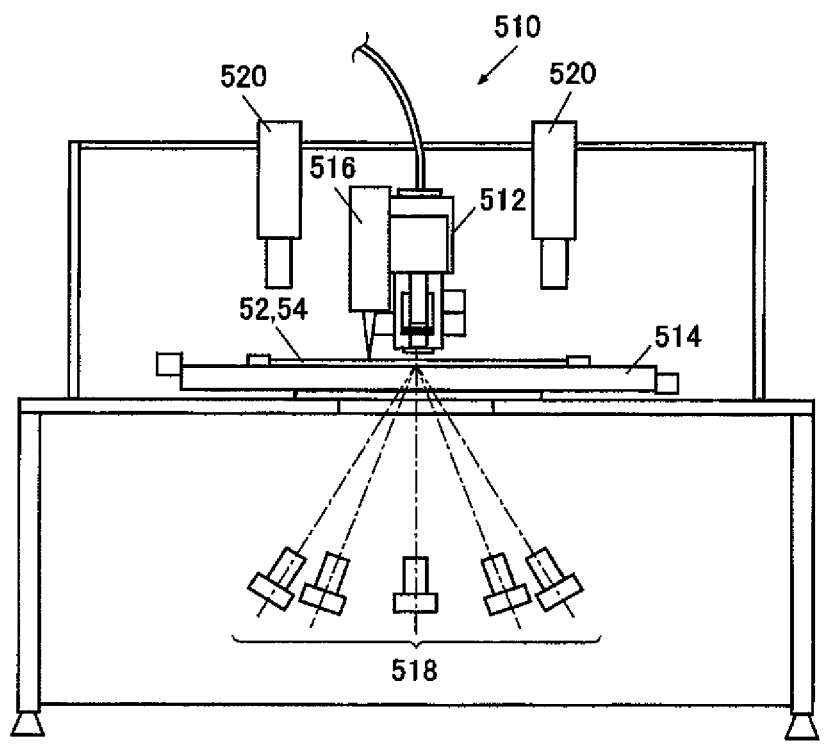
FIG. 58 is a diagram showing a schematic configuration of an MTF/FB tester.

In step S20, the warp of the wafer lens 52 or 54 is corrected one by one for the after-mentioned MTF/FB test and image generation test by using a warp correction tool 500 of FIG. 57 and a MTF/FB tester 510 of FIG. 58.

If the wafer lens 52 or 54 to be tested has a warp, no right measurement value can be obtained. The correction of the warp of the wafer lens 52 or 54 is effective for precise measurement.

As shown in FIG. 57, the correction tool 500 is equipped with a frame body 504 having an air hole 502 and a sealing glass 506 for enclosing one side of the frame body 504.

As shown in FIG. 58, the MTF/FB tester 510 is equipped with a light source section 512 for applying predetermined light to the lens; an automatic X-Y stage 514 for carrying the wafer lens 52 or 54 thereon and moving it the two-axial X-Y direction perpendicular to the light applying direction (Z axis); a range sensor 516 fixed on the light source section 512 for measuring the distance to the lens; a measurement optical system 518 having a plurality of CCD cameras; and two cameras 520 for rotational alignment of the wafer. The light source section 512 and the range sensor 516 fixed thereto are movement-controlled in the vertical direction (Z axis).

Figure 59:
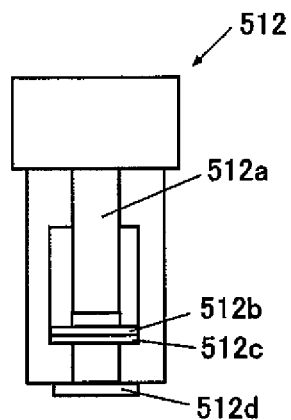
FIG. 59 is a detailed diagram of a light source of the MTF/FB tester shown in FIG. 58.
Figure 60:
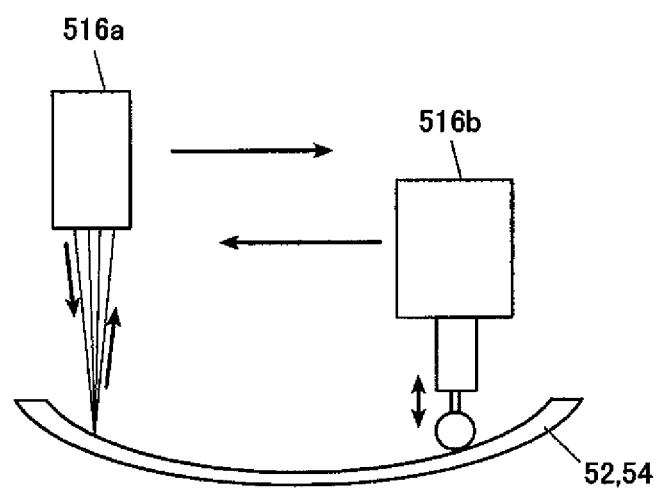
FIG. 60 is a side view of a range sensor of the MTF/FB tester shown in FIG. 58.

As shown in FIG. 59, the light source section 512 is equipped with a halogen fiber 512a; a band-pass filter 512b; a diffusion plate 512c; and a chart 512d. As the range sensor 516, an autocollimator 516a, a contact displacement gauge 516b shown in FIG. 60, or other laser triangulation displace meter is used.

In step S20, the wafer lens 52 or 54 is placed on the other side of the frame body 504. The circumferential area of the wafer lens 52 or 54 is in contact with the frame body 504 and fixed in close contact to the seal to prevent air leakage. As the method for tight sealing, there can be employed a method in which the circumferential area of the wafer lens 52 or 54 is mechanically pressed against the dine body 504, a method in which porous absorption plate is built in the part of the frame body 504 on which the wafer lens 52 or 54 is placed, so as to hold the wafer lens by sucking and other methods.

After that, the warp correction tool 500 holding the wafer lens 52 or 54 is placed on the automatic X-Y stage 514 of the MTF/FB tester 510. The position in the Z-axis direction of the range sensor 516 is fixed, and the warp of the wafer lens 52 or 54 is measured by the range sensor 516 with the automatic X-Y stage 514 being moved. For the measurement of the warp, a device other than the MTF/FB tester 510 may be used.

When the thus measured warp of the wafer lens 52 or 54 is convex upward in FIG. 57, the sealed space 508 is decompressed by an air pump through the air hole 502; instead when the warp is concave upward, the sealed space 508 is inflated with air; thus the wafer lens 52 or 54 is corrected to be flat with the warp reduced. When the warp of the wafer lens 52 or 54 has been corrected, the pressure in the sealed space 508 is held to keep the wafer lens 52 or 54 under the corrected state.

By using the warp correction tool 500, the warp of the wafer lens 52 or 54 can be corrected The sealing glass 506 of the warp correction tool 500 is light transmissive and optical measurements of the wafer lens 52 or 54 can be performed with no difficulty.

In step S21, the wafer lenses 52 and 54, in which the warps have been corrected by the warp correction tool 500, are aligned with each other and stacked and bonded.

Figure 61:
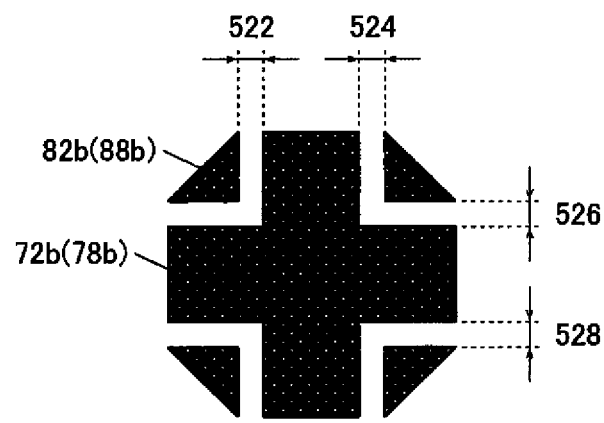
FIG. 61 is a schematic diagram showing the alignment marks viewed and aligned to stack the wafer lenses.

When aligning the wafer lenses 52 and 54, the alignment marks 72b and 78b of the wafer lens 52 and the alignment marks 82b and 88b of the wafer lens 54 are referenced and aligned (see FIG. 6). When the alignment marks 72b and 78b are aligned with the alignment marks 82b and 88b, the four clearances 522, 524, 526, and 528 are all the same as shown in FIG. 61. With this measure, the positional error between the wafer lenses 52 and 54 is prevented.

In bonding the wafer lenses 52 and 54, at least one of the non-lens part 24b of the wafer lens 52 and the non-lens part 28b of the wafer lens 54 is supplied with adhesive, and thus the wafer lenses 52 and 54 are bonded at the predetermined position at which the lenses are aligned. In applying adhesive, a screen printing technique (adhesive is filled in the opening sections of the printing plate, and the adhesive is ejected on the non-lens part 24b or 28b through the opening sections by a squeegee being slid on the printing plate and is transferred thereon) is used, for example.

In step S22, in order to select a spacer substrate 56 having an appropriate thickness, an FB test PC (block C1) of FIG. 56 is used to measure the focal length fb of each lens unit in the composite wafer lens. The "composite wafer lens" represents here a laminated and bonded body of the wafer lens 52 and the wafer lens 54 but does not include the spacer substrate 56. In addition, the "lens unit" represents here a set of the convex lens part 20a, the concave lens part 24a, the concave lens part 28a, and the convex lens part 32a.

The FB test PC controls the FB tester and measures sequentially the focal length fb of each lens unit on the composite wafer lens, and reads the wafer ID of the wafer lens 54 from the ID recording region 60 on the composite wafer lens under test with a built-in barcode reader to recognize the ID of the test object.

In addition, since the composite wafer lens can be identified by either of the wafer ID of the wafer lens 52 or the wafer ID of the wafer lens 54, it is enough to any one of the two. In this embodiment, the wafer ID and the data file of the wafer lens 54 are used. Of course, for the information management of the individual wafer lens 52, the wafer ID of the wafer lens 52 and its data file are used; and for the information management of the individual wafer lens 54, the wafer ID of the wafer lens 54 and its data file are used.

The FB test PC downloads the data file corresponding to the ID from the server PC, stores the testing information in the data file, and uploads it on the server PC, so that the server PC updates the data file.

The testing information stored in the data file by the FB test PC includes: the information for identifying the most appropriate spacer substrate 56, and the information (error information Err) for identifying the lens units which will be out of standard when that spacer substrate 56 is selected.

In step S23, the spacer substrate 56 selected on the basis of the testing information stored in the ID data file of the wafer lens 54 is stacked and bonded in combination with the composite wafer lens to make the body of stacked wafer lenses.

Figure 62:
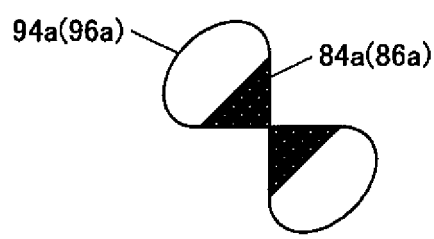
FIG. 62 is a schematic diagram showing the alignment marks viewed and aligned to stack a spacer.

In aligning the composite wafer lens with the spacer substrate 56, the alignment marks 84a and 86a of the wafer lens 54 are aligned with 94a and 96a of the spacer substrate 56 (see FIG. 6). When aligning the alignment marks 84a and 86a with the alignment marks 94a and 96a, these marks are matched at their centers, and the part of them are overlapped, as shown in FIG. 62. This arrangement prevents the composite wafer lens and the spacer substrate 56 from being off alignment.

In bonding the composite wafer lens and the spacer substrate 56, at least one of the non-lens part 32b of the wafer lens 54 and the spacer substrate 56 is supplied with adhesive, and the composite wafer lens and the spacer substrate 56 are bonded at the predetermined position at which they are aligned. In applying adhesive, a screen printing technique (adhesive is filled in the opening sections of the printing plate, and the adhesive is ejected on the non-lens part 32b or the spacer substrate 56 through the opening sections by a squeegee being slid on the printing plate and is transferred thereon) is used, for example.

In the above-described process, the appropriate spacer substrate 56 and the composite wafer lens are stacked and bonded, and it is preferable to select and determine the most appropriate spacer substrate 56 from plural spacer substrates 56 which are previously formed to have different thicknesses. Instead, it is possible to employ a configuration in which a spacer having the most appropriate thickness is secured by using a sheet as a separate member or by adjusting the thickness of adhesive for a spacer substrate 56 having the identical thickness or one spacer substrate 56 selected from the plural kinds of spacers.

In step S24, the MTF/FB test of each lens unit on the body of stacked wafer lenses 50 is performed by using the MTF/FB test PC (block C2) of FIG. 56 and the MTF/FB tester 510 of FIG. 58.

In step S24, the body of stacked wafer lenses 50 is placed on the automatic X-Y stage 514. The MTF/FB test PC measures an MTF (Modulation Transfer Factor) value at the lens center by one CCD camera of the measurement optical system 518, lifts up and down the light source section 512 to identify fb at which the MTP value is maximized, and calculates the fb value on the basis of the output value of the range sensor 516, and further, measures the MTF values on the circumferential area of the lens for that fb value by the other four CCD cameras of the measurement optical system 518, and calculates the percentage of the MTF values on the circumferential area with respect to the maximum MTF value at the lens center.

The MTF/FB test PC controls the MTF/FB tester 510 to perform the above-mentioned measurement and calculation for every application of light having different frequency. Based on these obtained values, the MTF/FB test PC picks up the non-standard lens units.

The MTF/FB test PC recognizes the ID of the test object by reading the wafer ID of the wafer lens 54 on the ID recording region 60 of the body of stacked wafer lenses 50 under test with the built-in bar code reader.

The MTF/FB test PC downloads the data file corresponding to the ID from the server PC, stores the testing information in the data file, and uploads it on the server PC, so that the server PC updates the data file.

The testing information stored in the data file by the MTF/FB test PC includes information (error information Err) for identifying the non-standard lens unit.

In step S25, the image generation test PC (block C3) of FIG. 56 is used.

The image generation test PC reads the wafer ID of the body of stacked wafer lenses 50 from the ID recording region 60 on the composite wafer lens under test with a built-in barcode reader to recognize the ID of the test object. The image generation test PC downloads the data file corresponding to the ID from the server PC; refers to the error information Err in the MTF/FB test; excludes the lens units which were determined to be out of standard in the MTF/FB test from the test; and performs the image generation test on all the rest of the lens units.

Figure 63:
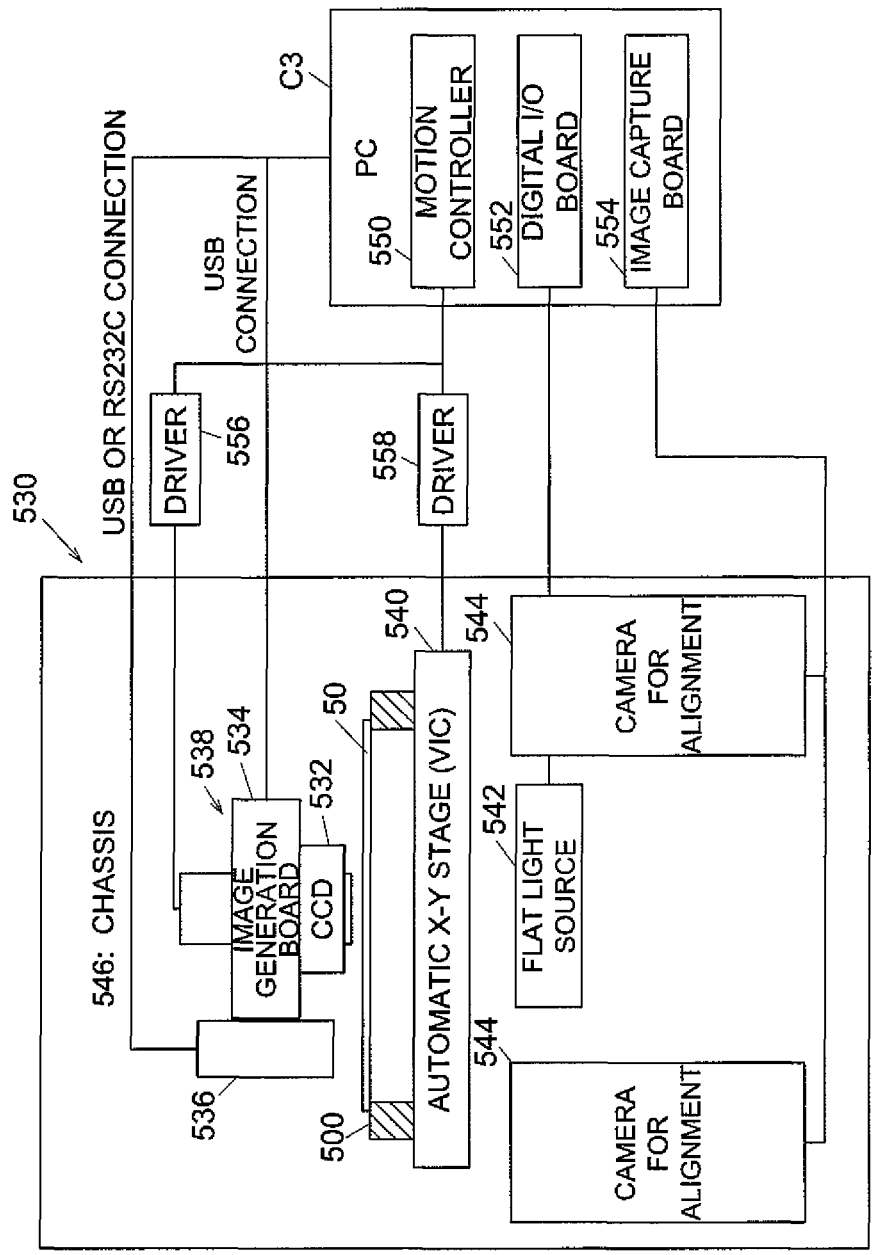
FIG. 63 is a diagram showing a schematic configuration of an image pickup tester.

The image generation test PC controls the image pickup tester 530 shown in FIG. 63 to perform the image generation test on the lens units on the body of stacked wafer lenses 50. The image pickup tester 530 is equipped with a measurement head 538 collectively including a CCD 532, an image generation board 534, and a range sensor 536, and the measurement head 538 is movement-controlled in the vertical (Z axis) direction.

In addition, the image pickup tester 530 is equipped with an automatic X-Y stage 540, a flat light source 542, and two cameras for alignment 544; and the chassis 546, and the warp correction tool 500 are shared with the MTF/FB tester 510.

The image generation test PC (block C3) includes a motion controller 550, a digital I/O board 552, and an image capture board 554. The motion controller 550 is connected to an actuator for moving the measurement head 538 through a driver 556, and is connected to an actuator for moving the automatic X-Y stage 540 through a driver 558. The digital I/O board 552 is connected to the flat light source 542 and causes the flat light source 542 to emit light. The image capture board 554 is connected to the cameras for alignment 544 to capture images taken by the cameras for alignment 544. The range sensor 536 is also connected to the image generation test PC.

In step S25, the body of stacked wafer lenses 50, which is supported by the warp correction tool 500, is placed on the automatic X-Y stage 540 to be subjected to the image generation test. After the test, the image generation test PC stores the testing information in the corresponding data file, and uploads it on the server PC, and the server PC updates the data file. The testing information stored in the data file by the image generation test PC includes information (error information Err) for identifying the non-standard lens units.

In step S26, the appearance inspection is performed by using an appearance inspection imaging PC (block C4) of FIG. 56, and image confirmation is performed by using a camera for image confirmation PC (block C5) of FIG. 56. These tests are supposed to be conducted by an inspector, but an automatic test PC (block D), in which these tests conducted by an inspector are automated, may be used for these tests.

The PCs C4, C5, and D recognize the ID of the test object by reading the wafer ID of the wafer lens 54 on the ID recording region 60 on the body of stacked wafer lenses 50 under test with a built in barcode reader BCDR.

The PCs download the data file corresponding to the ID from the server PC; refer to the error information Err in the previously completed test; exclude, from the test, the lens units which are already determined to be out of standard; and perform the test or output images for the tests, with respect to all the rest of the lens units. The PCs store the testing information in the corresponding data file, upload it on the server PC, and the server PC updates the data files. The testing information in the data file stored by the PCs C4, C5, and D includes information (error information Err) for identifying the non-standard lens units.

During the tests or after the completion of all the tests, a surface map of the wafer lens is displayed on an image display device if needed, for example, on response to the operator's instruction; thus the testing information of the lens unit is displayed on the position on the surface map corresponding to the region where the optical component as a test object is formed, based on the data file identified by the wafer ID of the target wafer lens 54.

Figure 64:
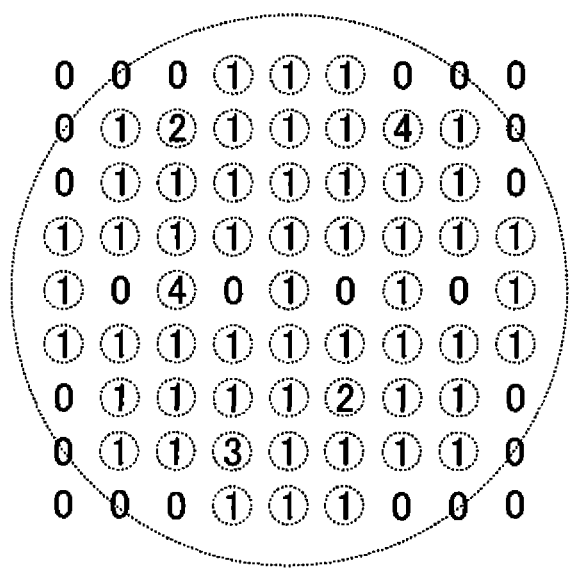
FIG. 64 is a mapping diagram of test information (error data) corresponding to the wafer lenses.

FIG. 64 shows an example of the display of the error information, where the error information of the lens unit stored in the data file is displayed at the positions of the corresponding lens unit on the surface map of the body of stacked wafer lenses 50.

In FIG. 64, the character "0" represents an invalid region, in which a lens unit is not formed at all; the character "1" represents a lens unit which was normal and passed the test; the character "2" represents a lens unit which was determined to be no good in the MTF/FB test; the character "3" represents a lens unit which did not pass the image generation test; and the character "4" represents a lens unit which did not pass the appearance inspection.

After the completion of all the above-mentioned tests, based on the error information Err stored in the data file, the optical components which have determined to be no-good (the lens units having characters "2", "3", or "4" displayed in FIG. 64) are marked. In details, a visual display (for example, "X" mark) for indication of no-good is formed by selectively machining the surface of convex lens part 20a by using a laser marker LM2. In this embodiment, since the convex lens part 20a is transparent, the laser marker LM2 performs a color changing treatment on the convex lens part 20a.

The thus assembled and tested body of stacked wafer lenses 50 is cut on the dicing lines 61 between the non-lens parts 20b, 24b, 28b, and 32b by a blade and the like into individual lens units, as shown in FIG. 6.

Since the rejected articles are marked as such, the separated lens units can be used, rejecting the test-rejected articles. With this arrangement, in the step of assembling with the sensor unit 6 in the separate process after the cutting step, there is an effect that a rejected article is not used even by mistake.

When the error information Err and the wafer lenses 52 and 54 having the wafer ID are provided in a set to the aforementioned separate process, the operator or the manufacturing device of the process can perform a manufacture control in which the rejected articles are not included in the product by referring to the provided wafer ID and error information Err.

In addition, the tests in steps S24-S26 may be performed on individual wafer lens 52 or 54 instead of on individual body of stacked wafer lenses 50.

[Assembly of Lens Unit and Sensor Unit (Step S3)]

Figure 65:
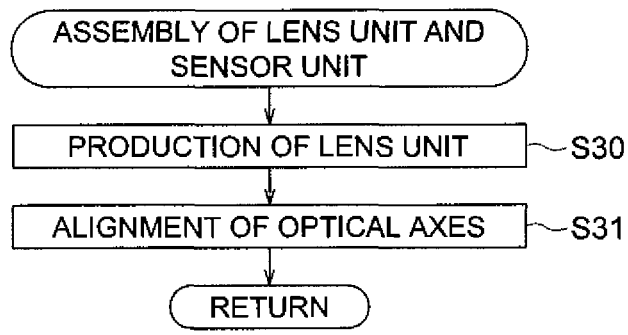
FIG. 65 is a flow chart schematically showing how to assemble a lens unit and a sensor unit.

As shown in FIG. 65, the lens unit 4 and the sensor unit 6 are assembled generally in steps S30-S31.

Step S30: Produce the lens unit.

Step S31: Align the lens unit and the sensor unit on the optical axis to assemble the both units.

In step S30, an IR cut filter 42 is mounted on the spacer 12, and the lens blocks 8 and 10 are covered by the covering package 14.

In this configuration, since the lens unit 4 is mounted in the covering package 14, there is a clearance between the covering package 14 and the lens unit 4. A high production tolerance can make this clearance small to a certain extent, but there is a limit. In addition, if the covering package 14 is made to be applicable to the lens units 4 of different specifications, such clearance specifically tends to be generated. If such clearance exists, the incident light entering through the clearance may be reflected on the inner surface of the package, may enter the lens unit 4 from the side surface section of the lens unit 4, and thus may enter the sensor as a harmful stray light, thereby affecting the image quality.

In order to deal with this issue, after the individually cut lens units 4 are assembled on a wafer of the sensor units 6, a light blocking material may be filled in the clearances between the lens units 4 before being cured; then the wafer of the sensor units 6 may be divided into individual pieces by dicing; and the lens units 4 may be equipped with the covering packages 14.

With this configuration, since the side surfaces of the lens unit 4 have a light blocking member formed thereon, it is possible to block the harmful light entering through the side surface from the clearance to the covering package 14. In addition, since the cutting is done after the light blocking material is filled, the cut side surface of the lens unit 4 is made to be a single face; thus the covering package 14 does not have to be in an unusual form, thereby configuring a generally compact image pickup device. However, the light blocking material is not limited to one to be filled and cured, but the side surfaces of the lens unit 4 may be treated with primer and then be supplied with a light blocking material.

The light blocking material may be photo-curable resin similar to that of the resin part of the lens blocks 8 and 10, and alternatively may be a thermosetting resin, and a light blocking black resin is especially preferably used to address an issue of ghost. The material may be one having a shielding effect for shielding from the electromagnetic wave giving adverse effect to the sensor 36 of the incident light.

In addition, this is different from the shielding from the clearance, but the covering package itself may be configured by a shielding member as another measure. In that case, the electric connection between the sensor substrate and the shielding member is realized such that the sensors is divided into individual pieces by dicing, so that there appears on the cut surface an Si passing-through electrode, which can be adhered to the shielding member with conductive adhesive.

Figure 66:
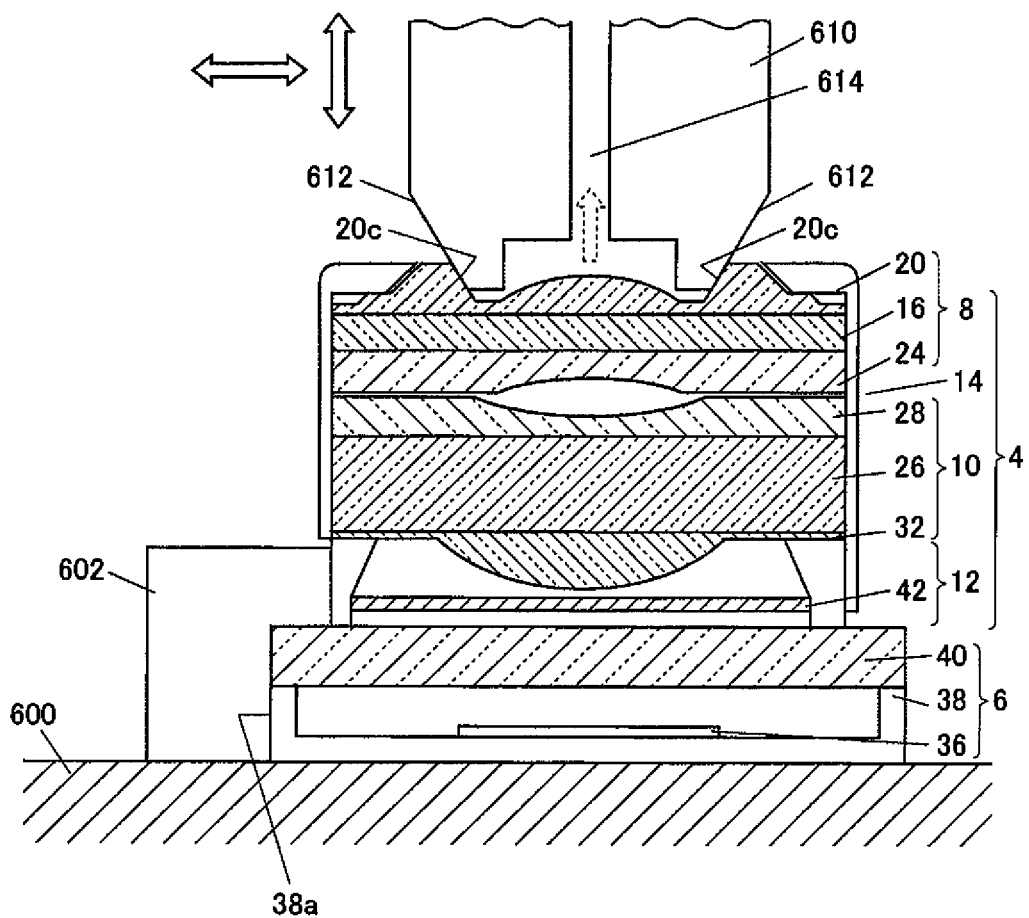
FIG. 66 is a cross section schematically showing how the lens unit and the sensor unit are assembled.
Figure 67:
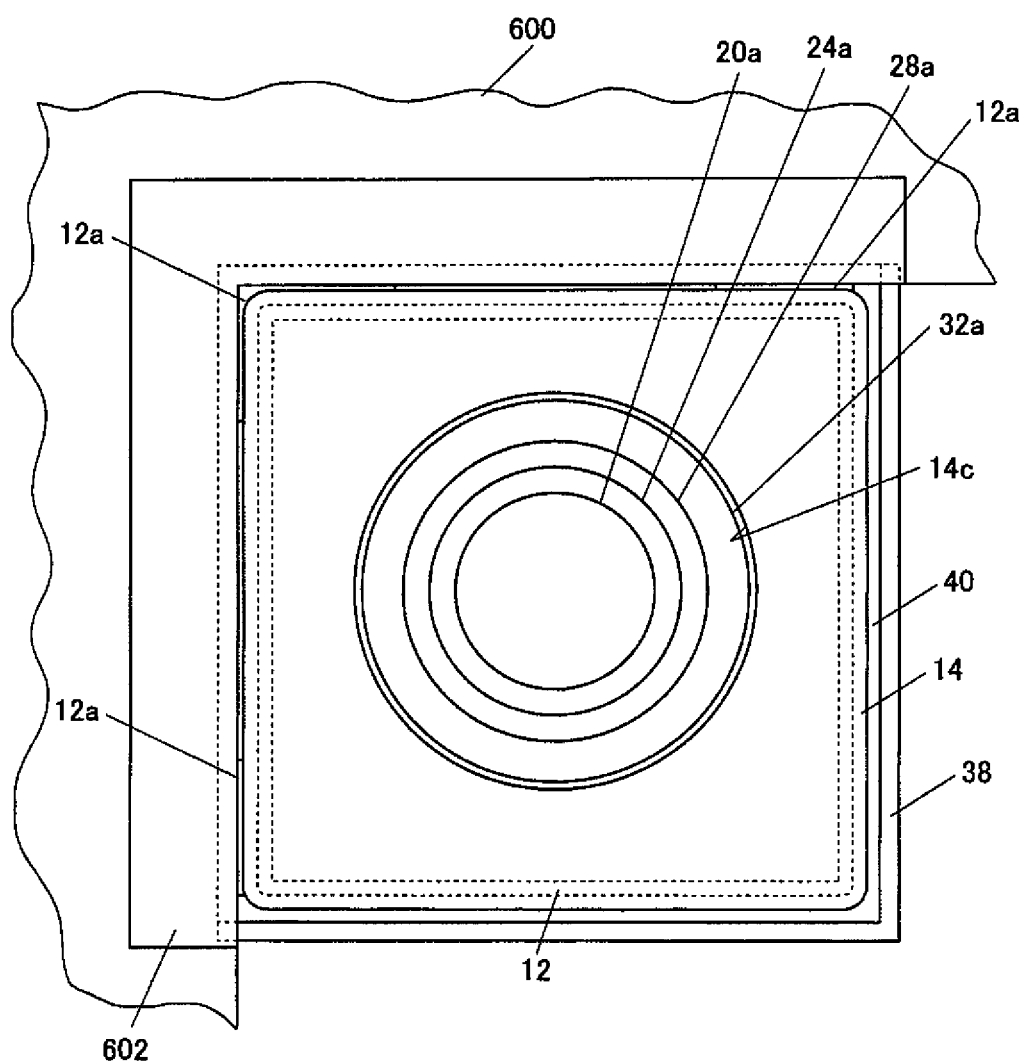
FIG. 67 is a top view schematically showing how the lens unit and the sensor unit are assembled.

In step S31, as shown in FIG. 66, the sensor unit 6 is mounted on the base 600. As shown in FIG. 67, there is fixed an L-shaped tool 602 standing on the base 600 (partially shown in FIG. 67). In addition, each of the side surfaces (two adjacent side surfaces 38a) of the package 38 of the sensor unit 6 is brought in contact with the tool 602, and the sensor unit 6 is then temporarily fixed at the predetermined position of the base 600.

In this state, by using the tool 610 for alignment, the lens unit 4 is aligned with the sensor unit 6 and is then fixed by bonding.

As shown in FIG. 66, the tool 610 has a taper-shape and a tapered ends.

On the tool 610, there is formed a tapered part 612. At the center of the tool 610, there is formed a suctioning section 614 (vacuum hole) capable of suctioning the lens unit 4. The tool 610 is movable back and forth, and right and left (on a two-dimensional plane) and vertically (see the arrow in FIG. 66).

In step S31, while keeping the tapered part 612 of the tool 610 and the inclined part 20c of the resin part 20 in contact, the tool 610 suctions the lens unit 4 through the suctioning section 614. Then, the tool 610 is moved back and forth, right and left, and vertically so as to move the lens unit 4 to a predetermined position corresponding to the sensor unit 6 (sensor 36), and the spacer 12 is fixed by being bonded to the cover glass 40 at that predetermined position.

In this process, in association with the descent of the tool 610, the spacer 12 is gradually pressed against the cover glass 40, and the inclined part 20c of the resin part 20 is moved by a small distance so as to perfectly fit in the tapered part 612 of the tool 610.

As a result, the lens unit 4 is positioned at an appropriate position (predetermined position) on the sensor unit 6 corresponding to the placement position of the tool 610, and the optical axes of the lens blocks 8 and 10 and the lens unit 4 and the optical axis of the sensor 36 of the sensor unit 6 can be matched. The "optical axis of the sensor 36" represents the diagonal center of the effective imaging area of the pixel area of the photo sensor which is actually usable for imaging in the image pickup device 2.

In this embodiment, the lens unit 4 is under the optical axis adjusted and suctioned by the tool 610, and in that status the lens unit 4 is matched with the optical axis of the sensor unit 6 and is bonded to the sensor 36; however, in case that the suctioning section 614 cannot be arranged in the tool 610 for the lens unit 4 in such a manner as described above, the optical axis of the sensor 36 and the lens unit 4 may not be precisely aligned.

In such case, the lens unit 4 may be observed from the lower side of the sensor 36 side and may be contacted and bonded while the optical axis of the lens unit 4 and the optical axis of the sensor 36 are being aligned. For that purpose, the optical axis may be recognized from the aperture stop opening section (opening section 30a of FIG. 6) arranged on the image side of the most image-side lens block of the lens unit 4, and that optical axis and the optical axis of the sensor 36 may be aligned.

The above description is made by taking the image-side aperture stop of the lens block as an example; however, there may be provided another identification member by which the optical axis of the image-side lens part can be recognized and which includes a concentric circle shape centered at the optical axis of the lens part, for example, and the optical axis may be recognized by the identification member. Alternatively, the distribution of the light passing through the lens unit 4 may be detected to recognize the optical axis, based on the detection result.

In bonding the spacer 12 and the cover glass 40, either of the spacer 12 or the cover glass 40 may be previously supplied with adhesive made of photo-curable resin and light may be applied to the part having the adhesive applied.

In step S31, the most object-side resin part 20 of the lens blocks 8 and 10 is provided with inclined parts 20c with which the tool 610 for alignment is brought in contact, and the lens unit 4 is positioned and fixed on the tool 610 with reference to the inclined parts 20c while the tool 610 is in contact with the inclined parts 20c; thus the lens unit 4 is positioned with respect to the sensor 36 by moving the tool 610 back and forth, right and left, vertically.

With this arrangement, different from the method in which the optical axis of the lens blocks 8 and 10 and the optical axis of the sensor 36 are matched, with reference to the cut surface (side end surface) of the lens blocks 8 and 10, the optical axes of the lens blocks 8 and 10 and the sensor 36 can be matched without depending on the accuracy of the dicing at the time of producing the lens blocks 8 and 10.

In addition, since the sensor unit 6 (cover glass 40) is made to have a slightly larger area than the lens unit 4, even if the lens unit 4 moves on the cover glass 40 back and forth, and right and left when the tool 610 is moved back and forth, and right and left, and vertically to position the lens unit 4 with respect to the sensor 36, the parallelism between the lens and the sensor is maintained. In addition, because of the larger size of the sensor unit 6, there is generated a step between the lens unit 4 and the sensor unit 6, and with this arrangement the package covering the lens unit is set in this step, and the whole device can thus be compact.

As described above, in this embodiment, since the first lens block and the second lens block are directly bonded, there is no need for connecting and bonding the plural wafer lenses through spacer members configured by different members such as a glass substrate even if plural wafer lenses are laminated. As a result, a high productivity, for which the wafer lens is characteristic, is maintained without extremely increasing cutting resistance when cutting. In addition, the problem is solved in which the positional error is generated between the wafer lenses when cutting the wafer lenses bonded to different members, and the thus generated positional error causes the misalignment of the optical axes and thereby adversely affecting the optical performance.

Further, as a result of eliminating the spacer members between the lenses, it is possible to stack, on the body of stacked wafer lenses, the spacer substrate which is a spacer member needed between the image sensor and the optical system after being divided into individual pieces, and also possible to collectively cut the body of stacked wafer lenses including the spacer substrate; it is possible to design, having a certain degree of freedom in the material and the tolerance of thickness of the spacer member, the lens unit is bonded with the sensor unit with a step formed at the side surface, where the lens unit is made by being cut together with the spacer substrate into the individual pieces, and the sensor unit is separately made by being cut from the wafer state into individual pieces; and the lens block is covered by the package such that it is set in the step formed when the both are bonded, whereby the image pickup device is provided in which the lens unit is not projected from the sensor unit and which is compact and has improved imaging performance.

Second Embodiment

The second embodiment is different from the first embodiment mainly on the following points, but the same as the first embodiment on the other points.

As a wafer lens manufacturing apparatus, instead of the wafer lens manufacturing apparatus 300, a wafer lens manufacturing apparatus 700 is used.

In producing the wafer lens 52 or 54, instead of a so-called step-and-repeat method (a method in which a molding die 450 is relatively moved to produce convex lens parts 20a and the like, gradually), a so-called batch method (a method in which a molding die 770 is pressed on a glass substrates 16 and 26 once to collectively produce the convex lens parts 20a and the like) is employed.

[Wafer Lens Manufacturing Apparatus (Batch Method)]

Figure 68:
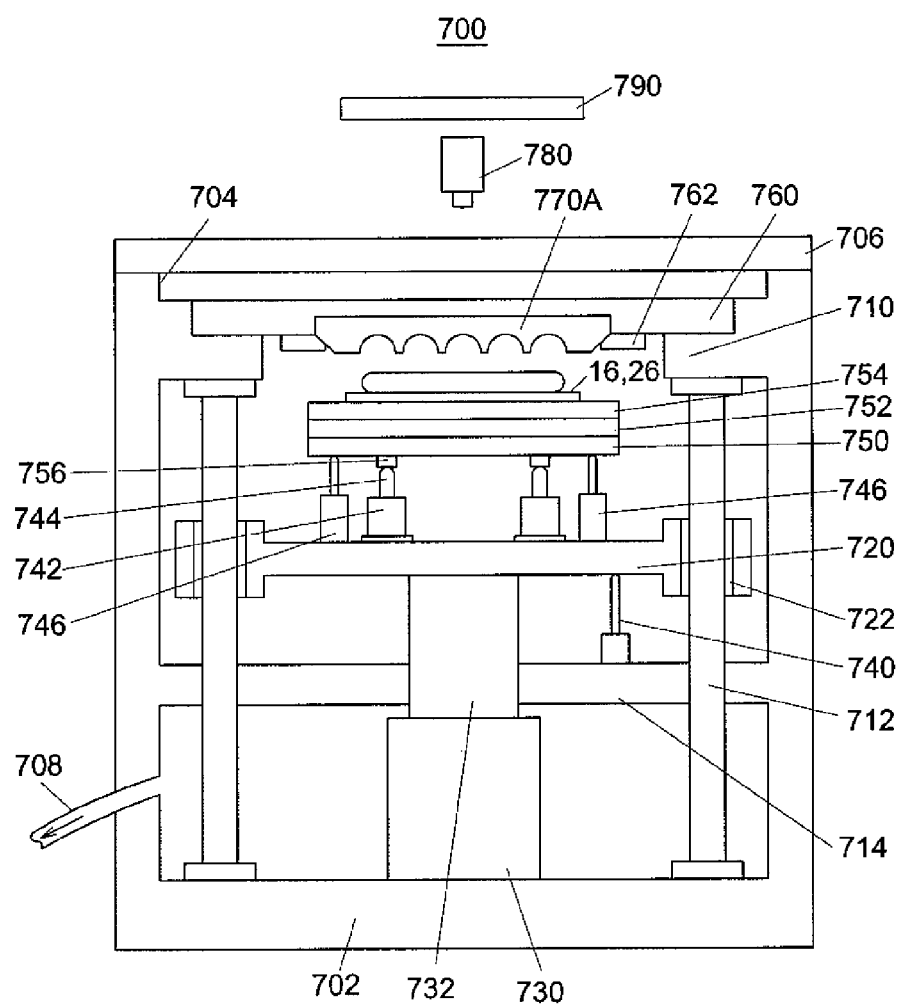
FIG. 68 is a diagram showing a schematic configuration of a batch type wafer lens manufacturing apparatus.

As shown in FIG. 68, the wafer lens manufacturing apparatus 700 has a base 702.

On the upper part of the base 702, there is formed an opening section 704. Over the opening section 704, there is provided a plate-like lid body 706 closing the opening section 704. The lid body 706 is optically transparent and made of quartz glass, for example. The "optically transparent" means here that it is transparent for the visible light wave, and includes a configuration in which a dispensing state can be imaged by the imaging section 780 to be described below.

The inside of the base 702 closed with the lid body 706 is decompressed by a decompression mechanism 708. The inside of the base 702 is decompressed at $10^{-2}$ MPa or lower, in particular.

On the upper part of the base 702, there is formed a protrusion 710 inwardly protruding. Between the bottom part of the base 702 and the protrusion 710, there are vertically provided three guides 712 with a predetermined spaces therebetween (the two guides 712 shown in FIG. 68). The guides 712 are mounted on the base 702 and the protrusion 710 at their flange parts. With this arrangement, they can be mounted on the base 702 and the protrusion 710 in an orthogonal manner. Between the guides 712, there is extended a stage 720. On the stage 720, there are provided slide guides 722, through which guides 712 extend.

Inside the base 702 and below the stage 720, there is provided a lifting actuator 730 for lifting up and down the stage 720. To the lifting actuator 730 there is connected a shaft 732, which functions as a pressing mechanism by lifting up and down the stage 720.

On the middle part of the base 702, there is formed a support section 714 protruding inward. On the support section 714, there is provided a height gauge 740 for measuring the distance between the upper surface of the support section 714 and the lower surface of the stage 720.

On the stage 720, there are provided three geared motors 742 with predetermined separations (two geared motor 742 shown in FIG. 68). To the geared motors 742 there are connected shafts 744.

Above the geared motor 742 there are provided an X-Y stage 750, a θ stage 752, and an electrostatic chucking device 754 (base), in this order. Between each of the geared motors 742 and the lower surface of the X-Y stage 750, there is provided load cells 756, the apexes of the shafts 744 are in contact with the load cells 756 due to a self-weight of the X-Y stage 750 and the like. The operation of the geared motors 742 extends and contracts the shafts 744 up and down, and these motions collectively move up and down the X-Y stage 750, the θ stage 752, and the electrostatic chucking device 754.

In the wafer lens manufacturing apparatus 700, the three geared motors 742 function as a tilt mechanism (tilt adjusting mechanism) with the three motors independently operating. By adjusting the amount of expansion and contraction of the shaft 744 of each geared motor 742, it is possible to adjust angle and position of the X-Y stage 750, the θ stage 752, and the electrostatic chucking device 754 with respect to a plate holder 760 (to be described below) of the wafer lens manufacturing apparatus 700.

In particular, when the operation of the geared motor 742 raises the shaft 744, the electrostatic chucking device 754 gets closer to the plate holder 760; and when the operation of the geared motor 742 lowers the shaft 744, the electrostatic chucking device 754 gets away from the plate holder 760; thus, the following adjustment are performed: the positional adjustment for setting the electrostatic chucking device 754 apart from the plate holder 760; and the angular adjustment for tilting the electrostatic chucking device 754 with respect to the plate holder 760.

On the stage 720, there are three height gauges 746 for measuring the distance between the upper surface of the stage 720 and the lower surface of the X-Y stage 750 with predetermined separations (two height gauges 746 shown in FIG. 68).

The X-Y stage 750 is movable on the XY plane (two-dimensional plane) on the load cell 756 and the height gauge 746.

The θ stage 752 can rotate about its central part as a rotation axis.

Inside the electrostatic chucking device 754, there is provided a metal electrode. The voltage applied to the metal electrode generates positive and negative charges on the upper surface of the electrostatic chucking device 754 and a fixed work (glass substrates 16, 26, and the like) placed on the electrostatic chucking device 754, respectively, thus the fixed work is secured on the upper surface of the electrostatic chucking device 754. In the electrostatic chucking device 754, there is buried a heater (not shown), which can heat the fixed work secured on the electrostatic chucking device 754. However, the mechanism for attaching and detaching the fixed work may be a vacuum chuck or other types of mechanism for mechanically attaching and detaching.

On the upper part of the base 702, there is fixed an optically transparent plate holder 760. The plate holder 760 is made of, for example, optically transparent quartz glass or the like. On the plate holder 760, there is fixed a light transmissive molding die 770A. In the central side of the plate holder 760, there are fit the circumference of the molding die 770A and claws 762 for detachably holding that circumference. Thus, by mechanically holding the circumference of the molding die 770A with the claws 762, the molding die 770A is secured on the plate holder 760. However, the mechanism for attaching and detaching the plate holder 760 and the molding die 770A is not limited to the above-mentioned configuration as long as it can detachably hold the molding die 770A on the plate holder 760.

Figure 69:
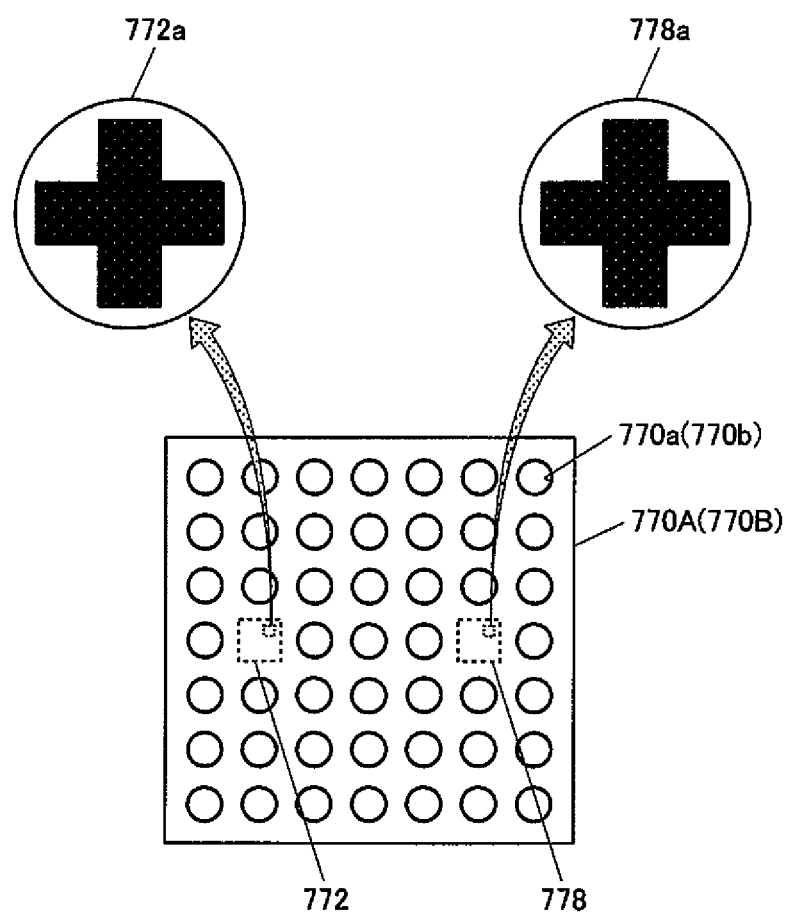
FIG. 69 is a plan view showing a schematic configuration of a molding die for a batch process.
Figure 70:
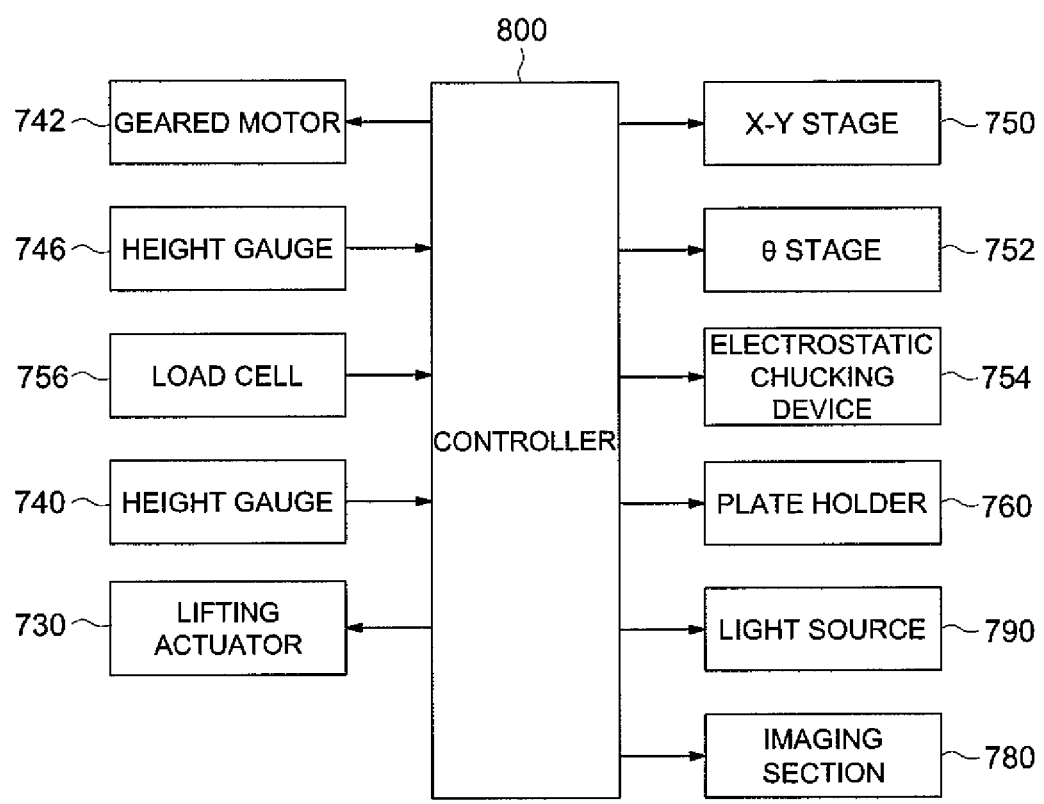
FIG. 70 is a block diagram showing a schematic configuration of control of the batch type wafer lens manufacturing apparatus.

As shown in FIG. 69, in the molding die 770A, there are formed a plurality of depressions 770a (cavities).

As the molding die 770A, any of the concave die 100, the first concave plastic die 200, and the second concave plastic die 220 is used, and the second concave plastic die 220 is preferably used. In this case, the number of the depressions 770a is increased so that the die can cover whole the glass substrate 16 or 26, by using the convex die 180 and the first convex plastic die 210 and by repeating the cycle of steps S13-S17 of FIG. 37 described in the chapter "Manufacturing Method of Wafer Lens (S1, First Example)" a predetermined times to add the depressions (cavities).

The molding die 770A has two regions 772 and 778 where there is formed no depression 770a. In the regions 772 and 778, there are formed an alignment mark 772a and 778a (grooves) having a cross-shape, one for each The wafer lens manufacturing apparatus 700 uses also a molding die 770B instead of the molding die 770A. On the molding die 770B, there are formed a plurality of protrusions 770b (cores).

As the molding die 770B, any of the convex die 180, the first convex plastic die 210, and the second convex plastic die 230 is used, and the second convex plastic die 230 is preferably used. In this case, the number of the protrusion 770b is increased so that the die can cover whole the glass substrate 16 or 26, by using the concave die 100 and the first concave plastic die 200 and by repeating the cycle of steps S13-S17 of FIG. 37 described in the chapter "Manufacturing Method of Wafer Lens (S1, First Example)" a predetermined times to add the protrusion (cores). The molding die 770B has the same configuration as the molding die 770A except the above-mentioned components.

Above the plate holder 760, there is provided an imaging section 780 (imaging camera). The imaging section 780 can pick up the images of the molding die 770A and the glass substrate 16 or 26 from the above through the transparent plate holder 760. The imaging section 780 picks up the images o1 in particular, the spread shape of the resin pressed between the glass substrate 16 or 26 and the molding die 770A, and captures the imaging data as the image data.

Above the plate holder 760, there is provided a light source 790 (energy emitting section). The light source 790 is turned on to emit light toward the molding die 770A and apply light.

When the light source 790 is turned on to apply light, the imaging section 780 can be evacuated to an evacuation position at which it does not interrupt the application of light.

As shown in the drawing, the lifting actuator 730 (pressing mechanism), the height gauge 740, the height gauges 746, the load cells 756, the geared motors 742 (tilt mechanisms), the X-Y stage 750, the θ stage 752, the electrostatic chucking device 754, the plate holder 760, the imaging section 780, and the light source 790 are connected to a controller 800.

The controller 800 controls the operations of these components. In particular, in the embodiment, the controller 800 controls the operation (amount of lift up and down) of the lifting actuator 730 on the basis of the output value of the height gauge 740, and control the operation of the geared motors 742 on the basis of the outputs of the height gauges 746 and the load cells 756. The controller 800 controls the operation (amount of lift up and down) of the lifting actuator 730 and the operation of the geared motor 742 on the basis of the shape, imaged by the imaging section 780, of the spread resin pressed between the glass substrate 16 or 26 and the molding die 770A.

[Manufacturing Method of Wafer Lens (Step S1, Fourth Example)]

Figure 71:
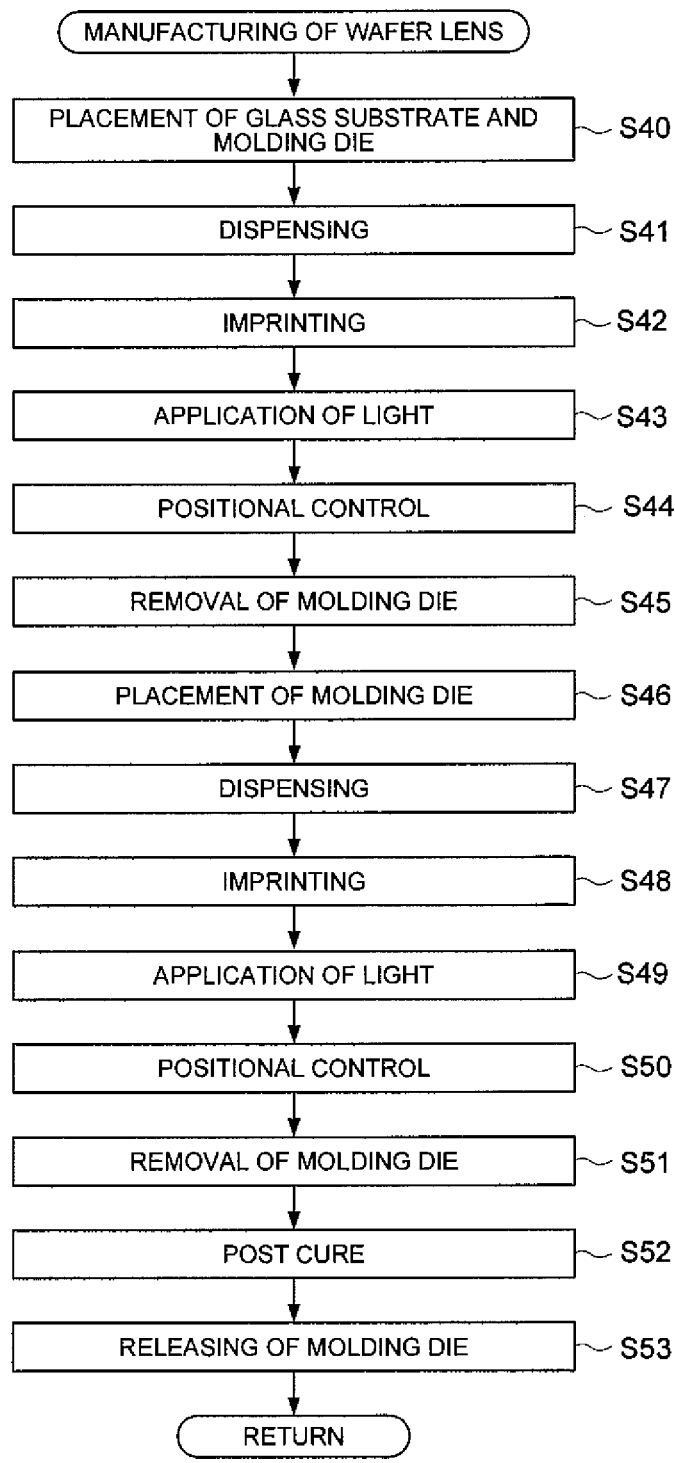
FIG. 71 is a flow chart schematically showing a method for manufacturing a wafer lens produced by a batch process.

This manufacturing method is an alternative of steps S11-S19 of FIG. 37, and as shown in FIG. 71, a wafer lens 52 or 54 is produced generally through the process of steps S40-S53.

Step S40: Place a glass substrate and the molding die 770A.
Step S41: Drop resin on the surface of the glass substrate.
Step S42: Press the resin on the surface of the glass substrate against the molding die.
Step S43: Apply light to the resin.
Step S44: Control the position of the glass substrate under the application of light.
Step S45: Release the placement of the molding die.
Step S46: Place the new molding die 770B.
Step S47: Drop resin on the back surface of the glass substrate.
Step S48: Press the resin on the back surface of the glass substrate against the molding die.
Step S49: Apply light to the resin.
Step S50: Control the position of the glass substrate under the application of light
Step S51: Release the placement of the molding die.
Step S52: Perfectly cure the resin on the both sides of glass substrate.
Step S53: Release the glass substrate from the molding die.

Figure 72:
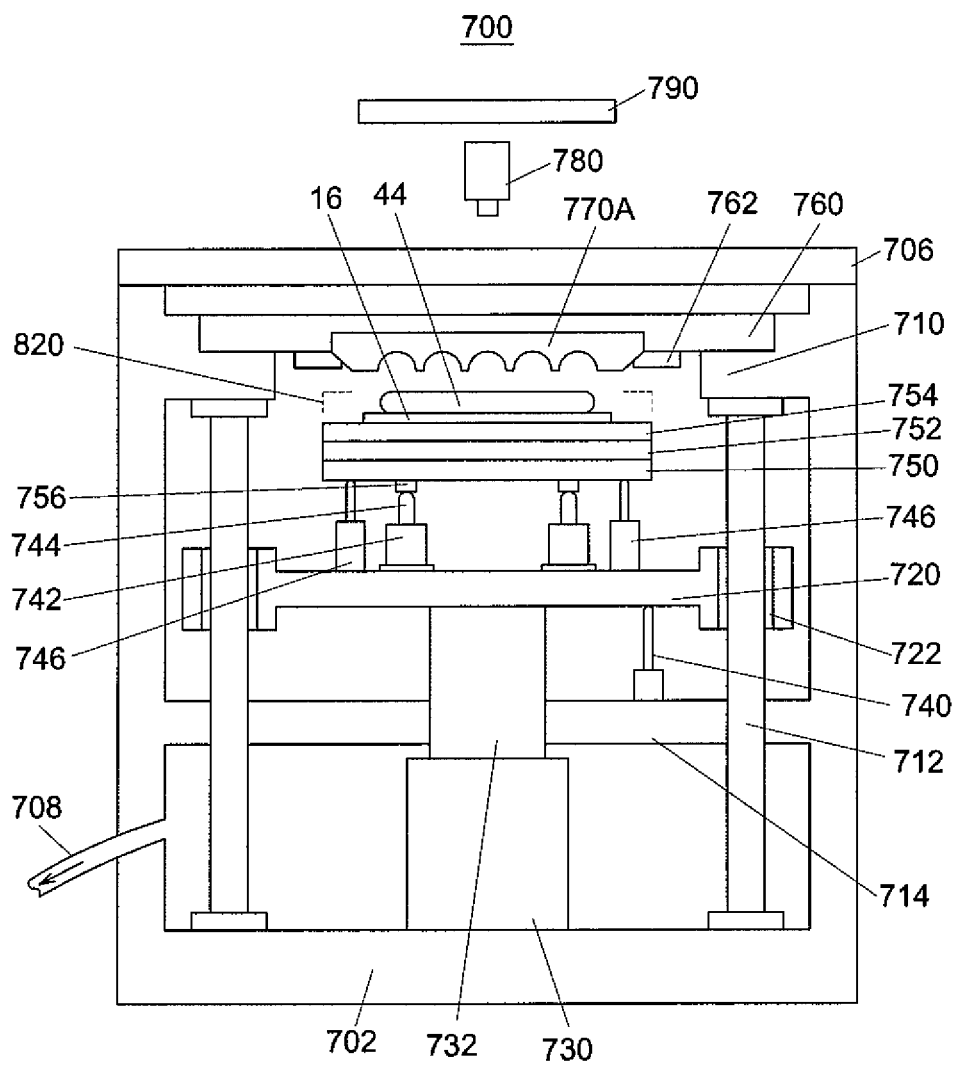
FIG. 72 is a diagram showing a step of dropping resin on one surface of the glass substrate and other steps.

In step S40, as shown in FIG. 72 and FIG. 73, the molding die 770A is fixed on the plate holder 760, and the glass substrate 16 is placed on the electrostatic chucking device 754 to be electrostatically suctioned and fixed.

In step S41, a predetermined amount of resin 44 is dropped on the glass substrate 16 by a dispenser (not shown) or the like.

In step S42, the X-Y stage 750 and the θ stage 752 are operated so as to align the glass substrate 16 with the molding die 770A. In this step, the alignment marks 772a and 778a of the molding die 770A and the alignment marks 72a and 78a of the glass substrate 16 are referred to and matched (see FIG. 6). In aligning the alignment marks 772a and 778a with the alignment marks 72a and 78a, as shown in FIG. 74, the four clearances 802, 804, 806, and 808 are all made identical. With this arrangement, the positional error of the molding die 770A and the glass substrate 16 is prevented.

After that, the lifting actuator 730 is operated to extend the shaft 732 upward to move the stage 720 upward. Associated with the rising of the stage 720, the geared motors 742, the X-Y stage 750, the θ stage 752, the electrostatic chucking device 754, and the glass substrate 16 on the stage 720 are also raised, and the resin 44 on the glass substrate 16 is pressed against the molding die 770A.

In step S44, the spread shape of the resin 44 pressed between the glass substrate 16 and the molding die 770A is imaged by the imaging section 780, and the image data is sent out to the controller 800.

Figure 75:
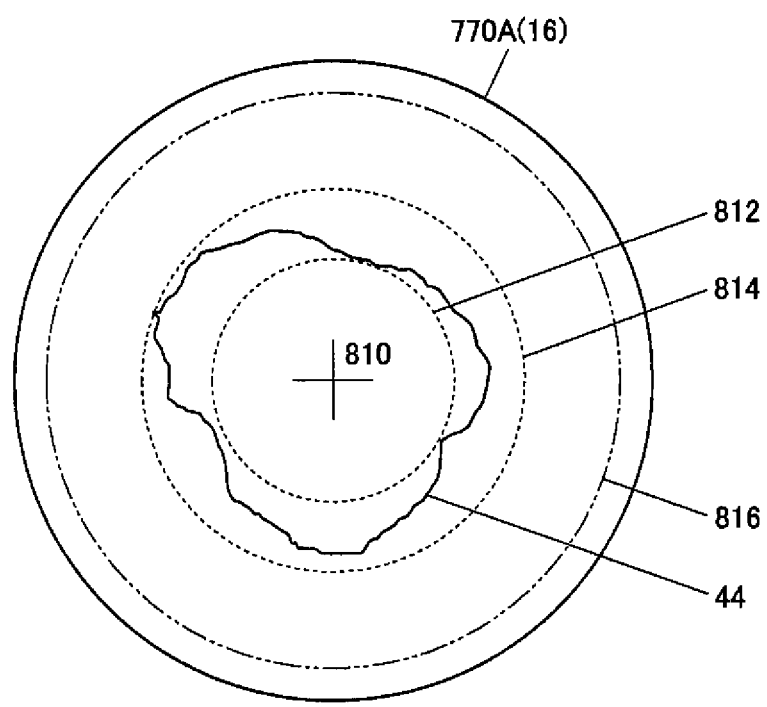
FIG. 75 is an explanatory diagram showing the resin spread between the molding die and the glass substrate.

FIG. 75 shows an example of the image data about the spread shape of the resin 44 imaged by the imaging section 780. The controller 800 detects the circumferential shape and the center 810 of the glass substrate 16 or the molding die 770A on the basis of the image data imaged by the imaging section 780, and detects the spread shape of the resin 44.

The controller 800 sets: an inscribed circle 812 centered at the center 810 with a radius of the shortest distance from the center 810 to the edge of the resin 44; a circumscribed circle 814 centered at the center 810 with a radius of the longest distance from the center 810 to the edge of the resin 44; and a punch cut circle 816 (pattern shape having been set) surrounding the area on the molding die 770A where the protrusions 770a are formed.

The controller 800 detects as a direction of correction the direction in which the distance from the edge of the resin 44 to the circumscribed circle 814 is longest. The "distance (shortest distance, longest distance)" represents here the distance along a radial line drawn from the center 810.

After that, the controller 800 activates the lifting actuator 730 so as to contract the shaft 732 by a predetermined amount and hence slightly lower the stage 720, thereby carrying back the press position.

Then, the controller 800 activates the geared motors 742 as the tilt mechanism for adjusting angle so as to incline the electrostatic chucking device 754, on which the glass substrate 16 is placed, such that the space between the glass substrate 16 and the molding die 770A is widened in a direction (direction of correction), in which direction the resin 44 in the region in which the distance from the edge of the resin 44 to the circumscribed circle 814 is longest is likely to flow in such direction to the circumference of the glass substrate 16 or the molding die 770A.

The angle between the glass substrate 16 and the molding die 770A when the space is widened may be identical, and if the distance is large, the angle may be preferably adjusted according to a formula depending on the distance to the circumscribed circle 814 so that the resin flows being more strongly directed.

After that, the controller 800 activates the lifting actuator 730 to extend the shaft 732 upward and hence press the resin 44 between the glass substrate 16 and the molding die 770A, and to keep pressing until the resin 44 in the direction of correction reaches the circumscribed circle 814. It is determined in the controller 800 on the basis of the image data imaged by the imaging section 780 whether the resin 44 have reached the circumscribed circle 814 of not.

When the resin 44 in the direction of correction reaches the circumscribed circle 814, the geared motors 742 as the tilt mechanism are activated to adjust angle such that the glass substrate 16 is parallel to the molding die 770A. Then again, the spread shape of the resin 44 pressed between the glass substrate 16 and the molding die 770A is imaged by the imaging section 780, and the imaged data is sent out to the controller 800.

By repeating the step in which based on the image data generated by imaging the spread shape of the resin 44, the direction of correction in which the resin 44 should be moved and spread is determined and the pressing is performed, until the resin 44 in the direction of correction reaches the circumscribed circle 814, and the pressing is continued until at least one of the inscribed circle 812 and the circumscribed circle 814 reaches the punch cut circle 816.

In this repetition of the pressing process, the spread shape of the resin 44 becomes approximate circle, and the inscribed circle 812 and the circumscribed circle 814 come near, and when the resin reaches the punch cut circle 816, the inscribed circle 812 and the circumscribed circle 814 have become circles having approximately the same size. The direction of correction in which the resin 44 should be moved and spread may be set based on the part where the region between the edge of the resin 44 and the circumscribed circle 814 is larger.

In the wafer lens manufacturing apparatus 700, the height position to which the stage 720 is to be moved is previously set in the controller 800, and the controller 800 activates the lifting actuator 730 until the electrostatic chucking device 754 reaches the standard position 820 (see FIG. 72); thus, when the electrostatic chucking device 754 has reached the standard position 820, the controller 800 stops the operation of the lifting actuator 730. In this process, the controller 800 controls the operation of the lifting actuator 730 on the basis of the output value of the height gauge 740 to move the stage 720 to the predetermined height position.

In step S42, as a result of the stepwise lift of the electrostatic chucking device 754 to the standard position 820 while adjusting the angle of the electrostatic chucking device 754 on which the glass substrate 16 is fixed, the resin 44 is gradually spread due to the pressing of the glass substrate 16 to fill the depression 770a of the molding die 770A.

Figure 76:
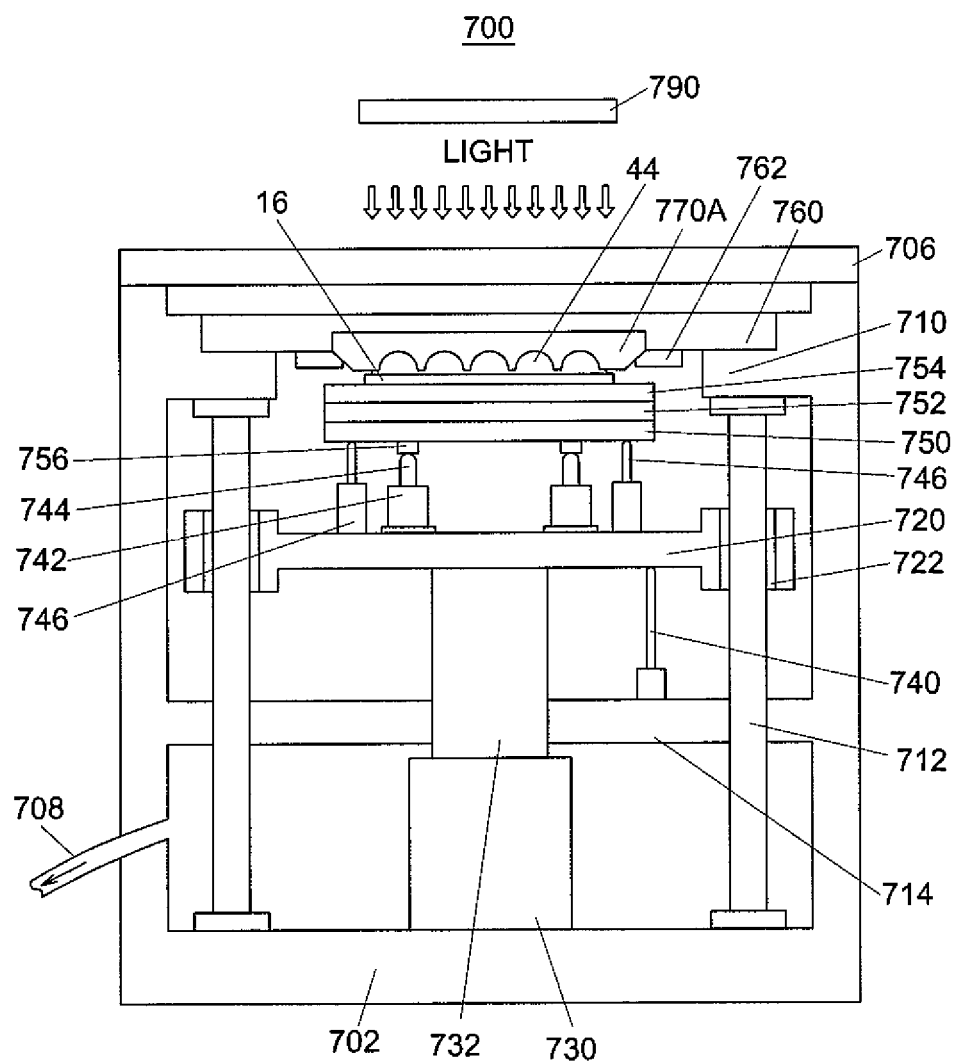
FIG. 76 is a diagram showing a step of pressing the glass substrate against the molding die and applying light to them.

In step S43, after moving the imaging section 780 to the evacuation position, the light source 790 is turned on, as shown in FIG. 76, to apply light to the resin 44 through the light transmissive molding die 770A for a predetermined time so as to progress the hardening of the resin 44 to a certain extent.

In step S44, after a predetermined amount of light has been applied to the resin 44 by the lighting of the light source 790 for a predetermined time, the glass substrate 16 is pressure-controlled to increase and hold the pressure of the glass substrate 16 against the molding die 770A.

That is because if the stage 720 is kept at the predetermined height position, when the resin 44 is hardened (at the time of hardening of the resin 44 or later), the glass substrate 16 does not follow the possible cure shrinkage of the resin 44, whereby distortion may occur in the resin 44, and the molding die 770A may not be sufficiently transferred to the resin 44.

In step S44, the geared motors 742 are activated to extend the shafts 744 upward, thereby moving the X-Y stage 750, the θ stage 752, and the electrostatic chucking device 754 upward. In this operation, the controller 800 controls the operation of the geared motors 742 to move stage 720 upward, keeping the pressure of the stage 720 against the molding die 770A to a predetermined value, based on the output value of the load cell 756.

In the wafer lens manufacturing apparatus 700, the pressure of the X-Y stage 750, the θ stage 752, and the electrostatic chucking device 754 against the molding die 770A is previously set in the controller 800, and the controller 800 controls, depending on the output value from the load cell 756, the operation of the geared motors 742 to hold the pressure of the X-Y stage 750, the θ stage 752, and the electrostatic chucking device 754 against the molding die 770A at a predetermined value.

The controller 800 controls, depending on the output values of the load cell 756 and the height gauge 746, also the X-Y stage 750 and the θ stage 752 to hold the followings at certain levels: the parallelism between the glass substrate 16 and the molding die 770A, the equal-load on the resin 44, and the distance between the upper surface of the stage 720 and the X-Y stage 750.

After that, the light source 790 is turned off to stop the application of light to the resin 44.

Figure 77:
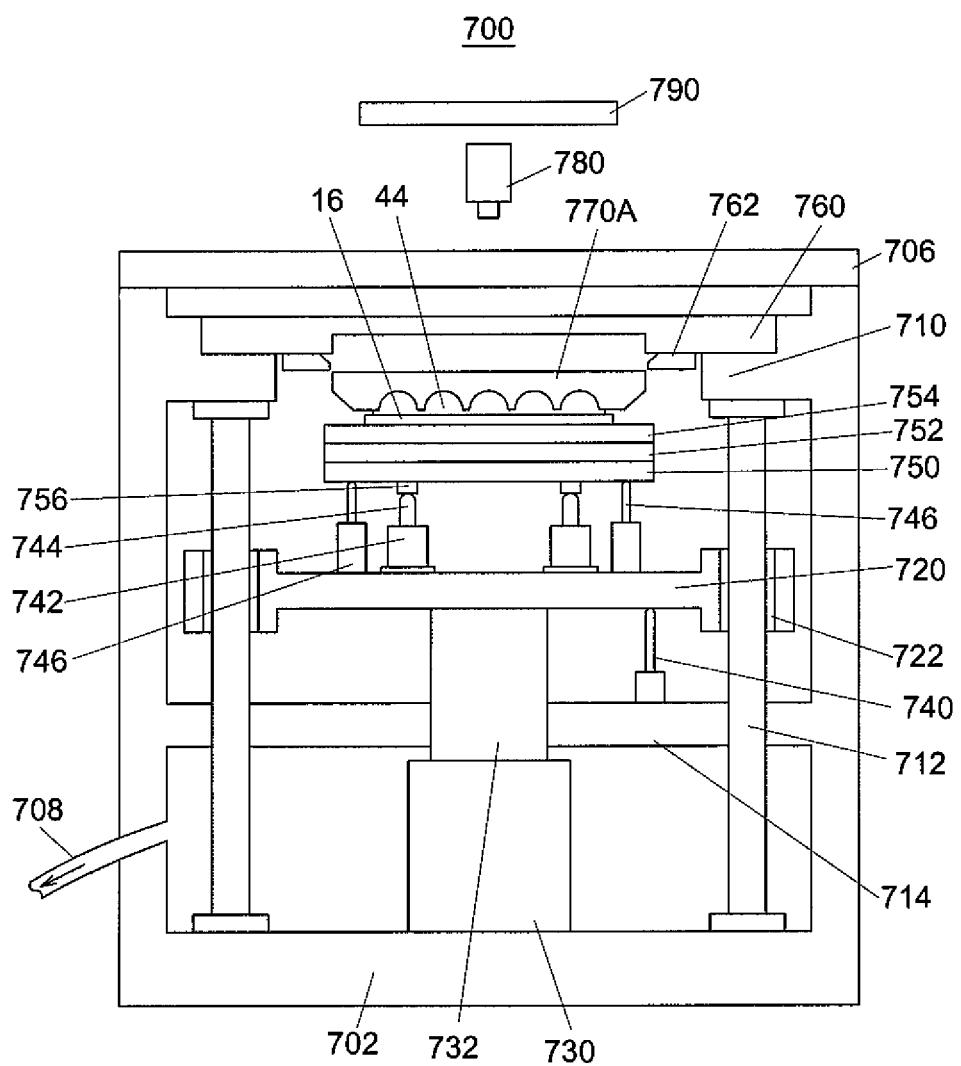
FIG. 77 is a diagram showing a step of releasing the molding die from a plate holder.

In step S45, as shown in FIG. 77, the molding die 770A is removed from the plate holder 760 with the molding die 770A held in the glass substrate 16. Then, the shaft 732 of the lifting actuator 730 is contracted downward to move the stage 720 downward.

Figure 78:
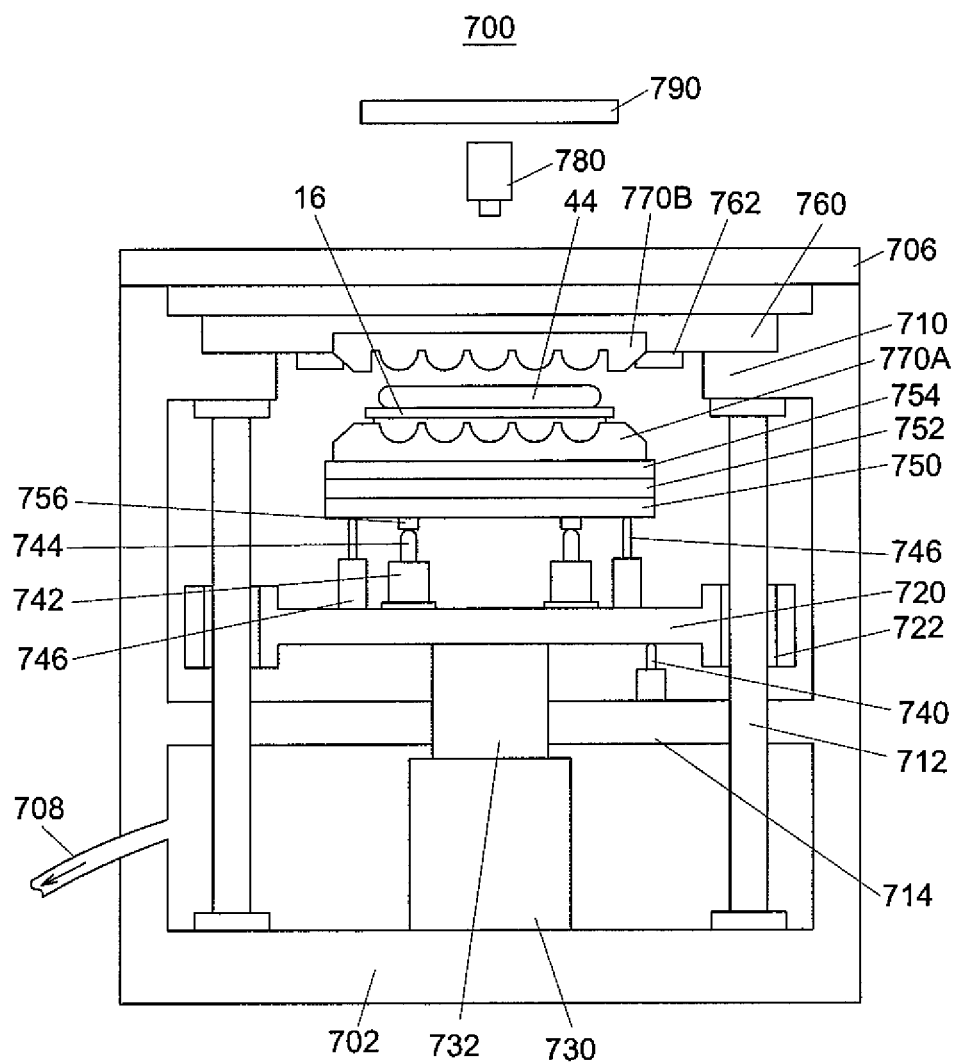
FIG. 78 is a diagram showing a step of dropping resin on the other surface of the glass substrate and other steps.

In step S46, as shown in FIG. 78, the new molding die 770B is fixed on the plate holder 760, and the glass substrate 16 integrated with the molding die 770A is turned up side down, then the molding die 770A is placed on the electrostatic chucking device 754. Then, the molding die 770A is electrostatically suctioned, whereby the glass substrate 16 is fixed through the molding die 770A.

Figure 79:
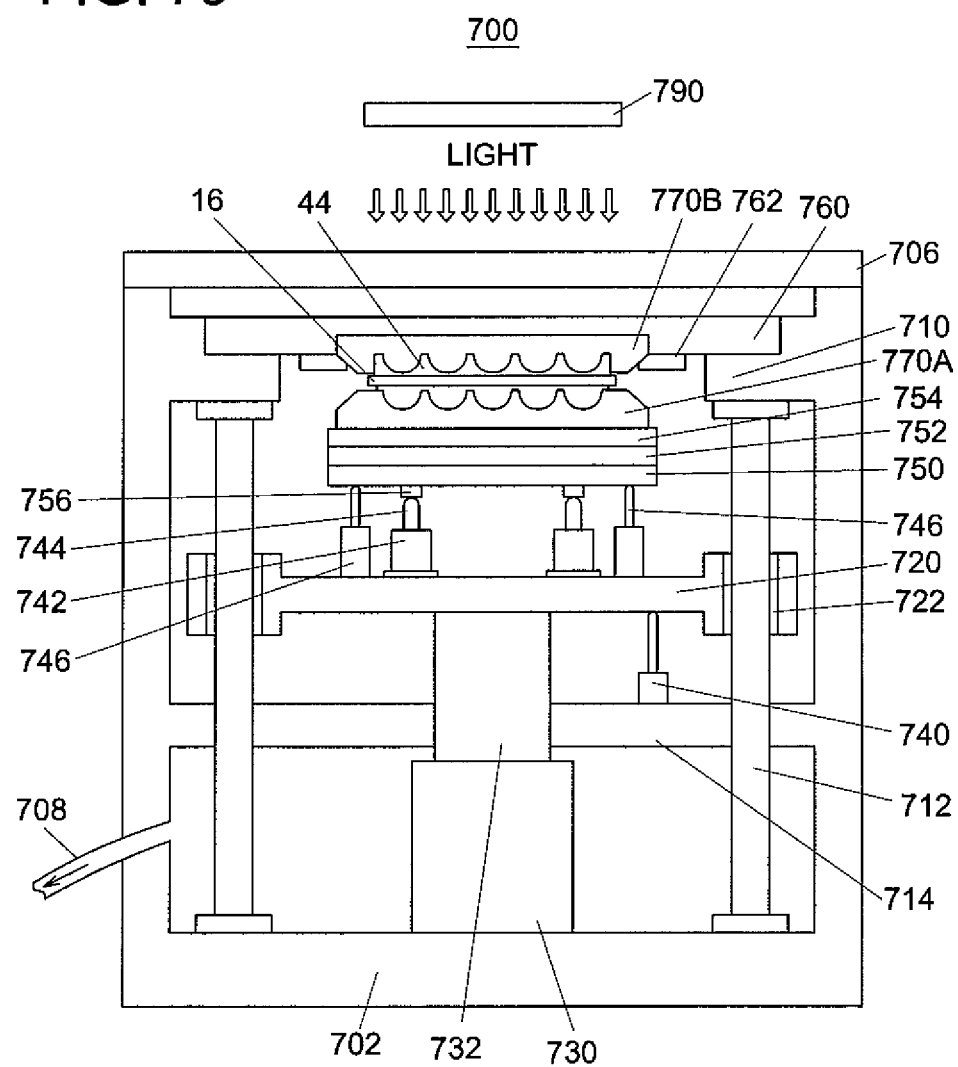
FIG. 79 is a diagram showing a step of pressing the glass substrate against molding die and applying light to them.
Figure 80:
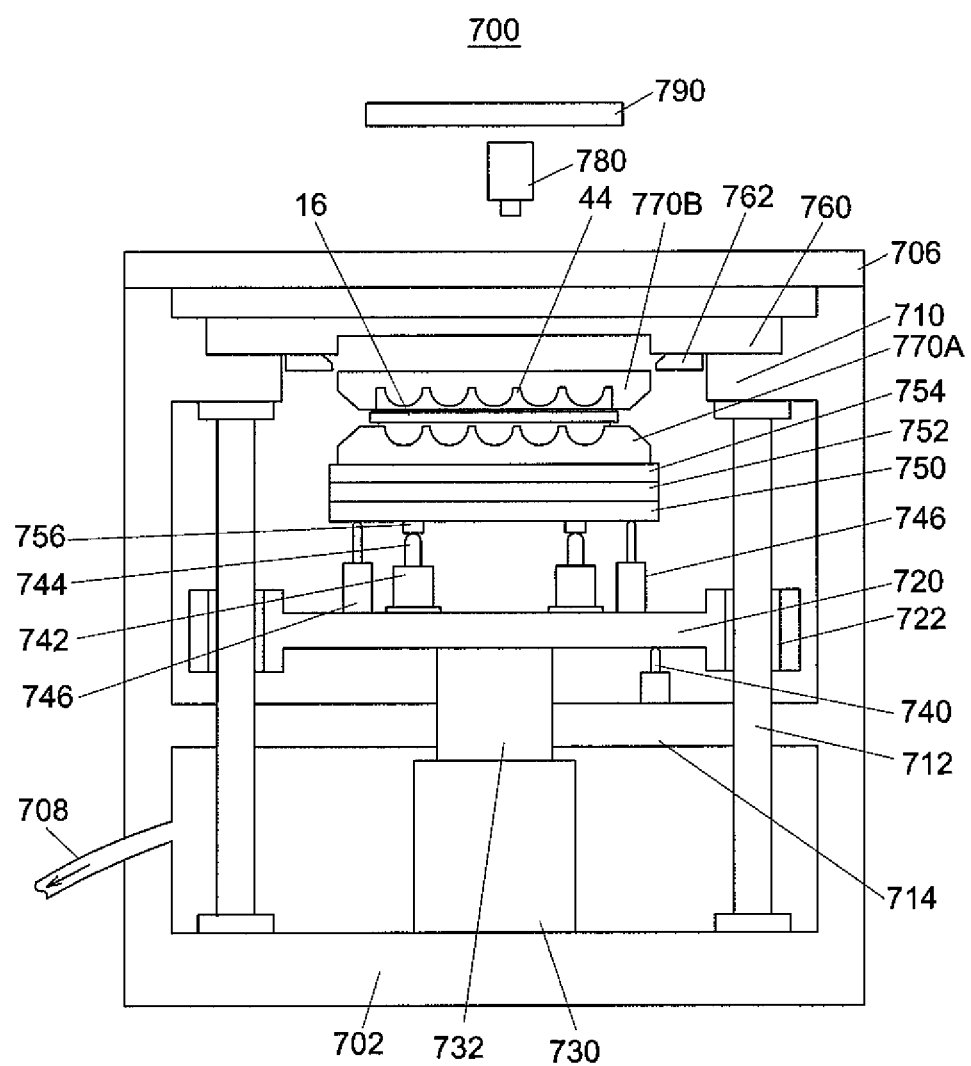
FIG. 80 is a diagram showing a step of removing the molding die from the plate holder.

In steps S47-S51, as shown in FIG. 78-FIG. 80, a process similar to that of steps S42-S45 is performed.

In step S52, as shown in FIG. 81, the glass substrate 16 to which the molding die 770A and the 770B are attached is picked up from wafer lens manufacturing apparatus 700, and is then heated (post cure) in an oven or the like to perfectly harden the resin 44.

The process of step S52 may be performed after step S53. In that case, since the process of step S52 can be divided into plural steps, it is possible to reduce a rapid change in the optical characteristics of the resin.

In step S53, the glass substrate 16 is released from the molding die 770A and the 770B.

In the case of manufacturing the wafer lens 54, the wafer lens 54 is manufactured by a process similar to that used to manufacture the wafer lens 52.

According to the fourth example, when the resin 44 dropped on the glass substrate 16 is pressed against the molding die 770A, the geared motors 742 as the tilt mechanism and the lifting actuator 730 as the pressing mechanism are activated to have the molding die 770A and the glass substrate 16 get closer to each other gradually while adjusting the angle of the electrostatic chucking device 754 to which the glass substrate 16 is attached with respect to the plate holder 760 to which the molding die 770A is attached; thus the resin 44 pressed between the molding die 770A and the glass substrate 16 is spread almost uniformly over almost all the area between the molding die 770A and the glass substrate 16. Thus, the resin 44 can be filled in all the depressions 770 of the molding die 770A, and the productivity of the wafer lens 52 can be high.

In particular, it is possible for the controller 800 to control such that: the area where the resin 44 is sufficiently spread is detected on the basis of the image data, taken by the imaging section 780, of the shape of the resin 44 spread between the glass substrate 16 and the molding die 770A; in order to facilitate the resin 44 to flow in that direction (direction of correction), the molding die 770A and the glass substrate 16 are made to get closer to each other while keeping the distance between the glass substrate 16 and the molding die 770A is greater in the direction of correction, as a result the resin 44 pressed between the molding die 770A and the glass substrate 16 is easily and appropriately spread.

In addition, while having the molding die 770A and the glass substrate 16 get closer to each other with the distance between the glass substrate 16 and the molding die 770A kept greater in the direction of correction, the press is repeated until the shape of the spread resin 44 imaged by the imaging section 780 reaches the circumscribed circle 814 and the circumscribed circle 814 reaches the punch cut circle 816, as a result the resin 44 between the molding die 770A and the glass substrate 16 is spread almost evenly and appropriately in almost all the area without the resin 44 leaking from between the glass substrate 16 and the molding die 770A.

Figure 82:
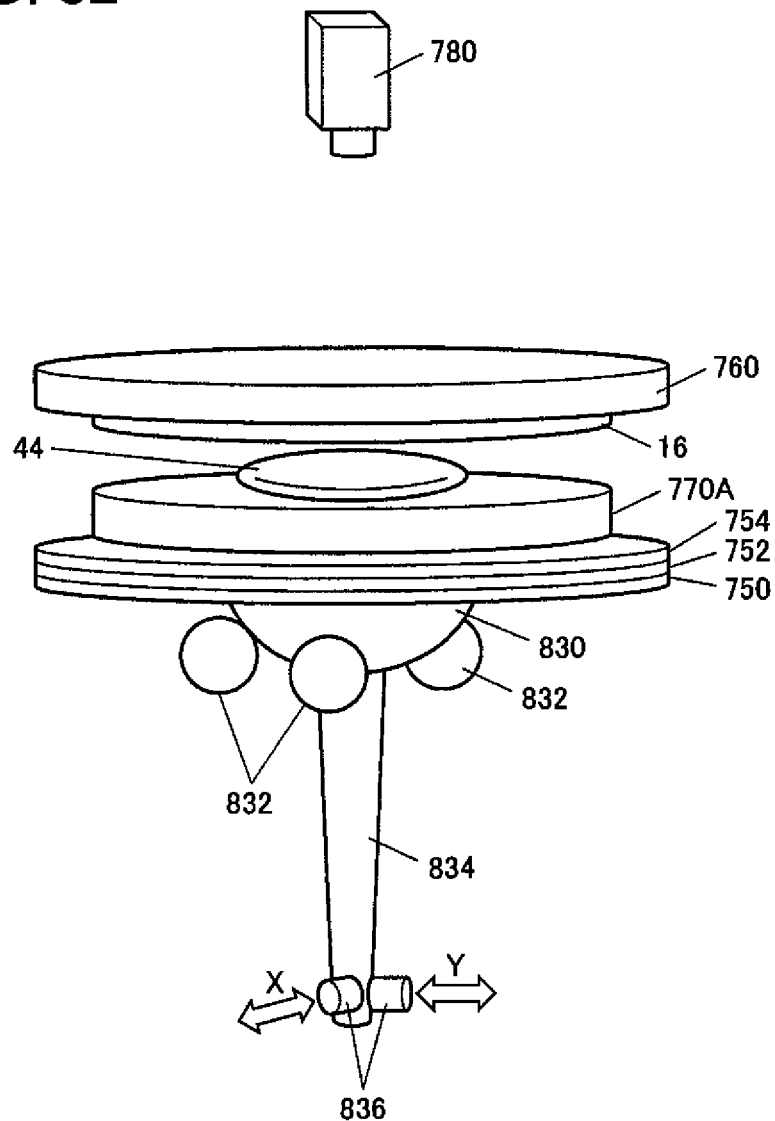
FIG. 82 is an enlarged explanatory diagram showing a modified example of the tilt mechanism.

In the fourth example, the tilt mechanism may be one shown in FIG. 82, for example. The tilt mechanism is equipped with: a spherical body 830 having an approximately hemispheric shape provided on the lower surface of the X-Y stage 750; shaft bearings 832 in contact with the spherical surface of the spherical body 830; a support pillar 834 with one end fixed to the apex of the spherical body 830 and the other end extended downward; tilt adjustment sections 836 for swinging the other end of the support pillar 834 in the X-axis direction and the Y-axis direction perpendicular to each other to tilt the support pillar 834 in any direction. Such tilt mechanism can be used to adjust the angle of the glass substrate 16 with respect to molding die 770A.

In the fourth example, for example, by fixing the glass substrate 16 on the plate holder 760 and the molding die 770A on the electrostatic chucking device 754 to adjusting the angle of the molding die 770A with respect to the glass substrate 16, the resin may be pressed so as to evenly spread it between the molding die 770A and the glass substrate 16.

In the fourth example, an display means may be connected to display the imaged data taken by the imaging section 780, to the operator, and the operator may observe the image data on the display means to recognize the direction where the resin 44 is not spread well; thus the operator may externally operate and adjust the tilt mechanism so as to spread the resin evenly.

The "imaged data" here is not limited to image data, but it may be data in which the data obtained by imaging has been subjected to different processes, and the "imaged data" may includes imaged images from an analogue camera as well.

The "display means" here may be, besides the monitor integrally built in the manufacturing apparatus, a monitor which is externally installed and is connected to the manufacturing apparatus.

In the fourth example, the described example of the tilting step is according to an algorism for modifying and approximating the shape of the spread resin 44 to a circle, but the manner of modification is not limited to this algorism but may be other manners and algorisms of modification.

The fourth example can be applied also to the production of a plastic die for manufacturing the wafer lenses 52 and 54.

The "plastic die" is: the first concave plastic die 200 or the that convex plastic die 210 made by using the concave die 100 or the convex die 180 as a molding die; or the second concave plastic die 220 or the second convex plastic die 230 made by using the first concave plastic die 200 or the first convex plastic die 210 as a molding die, and is basically the substrate 204, 214, 224, 234 on which plastic protrusion concavities and convexes are formed similar to the glass substrate 16 on which the convex lens parts 20a or the concave lens parts 24a are formed (see FIG. 22-FIG. 25).

In the fourth example, the steps may be performed while keeping the inside of the wafer lens manufacturing apparatus 700 at the atmospheric pressure.

Step S52 for heating by an oven does not have to be different from the steps S43 or S49 for applying light, but it may be a step for applying light having the same application conditions or different application conditions.

For the fourth example, the installation position of the glass substrate 16 and the installation position of the molding die 770A may be exchanged. In that case, the molding die 770A is suctioned and fixed on the electrostatic chucking device 754, and on the other hand the glass substrate 16 is held by the plate holder 760. Then, the resin 44 is dropped on the molding die 770A, and the resin 44 is filled in the depressions 770a by moving the molding die 770A upward against the glass substrate 16.

After that, after the light is applied to the resin 44 to cure to a predetermined extent, the holding of the glass substrate 16 is released and the molding die 770A is moved downward with the molding die 770A and the glass substrate 16 not separated. Then, the resin 44 is dropped on the other surface of the glass substrate 16 (surface opposite to the resin 44) with the molding die 770A not separated. After that, by moving the glass substrate 16 upward to press it against the molding die 770B newly attached to the plate holder 760, the resin 44 is filled between the protrusions 770b.

After that, light is applied, and the wafer lens 52 is picked up from the wafer lens manufacturing apparatus 700 with the molding dies 770A and 770B not released, and the resin 44 is heated to cure in an oven or the like.

In step S42, the positional control and the pressure control of the glass substrate 16 may be performed simultaneously. That is to say, while moving the glass substrate 16 to a predetermined position, the glass substrate 16 is subjected to the pressure control to keep the pressure of the glass substrate 16 against the molding die 770A at a predetermined value or lower.

In detail, the controller 800 controls the movement of the stage 720, based on the output value form the height gauge 740, and continuously references the output value of the load cell, to control the operation of the geared motor 742 so as to keep the pressure of the stage 720 against the molding die 770A at a predetermined value or lower. With this arrangement, unnecessary large load is prevented from being applied to the resin 44, and the molding die 770A is surely prevented from being deformed.

In step S43, the geared motors 742 may be controlled on a real-time basis, based on the output value of the load cell 756. That is to say, when the output value of the load cell 756 received by the controller 800 becomes equal to or greater than a threshold, which is a predetermined pressure previously set in the controller 800, the operation of the geared motors 742 is terminated; and when the output of the load cell 756 becomes lower than the threshold, the operation of the geared motors 742 is resumed.

[Manufacturing Method of Wafer Lens (Fifth Example)]

The fifth example is different from the fourth example on the following points, but the same as the fourth example on the other points.

Figure 84:
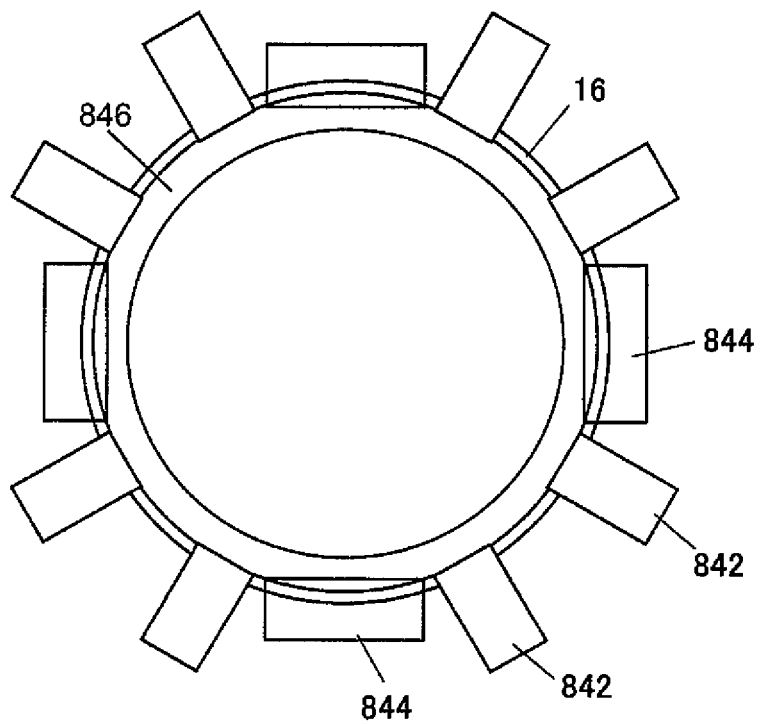
FIG. 84 is a plan view showing a configuration (arrangement and the like) of pinch members and claw members of FIG. 83.

As shown in FIG. 84, the area of the outer shape of the molding dies 770A and 770B on which the depressions 770a and the protrusions 770b are formed is equal to or smaller than the area of the outer shape of the glass substrate 16. A mask 846 for blocking light is formed on the circumferential area of the surface of the molding dies 770A and 770B opposite to the surface on which the depressions 770a and the protrusions 770b are formed. The mask 846 is a film of known metal formed by a vapor deposition method, for example.

Figure 83:
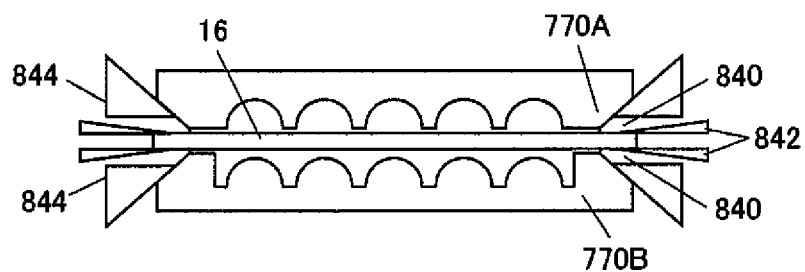
FIG. 83 is a diagram showing a step of releasing a both-sided molding die from the glass substrate of a modified example.

In step S53, as shown in FIG. 83 and FIG. 84, the demolding is performed by using the pinch members 842 pinching the upper and lower surfaces of the glass substrate 16 through the spaces 840 formed due to the difference of the areas of the outer shapes of the glass substrate 16 and molding dies 770A and 770B, and by using the claw members 844 movable upward and downward while holding the circumferences of the molding dies 770A and 770B.

The pinch members 842 are members configured by a set of an upper part and a lower part and have an approximately triangular shape when viewed from the side surface, and pinch the upper surface and the lower surface of the glass substrate 16 by inserting their apex end parts in the spaces 840.

The claw members 844 are members configured by a set of an upper part and a lower part and have an approximately triangular shape when viewed from the side surface, and are movable upward and downward while their inclined surfaces are in contact with the circumferential inclined surfaces of the molding die 770A and 770B.

The pinch members 842 and the claw members 844 are arranged along the circumference of the glass substrate 16 with a predetermined clearances therebetween; however, the pinch members 842 or the claw members 844 are not limited to ones having the above described shapes and can be altered if necessary.

In step S53, the dies are separated by the upper and lower claw members 844 moved in the direction to be separated from each other (upward and downward) while the pinch members 842 are holding the glass substrate 16 by pinching the upper surface and the lower surface.

In the fifth example, since the area of the outer shape of the surface of the molding dies 770A and 770B facing one surface of the glass substrate 16 is smaller than the area of the outer shape of the one surface of the glass substrate 16, the molding dies 770A and 770B can be released from the cured resin 44 while the glass substrate 16 is being pinched and held by the pinch members 842 through the spaces 840 generated due to the difference of areas of their outer shapes, thereby increasing the demoldability.

In the fifth example, since the mask 846 blocks the applied light to prevent curing the resin 44 on the circumferential area of the molding dies 770A and 770B so that the not cured resin 44 can be removed, it prevent the formation of an unexpected shape due to the hardened resin 44 coming out to the surrounding areas of the molding dies 770A and 770B.

In the fifth example, there is no possibility that due to the hardened resin 44 coming out to the surrounding areas of the molding dies 770A and 770B; thus the spaces for the holding mechanisms such as the pinch members 842 and the claw members 844 for separating the molding dies are secured, as a result the failure of molding die separation can be prevented.

In the fifth example, light may be applied from above and below of the molding dies 770A and 770B at the same time while the molding dies 770A and 770B are pressed against the glass substrate 16 with the resin 44 filled in both gaps between the glass substrate 16 and the molding dies 770A and 770B.

In this case, since part of the applied light is blocked by the masks 846 on the molding dies 770A and 770B so that the resin 44 in the circumferential areas of the molding dies 770A and 770B are not cured, the uncured resin 44 is then removed.

After that the molding die is separated by the pinch members 842 pinching the upper surface and the lower surface of the glass substrate 16 through the space 840 formed due to the difference of areas of the outer shapes of the glass substrate 16 and the molding dies 770A and 770B, and by the claw members 844 moving while holding the circumferences of the molding dies 770A and 77013.

The application of light from the both sides of the glass substrate 16 to cure the resin 44 in this manner reduces the number of steps.

DESCRIPTION OF THE NUMERALS

2: Image pickup device
4: Lens unit
6: Sensor unit
8, 10: Lens block
12: Spacer
12a: Projection
12b: Opening section
14: Covering package
14a Upper panel
14b: Side panel
14c: Opening section
14d: Notch part
16: Glass substrate
16a: Outer circumference
16b: Identifier
18: Aperture stop
18a: Opening section
20: Resin part
20a: Convex lens part
20b: Non-lens part
20c: Inclined part
20d: Flat part
20e: Inclined part
22: Aperture stop
24: Resin part
24a: Concave lens part
24b: Non-lens part
26: Glass substrate
28: Resin part
28a: Concave lens part
28b: Non-lens part
30: Aperture stop
32: Resin part
32a: Convex lens part
32b: Non-lens part
34: Optical axis
36: Sensor
38: Package
38a: Side surface
40: Cover glass 40
42: IR cut filter
44: (photocurable) resin
50: Body of stacked wafer lenses
52 or 54; Wafer lens
56: Spacer substrate
56a: Opening section
58, 60: ID recording region
61: Dicing line
62, 64, 66, 68: Region
64a, 66a: Alignment mark
72, 74, 76, 78: Region
72a, 72b, 74a, 76a, 78a, 78b: Alignment mark
82, 84, 86, 88: Region
82a, 82b, 84a, 86a, 88a, 88b: Alignment mark
92, 94, 96, 98: Region
94a, 96a: Alignment mark
100: Concave die
102: Depression (cavity)
104: Flat part
106: Declined surface part
108: Flat part
110: Declined surface pad
112: Flat part
120A, 120B: Cutting machine
122: Surface plate
124: Stage
126: Spindle
128: Fixture
130: (Spindle motor) shaft
132: Ball end mill
134: Cutting blade 134a: Arc part
134b: Straight part
134c, 134d, 134e: Flat part
134f: Rotation center
140: Work
142: Plating layer
144, 146: Alignment mark
146a, 146b: Groove
150, 152, 154: Region
160, 162, 164, 166, 168, 170: Region
180: Convex die
182: Protrusion (core)
184: Flat part
190, 192, 194: Region
200: First concave plastic die
202: Molding part
204: Substrate
206: Depression (cavity)
208: Resin
210: First convex plastic die
212: Molding part
214: Substrate
216: Protrusion (core)
220: Second concave plastic die
222: Molding part
224: Substrate
226: Depression (cavity)
230: Second convex plastic die
232: Molding part
234: Substrate
236: Protrusion (core)
300: Wafer lens manufacturing apparatus
302: Surface plate
304: X-Y stage
306: X-axis moving mechanism
308: Y-axis moving mechanism
310: X-axis guide
312: Projection
314: Linear motor
316: Stator
318: Rotor
320: Scale
322: Sensor
324: Air slide guide mechanism
326: Blowout hole
328: Air slide guide mechanism
330, 332: Blowout hole
334: Vacuum hole
340: Y-axis guide 202
342: Y-axis movable body
344: linear motor
346: Stator
348: Rotor
350: Scale
352, 354: Hook part
356, 358: End part
360: Air slide guide mechanism
362, 364, 366: Blowout hole
368: Air slide guide mechanism
370, 372, 374: Blowout hole
380: Dispenser
380a: Needle part
382: Laser end-measuring machine
384: Microscope
386: Through hole
388: Lid body
390: Light source
392: Molding die section
394: Z-axis movement mechanism
400: Z-axis guide
402: Z stage
404: Motor
406: Shaft
408: Gap
410: Air slide guide mechanism
412, 414, 416, 418: Blowout hole
420: Sealing member
422: Space
424: Upper space
426: Lower space
428: Decompression mechanism.
430: Communication hole
440: First support base
442: Piezoelectric actuator
444: Second support base
446: Pressure sensor
448: Third support platform
450: Molding die
450a: Depression (cavity)
450b: Depression
452: Screw
454: Leaf spring
456: Screw
460: Optical sensor
462: Space
470: Controller
472: θ stage
474: Through hole
480, 482, 484, 486: Space
500: Warp correction tool
502: Air hole
504: Frame body
506: Sealing glass
508: Sealed space
510: MTF/FB tester
512: Light source section
512a: Halogen fiber
512b: Band-pass filter
512c: Diffusion plate
512d: Chart
514: Automatic X-Y stage
516: Range sensor
516a: Autocollimator
516b: Contact displacement gauge
518: Measurement optical system
520: Camera for rotational alignment of wafer
522, 524, 526, 528: Clearance
530: Image pickup tester
532: CCD
534: Image generation board
536: Range sensor
538: Measurement head
540: Automatic X-Y stage
542: Flat light source
544: Camera for alignment
546: Chassis
550: Motion controller
552: Digital I/O board
554: Image capture board
556, 558: Driver
600: Base
602: Tool
610: Tool
612: Tapered part 614: Suctioning section
700: Wafer lens manufacturing apparatus
702: Base
704: Opening section
706: Lid body
708: Decompression mechanism
710: Protrusion
712: Guide
714: Support section
720: Stage
722: Slide guide
730: Lifting actuator
732: Shaft
740: Height gauge
742: Geared motor
744: Shaft
746: Height gauge
750: X-Y stage
752: Θ stage
754: Electrostatic chucking device
756: Load cell
760: Plate holder
762: Claw
770A, 770B: Molding die
770a: Depression (cavity)
770b: Protrusion (core)
772, 778: Region
772a, 778a: Alignment mark
780: Imaging section
790: Light source
800: Controller
802, 804, 806, 808: Space
810: Center
812: Inscribed circle
814: Circumscribed circle
816: Punch cut circle
820: Standard position
830: Spherical body
832: Shaft bearing
834: Support pillar
836: Tilt adjustment section
840: Space
842: Pinch member
844: Claw member
846: Mask

The invention claimed is:

1. A method for manufacturing an image pickup device, the method comprising the steps of:
manufacturing an optical unit which comprises, in order from an object side:
a first lens block including a first glass substrate on an object side surface of which a first lens part and a first non-lens part surrounding the first lens part and extending to a circumference of the first glass substrate are formed of resin, and an image side surface of which a second lens part and a second non-lens part surrounding the second lens part are formed of resin; and
a second lens block including a second glass substrate on an object side surface of which a third lens part and a third non-lens part surrounding the third lens part are formed of resin, and on an image side surface of which a fourth lens part and a fourth non-lens part surrounding the fourth lens part and extending to a circumference of the second glass substrate are formed of resin,
wherein the second non-lens part and the third non-lens part are directly bonded to face each other, and
wherein the first non-lens part and the fourth non-lens part are thinnest at the circumference of the first glass substrate and the circumference of the second glass substrate, respectively;
bonding a glass spacer, which has an opening at a position corresponding to the first lens part through the fourth lens part, such that one end surface of the glass spacer is directly bonded to the surface on which the fourth lens part is formed;
bonding a sensor unit, which has a glass cover member and an image sensor provided a predetermined distance away from the cover member, to the other end surface of the spacer, wherein at least a side surface of the first lens block, a side surface of the second lens block, and a side surface of the spacer are formed on the same plane; and
mounting a lens cover such that the lens cover covers the side surfaces.

2. A method for manufacturing an image pickup device, the method comprising the steps of:
manufacturing an optical unit which comprises, in order from an object side:
a first lens block including a first glass substrate on an object side surface of which a first lens part convex toward the object side and a first non-lens part surrounding the first lens part and extending to a circumference of the first glass substrate are formed of resin, and on an image side surface of which a second lens part concave toward an image side and a second non-lens part surrounding the second lens part are formed of resin; and
a second lens block including a second glass substrate on an object side surface of which a third lens part concave toward the object side and a third non-lens part surrounding the third lens part are formed of resin, and on an image side surface of which a fourth lens part and a fourth non-lens part surrounding the fourth lens part and extending to a circumference of the second glass substrate are formed of resin,
wherein the second non-lens part and the third non-lens part are directly bonded to face each other, and
wherein the first non-lens part and the fourth non-lens part are thinnest at the circumference of the first glass substrate and the circumference of the second glass substrate, respectively;
bonding a glass spacer, which has an opening at a position corresponding to the first lens part through the fourth lens part, such that one end surface of the glass spacer is directly bonded to the surface on which the fourth lens part is formed;
bonding a sensor unit, which has a glass cover member and an image sensor provided a predetermined distance away from the cover member, to the other end surface of the spacer, wherein at least a side surfaces of the first lens block, a side surface of the second lens block, and a side surface of the spacer are formed on the same plane; and
mounting a lens cover such that the lens cover covers the side surfaces.

3. The method of claim 1, for manufacturing an image pickup device, wherein the cover member has a larger area than the first lens block and the second lens block, and the step of bonding the sensor unit to the other end surface of the spacer includes the step of aligning the bonded first lens block, the second lens block and the spacer with each other.

4. An image pickup device, comprising in order from an object side:
a first lens block, the first lens block including:
a first glass substrate;
a first resin part formed on an object side surface of the first glass substrate, the first resin part extending to a circumference of the first glass substrate and being thinnest at the circumference of the first glass substrate;
a first resin lens part formed in a part of the first resin part; and
a second resin part formed on an image side surface of the first glass substrate;
a second resin lens part formed in a part of the second resin part;
a second lens block, the second lens block including:
a second glass substrate;
a third resin part formed on an object side surface of the second glass substrate;
a third resin lens part formed in a part of the third resin part, the third resin part being bonded to the second resin part; and
a fourth resin part formed on an image side surface of the second glass substrate, the fourth resin part extending to a circumference of the second glass substrate and being thinnest at the circumference of the second glass substrate;
a fourth resin lens part formed in a part of the fourth resin part;
a glass spacer which is provided on an image side of the fourth lens part and has an opening at a position corresponding to the first lens part through the fourth lens part;
a sensor unit, the sensor unit including:
a glass cover member bonded to an image side surface of the spacer;
an image sensor is provided on an image side of the glass cover member a predetermined distance away from the glass cover member; and
a sensor substrate on an object side of which the image sensor is mounted; and
a lens cover which covers the first lens block and the second lens block,
wherein a side surface of the first lens block, a side surface of the second lens block, and a side surface of the spacer are formed on the same plane so as to form a step between (a) the side surfaces of the first lens block, the second lens block, and the spacer and (b) the side surface of the sensor unit, and
wherein the lens cover is provided within the step.

5. An image pickup device, comprising in order from an object side:
a first lens block, the first lens block including:
a first glass substrate;
a first resin part formed on an object side surface of the first glass substrate, the first resin part extending to a circumference of the first glass substrate and being thinnest at the circumference of the first glass substrate;
a first resin lens part which is convex toward the object side and is formed in the first resin part; and
a second resin part formed on the first glass substrate, in a part of the second resin part and is concave toward an image side;
a second lens block, the second lens block including:
a second glass substrate;
a third resin part formed on an object side surface of the second glass substrate;
a third resin lens part which is formed in a part of the third resin part;
a fourth resin part formed on an image side surface of the second glass substrate, the fourth resin part extending to a circumference of the second glass substrate and being thinnest at the circumference of the second glass substrate; and
a fourth lens part formed in a part of the fourth resin part;
a glass spacer which is provided on an image side of the fourth resin part and has an opening at a position corresponding to the first lens part through the fourth lens part; and
a sensor unit, the sensor unit including:
a glass cover member bonded on an image side surface of the spacer;
an image sensor is provided on an image side of the glass cover member a predetermined distance away from the cover glass member; and
a sensor substrate on an object side surface of which the sensor is mounted; and
a lens cover which covers the first lens block and the second lens block,
wherein a side surface of the first lens block, a side surface of the second lens bock, and a side surface of the spacer are formed on the same plane so as to form a step between (a) the side surfaces of the first lens block, the second lens block, and the spacer and (b) the side surface of the sensor unit, and
wherein the lens cover is provided within the step.

6. A method for manufacturing an image pickup device, the method comprising the steps of:
manufacturing an optical unit which comprises, in order from an object side:
a first lens block including a first glass substrate on an object side surface of which a first lens part and a projection surrounding the first lens part are formed of resin, and an image side surface of which a second lens part and a second non-lens part surrounding the second lens part are formed of resin; and
a second lens block including a second glass substrate on an object side surface of which a third lens part and a third non-lens part surrounding the third lens part are formed of resin, and on an image side surface of which a fourth lens part is formed of resin, wherein the second non-lens part and the third non-lens part are directly bonded to face each other, and wherein the projection has an inclined part on an opposite side thereof with respect to the first lens part;
bonding a glass spacer, which has an opening at a position corresponding to the first lens part through the fourth lens part, such that one end surface of the glass spacer is directly bonded to the surface on which the fourth lens part is formed;
bonding a sensor unit, which has a glass cover member and an image sensor provided a predetermined distance away from the glass cover member, to the other end surface of the glass spacer, wherein at least a side surface of the first lens block, a side surface of the second lens block, and a side surface of the glass spacer are formed on a same plane; and
mounting a lens cover having an edge part defining an opening in the lens cover such that the lens cover covers the side surfaces, and the edge part of the lens cover is fit with the inclined part of the projection.

7. A method for manufacturing an image pickup device, the method comprising the steps of:
- manufacturing an optical unit which comprises, in order from an object side:
  - a first lens block including a first glass substrate on an object side surface of which a first lens part convex toward the object side and a projection surrounding the first lens part are formed of resin, and on an image side surface of which a second lens part concave toward the image side surface and a second non-lens part surrounding the second lens part are formed of resin; and
  - a second lens block including a second glass substrate on an object side surface of which a third lens part concave toward the object side and a third non-lens part surrounding the third lens part are formed of resin, and on an image side surface of which a fourth lens part is formed of resin, wherein the second non-lens part and the third non-lens part are directly bonded to face each other, and wherein the projection has an inclined part on an opposite side thereof with respect to the first lens part;
- bonding a glass spacer, which has an opening at a position corresponding to the first lens part through the fourth lens part, such that one end surface of the glass spacer is directly bonded to the surface on which the fourth lens part is formed;
- bonding a sensor unit, which has a glass cover member and an image sensor provided a predetermined distance away from the glass cover member, to the other end surface of the glass spacer, wherein at least a side surface of the first lens block, a side surface of the second lens block, and a side surface of the glass spacer are formed on a same plane; and
- mounting a lens cover having an edge part defining an opening in the lens cover such that the lens cover covers the side surfaces, and the edge part of the lens cover is fit with the inclined part of the projection.

8. An image pickup device, comprising in order from an object side:
- a first lens block, the first lens block including:
  - a first glass substrate;
  - a first resin part formed on an object side surface of the first glass substrate;
  - a first resin lens part in a part of the first resin part, wherein the first resin part has a projection surrounding the first resin lens part, and the projection has an inclined part on an opposite side thereof with respect to the first resin lens part; and
  - a second resin part formed on an image side surface of the first glass substrate;
  - a second resin lens part formed in a part of the second resin part;
- a second lens block, the second lens block including:
  - a second glass substrate;
  - a third resin part formed on an object side surface of the second glass substrate;
  - a third resin lens part formed in a part of the third resin part, the third resin part being bonded to the second resin part; and
  - a fourth resin part formed on an image side surface of the second glass substrate;
  - a fourth resin lens part formed in a part of the fourth resin part;
- a glass spacer which is provided on an image side of the fourth lens part and has an opening at a position corresponding to the first lens part through the fourth lens part;
- a sensor unit, the sensor unit including:
  - a glass cover member bonded to an image side surface of the spacer;
  - an image sensor is provided on an image side of the glass cover member a predetermined distance away from the glass cover member; and
  - a sensor substrate on an object side surface of which the image sensor is mounted; and
- a lens cover which has an edge part defining an opening in the lens cover and covers the first lens block and the second lens block such that the edge part of the lens cover is fit with the inclined part of the projection,
- wherein a side surface of the first lens block, a side surface of the second lens block, and a side surface of the spacer are formed on a same plane so as to form a step between (a) the side surfaces of the first lens block, the second lens block, and the spacer and (b) the side surface of the sensor unit, and
- wherein the lens cover is provided within the step.

9. An image pickup device, comprising in order from an object side:
- a first lens block, the first lens block including:
  - a first glass substrate;
  - a first resin part formed on an object side surface of the first glass substrate;
  - a first resin lens part which is convex toward the object side and is formed in the first resin part, wherein the first resin part has a projection surrounding the first resin lens part, and the projection has an inclined part on an opposite side thereof with respect to the first resin lens part; and
  - a second resin part formed on an image side surface of the first glass substrate;
  - a second resin lens part which is formed, on the first glass substrate, in a part of the second resin part and is concave toward an image side;
- a second lens block, the second lens block including:
  - a second glass substrate;
  - a third resin part formed on an object side surface of the second glass substrate;
  - a third resin lens part which is formed in a part of the third resin part;
  - a fourth resin part formed on an image side surface of the second glass substrate;
  - a fourth resin lens part formed in a part of the fourth resin part;
- a glass spacer which is provided on an image side of the fourth lens part and has an opening at a position corresponding to the first lens part through the fourth lens part;
- a sensor unit, the sensor unit including:
  - a glass cover member bonded to an image side surface of the spacer;
  - an image sensor is provided on an image side of the glass cover member a predetermined distance away from the glass cover member; and
  - a sensor substrate on an object side surface of which the image sensor is mounted; and
- a lens cover which has an edge part defining an opening in the lens cover and covers the first lens block and the second lens block such that the edge part of the lens cover is fit with the inclined part of the projection, wherein a side surface of the first lens block, a side surface of the second lens block, and a side surface of the spacer are formed on a same plane so as to form a step between (a) the side surfaces of the first lens block, the second lens block, and the spacer and (b) the side surface of the sensor unit, and wherein the lens cover is provided within the step.

10. The method of claim 1, wherein the first non-lens part includes a projection surrounding the first lens part and the lens cover has an edge part defining an opening in the lens cover, wherein the projection has an inclined part on an opposite side thereof with respect to the first lens part, and wherein the edge part of the lens cover is fit with the inclined part of the projection.

11. The method of claim 2, wherein the first non-lens part includes a projection surrounding the first lens part and the lens cover has an edge part defining an opening in the lens cover, wherein the projection has an inclined part on an opposite side thereof with respect to the first lens part, and wherein the edge part of the lens cover is fit with the inclined part of the projection.

12. The image pickup device of claim 4, wherein the first resin part has a projection surrounding the first resin lens part and the projection has an inclined part on an opposite side thereof with respect to the first resin lens part, and wherein the lens cover has an edge part defining an opening in the lens cover such that the edge part of the lens cover is fit with the inclined part of the projection.

13. The image pickup device of claim 5, wherein the first resin part has a projection surrounding the first resin lens part and the projection has an inclined part on an opposite side thereof with respect to the first resin lens part, and wherein the lens cover has an edge part defining an opening in the lens cover such that the edge part of the lens cover is fit with the inclined part of the projection.

* * * * *